United States Patent
Hsieh et al.

(10) Patent No.: US 12,412,746 B2
(45) Date of Patent: Sep. 9, 2025

(54) SEMICONDUCTOR DEVICE AND METHOD FOR FABRICATING THE SAME

(71) Applicant: TAIWAN SEMICONDUCTOR MANUFACTURING COMPANY, LTD., Hsinchu (TW)

(72) Inventors: Meng-Hsiu Hsieh, Hsinchu (TW); Hsiao-Wen Chung, Taipei (TW); Shan-Yu Huang, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 579 days.

(21) Appl. No.: 17/736,186

(22) Filed: May 4, 2022

(65) Prior Publication Data

US 2023/0360917 A1 Nov. 9, 2023

(51) Int. Cl.
  *H01L 21/28* (2025.01)
  *G06F 30/392* (2020.01)
  *G06F 119/18* (2020.01)

(52) U.S. Cl.
  CPC ............ *H01L 21/28* (2013.01); *G06F 30/392* (2020.01); *G06F 2119/18* (2020.01)

(58) Field of Classification Search
  None
  See application file for complete search history.

(56) References Cited

U.S. PATENT DOCUMENTS

| | | | |
|---|---|---|---|
| 2017/0098602 A1* | 4/2017 | Kornachuk | H01L 23/5283 |
| 2017/0147732 A1* | 5/2017 | Anikin | G06F 30/392 |
| 2017/0365620 A1* | 12/2017 | Becker | H10D 64/517 |
| 2018/0005959 A1* | 1/2018 | Wang | H10D 64/117 |

FOREIGN PATENT DOCUMENTS

| | | | |
|---|---|---|---|
| JP | 2007011729 A | * | 1/2007 |
| JP | 2012028479 A | * | 2/2012 |

OTHER PUBLICATIONS

Device and Method for Dummy Cell Insertion (Year: 2007).*
Semiconductor Integrated Circuit Layout Design Method (Year: 2012).*

* cited by examiner

*Primary Examiner* — Khaja Ahmad
(74) *Attorney, Agent, or Firm* — Birch, Stewart, Kolasch & Birch, LLP

(57) ABSTRACT

A method for fabricating a semiconductor device is provided. The method includes generating a redistribution layer (RDL) layout, wherein the RDL layout comprises a plurality of redistribution lines; determining a first dummy region in the RDL layout according to the redistribution lines; disposing a plurality of first dummy redistribution lines in the first dummy region; performing a first modification process to enlarge at least one of the first dummy redistribution lines; determining the enlarged one of the first dummy redistribution lines as a second dummy region in the RDL layout when an area of the enlarged one of the first dummy redistribution lines is greater than a threshold value; disposing a plurality of second dummy redistribution lines in the second dummy region; and patterning a metal layer according to the RDL layout after disposing the second dummy redistribution lines in the second dummy region.

20 Claims, 66 Drawing Sheets

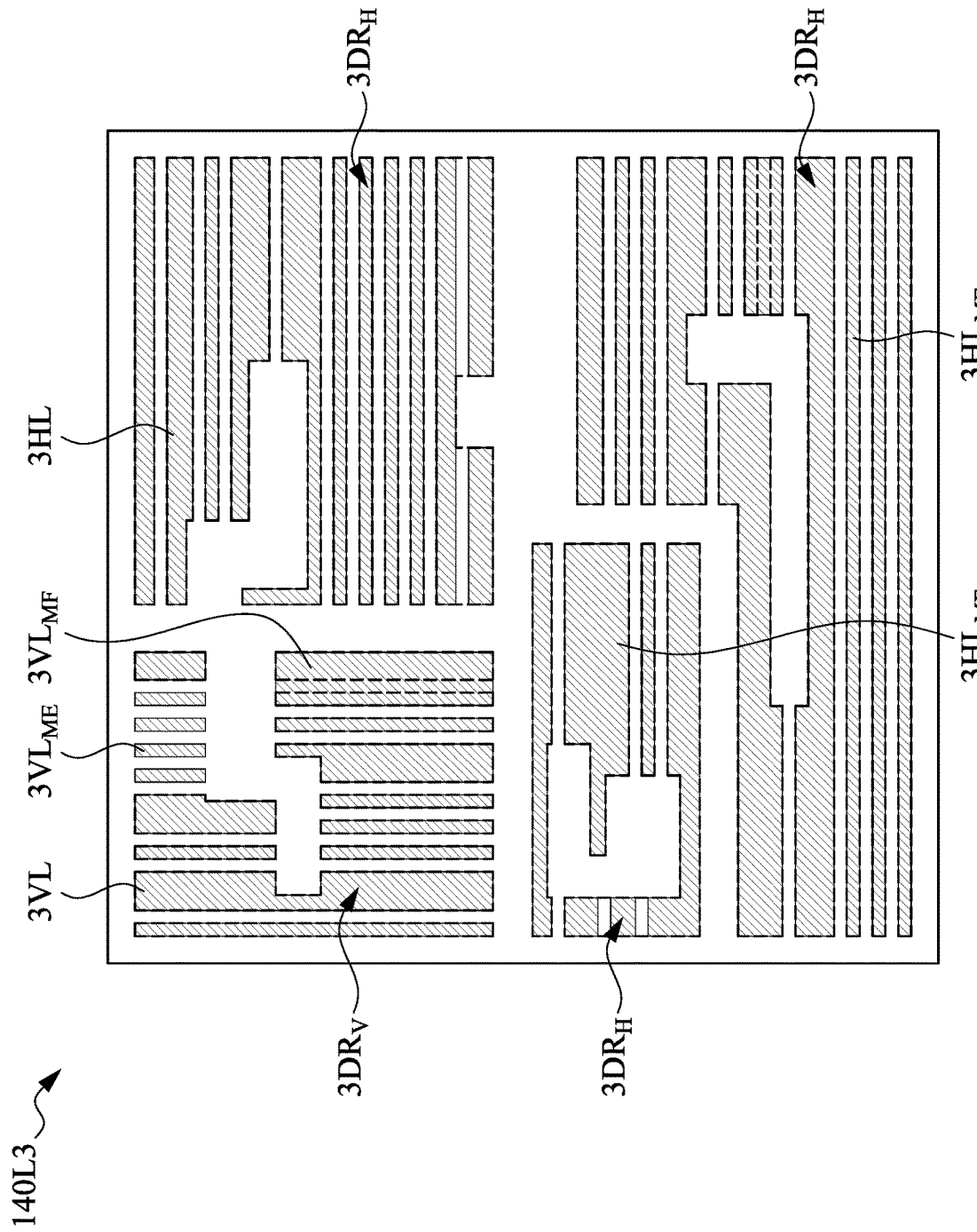

SEMICONDUCTOR DEVICE AND METHOD FOR FABRICATING THE SAME

BACKGROUND

Semiconductor devices are used in a variety of electronic applications, such as personal computers, cell phones, digital cameras, and other electronic equipment, as examples. Semiconductor devices are typically fabricated by sequentially depositing insulating or dielectric layers, conductive layers, and semiconductive layers of material over a semiconductor substrate, and patterning the various material layers using lithography to form circuit components and elements thereon. Dozens or hundreds of integrated circuits are manufactured on a single semiconductor wafer. The individual dies are singulated by sawing the integrated circuits along a scribe line. The individual dies are then packaged separately, in multi-chip modules, or in other types of packaging, for example.

The semiconductor industry continues to improve the integration density of various electronic components (e.g., transistors, diodes, resistors, capacitors, etc.) by continual reductions in minimum feature size, which allow more components to be integrated into a given area. These smaller electronic components, such as integrated circuit dies, also require smaller packages that utilize less area than packages of the past, in some applications.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
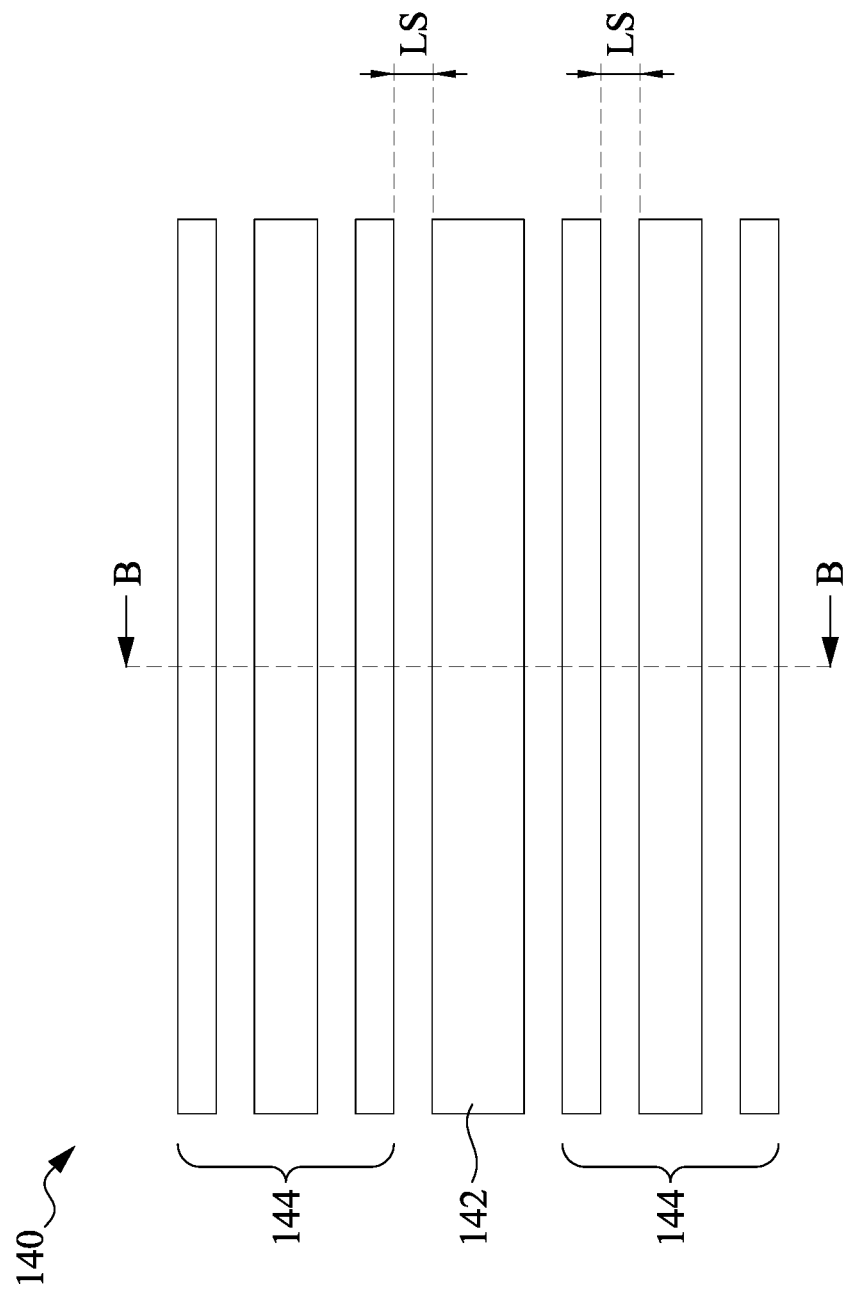
FIG. 1A is a top schematic view of a semiconductor device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIGS. 1A-3 illustrate a device at various intermediate stages of a fabrication method according to some embodiments of the present disclosure. It is understood that additional steps may be provided before, during, and after the steps shown by FIGS. 1A-3, and some of the steps described below can be replaced or eliminated for additional embodiments of the method. The order of the operations/processes may be interchangeable.

Figure 1B:
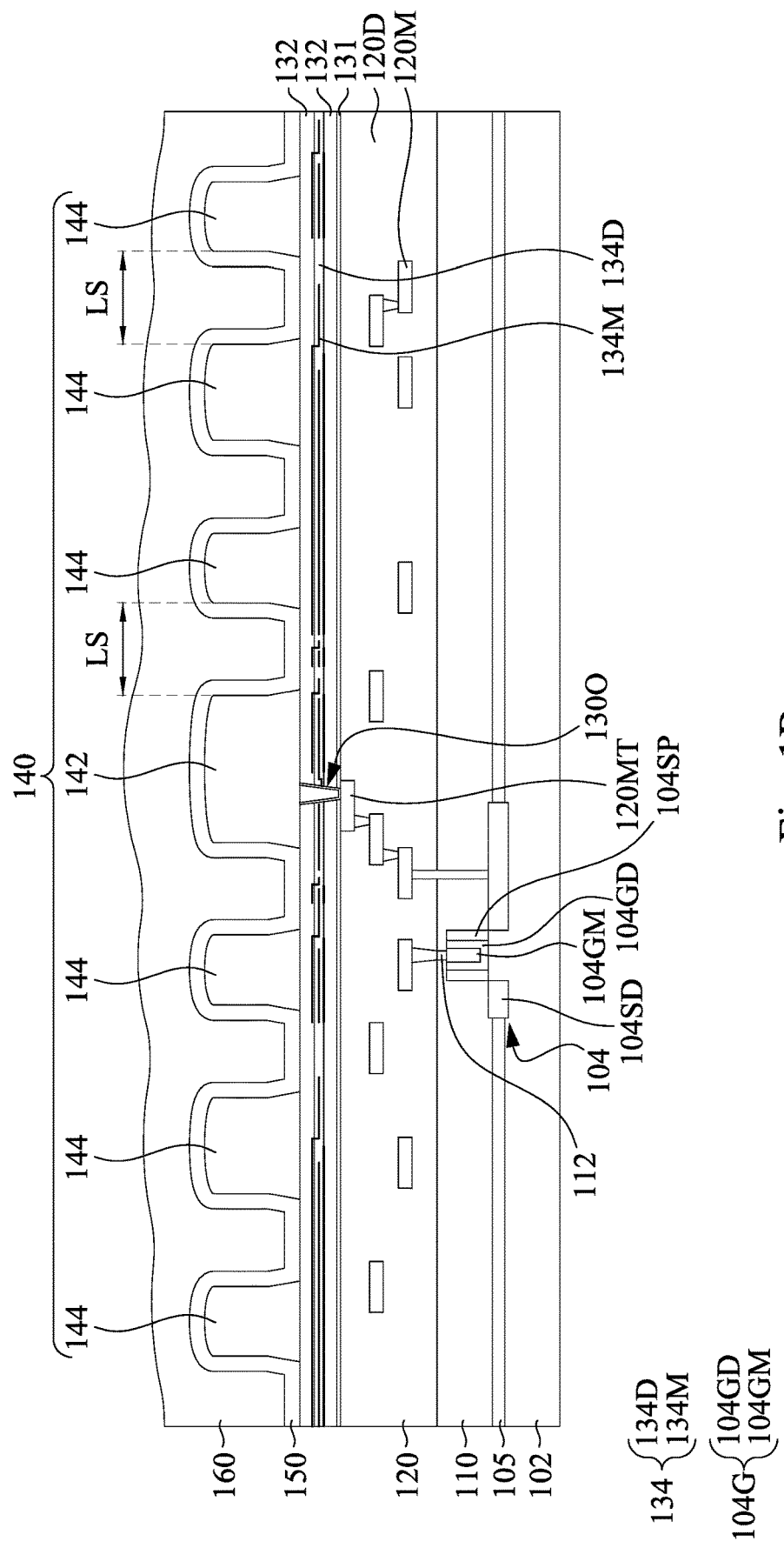
FIG. 1B is a cross-schematic view of the semiconductor device taken along line B-B of FIG. 1A.

FIG. 1A is a top schematic view of a semiconductor device according to some embodiments of the present disclosure. FIG. 1B is a cross-schematic view of the semiconductor device taken along line B-B of FIG. 1A. The semiconductor device includes a substrate 102, a back-end-of-line (BEOL) interconnect structure 120 over the substrate 102, a first passivation layer 130 over the interconnect structure 120, and a redistribution layer (RDL) 140 over the first passivation layer 130.

In some embodiments, the substrate 102 may be processed through a front-end of line (FEOL) process and have devices (e.g., CMOS field-effect transistors (FETs)) formed over thereon. For example, one or more active and/or passive devices 104 are formed over the substrate 102. The one or more active and/or passive devices 104 are illustrated as a single transistor in FIG. 1B. For example, the device 104 may include a gate structure 104G and source/drain regions 104SD over regions surrounded by shallow trench isolation (STI) regions 105. The gate structure 104G may include a gate dielectric 104GD and a gate electrode 104GM over the gate dielectric 104GD. The spacers 104SP may be formed on opposite sides of the gate structure 104G. In some embodiments, the source and drain regions 104SD may be doped regions formed in the substrate 102. In some alternative embodiments, the source and drain regions 104SD may be epitaxial structures formed over the substrate 102. The one or more active and/or passive devices 104 may include various N-type metal-oxide semiconductor (NMOS) and/or P-type metal-oxide semiconductor (PMOS) devices, such as transistors, capacitors, resistors, diodes, photo-diodes, fuses, and the like. It is appreciated that the above examples are provided for the purpose of illustration only and are not meant to limit the present disclosure in any manner. Other circuitry may be also formed as appropriate for a given application. A FEOL interlayer dielectric (ILD) layer 110 is formed overlying the active and/or passive devices 104. Contact plugs 112 are formed in the ILD layer 110 to connect the active and/or passive devices 104. Contact plugs 112 electrically couple the overlying interconnect structure 120 to the underlying devices 104. In the example illustrated in FIG. 1B, the contact plugs 112 make electrical connections to the gate structure $104_G$ and the source/drain regions $104_{SD}$ of FinFET device 104.

The BEOL interconnect structure 120 may include plural interconnect layers formed over the substrate 102 through a back-end of line (BEOL) process. The interconnect structure 120 electrically interconnects the one or more active and/or passive devices 104 to form functional electrical circuits. The interconnect structure 120 may include one or more dielectric layers 120D and a metallization pattern 120M in the dielectric layers 120D. In some embodiments, the dielectric layers 120D may include undoped silicate glass (USG), low-k dielectric material, extreme low-k dielectric material, $SiO_2$, or other suitable materials. The dielectric layers 120D may be referred to as inter-metal dielectric (IMD) or inter-layer dielectric (ILD). The metallization pattern 120M may include one or more horizontal interconnects, such as conductive lines, respectively extending horizontally or laterally in the dielectric layers 120D and vertical interconnects, such as conductive vias, respectively extending vertically in the dielectric layers 120D. The combination of the conductive lines at a same level is referred to a metal layer hereinafter.

Accordingly, interconnect structure 120 may include a plurality of metal layers that are interconnected through the conductive vias. The interconnect of the metallization pattern MP (e.g., the conductive lines and conductive vias) may be made of suitable conductive materials, such as copper, aluminum, copper alloy, or other metal materials. In some embodiments, a topmost metal layer of the metallization pattern 120M form a contact region 120MT for electrical connection.

A first passivation layer 130 is formed over the interconnect structure 120. The first passivation layer 130 may include one or more passivation layers 132. In some embodiments, the passivation layers 132 may include suitable inorganic dielectric materials. For example, the passivation layers 132 may include silicon oxide, silicon nitride, silicon oxynitride, other non-porous dielectric materials such as Un-doped Silicate Glass (USG), the like, or the combination thereof. In some embodiments, the first passivation layer 130 may include a seal layer 131 formed over the interconnect structure 120 prior to the formation of the passivation layers 132. The seal layer 131 may include inorganic dielectric materials, such as silicon oxide, silicon nitride, silicon oxynitride, the like, or the combination thereof. The composition of the seal layer 131 may be different from the passivation layers 132. In some embodiments, the first passivation layer 130 may further include a metal-insulator-metal (MIM) layer 134 between the passivation layers 132. The MIM layer 134 may include dielectric layers 134D and conductive features (e.g., conductive layers) 134M, forming capacitors. The dielectric layers 134D may include suitable dielectric materials, such as silicon oxide. The conductive features 134M may include suitable conductive materials, such as copper. In some alternative embodiments, the MIM layer 134 layer may be omitted.

The first passivation layer 130 is patterned by the suitable lithography process and etching processes, thereby forming redistribution via (RV) hole 1300 exposing a portion of the contact region 120MT.

A redistribution layer 140 is formed over the first passivation layer 130. The redistribution layer 140 may include one or more redistribution lines 142 and dummy redistribution lines 144. A portion of the redistribution line 142 can be formed in the RV hole 1300 and directly contact the top contact region 120MT. The redistribution line 142 electrically connects the contact region 120MT to bump features subsequently formed. The dummy redistribution lines 144 are electrically floating, which means that the dummy redistribution lines 144 are electrically isolated from any metal features of the metallization pattern 120M. The redistribution line 142 and the dummy redistribution lines 144 includes, but is not limited to, for example, copper, aluminum, copper alloy, or other conductive materials. The redistribution lines 142 and the dummy redistribution lines 144 further includes, in some embodiments, a nickel-containing layer (not shown) on the top of a copper-containing layer. The redistribution lines 142 and the dummy redistribution lines 144 may be formed by depositing a metal layer over the first passivation layer 130, and patterning the metal layer by suitable lithography and etching processes. The deposition of the metal layer may include plating, electroless plating, sputtering, chemical vapor deposition methods, and the like. In some embodiments, the redistribution lines 142 and dummy redistribution lines 144 are substantially spaced by an equal line space LS from another. The configuration of the dummy redistribution lines 144 may improve the topography of the subsequent formed polymer layer 160.

A polymer layer 160 is formed on the redistribution layer 140. The polymer layer 160, as the name suggests, is formed of a polymer, such as an epoxy, polyimide, benzocyclobutene (BCB), polybenzoxazole (PBO), and the like, although other relatively soft, often organic, dielectric materials can also be used. In some embodiments, the polymer layer 160 is a polyimide layer. In some another embodiments, the polymer layer 160 is a polybenzoxazole (PBO) layer. The formation methods may include spin coating, for example. Polymer layer 160 may be dispensed in a liquid form, and then cured. The polymer layer 160 is soft, and hence has the function of reducing inherent stresses on respective substrate.

In some embodiments, a second passivation layer 150 may be optionally formed on the redistribution layer 140 prior to the formation of the polymer layer 160. In some embodiments, the second passivation layer 150 may include suitable inorganic dielectric materials. For example, the second passivation layer 150 may include silicon oxide, silicon nitride, silicon oxynitride, other non-porous dielectric materials, the like, or the combination thereof. In some embodiments, the material of the second passivation layer 150 may be different from that of the first passivation layer 130.

Figure 2A:
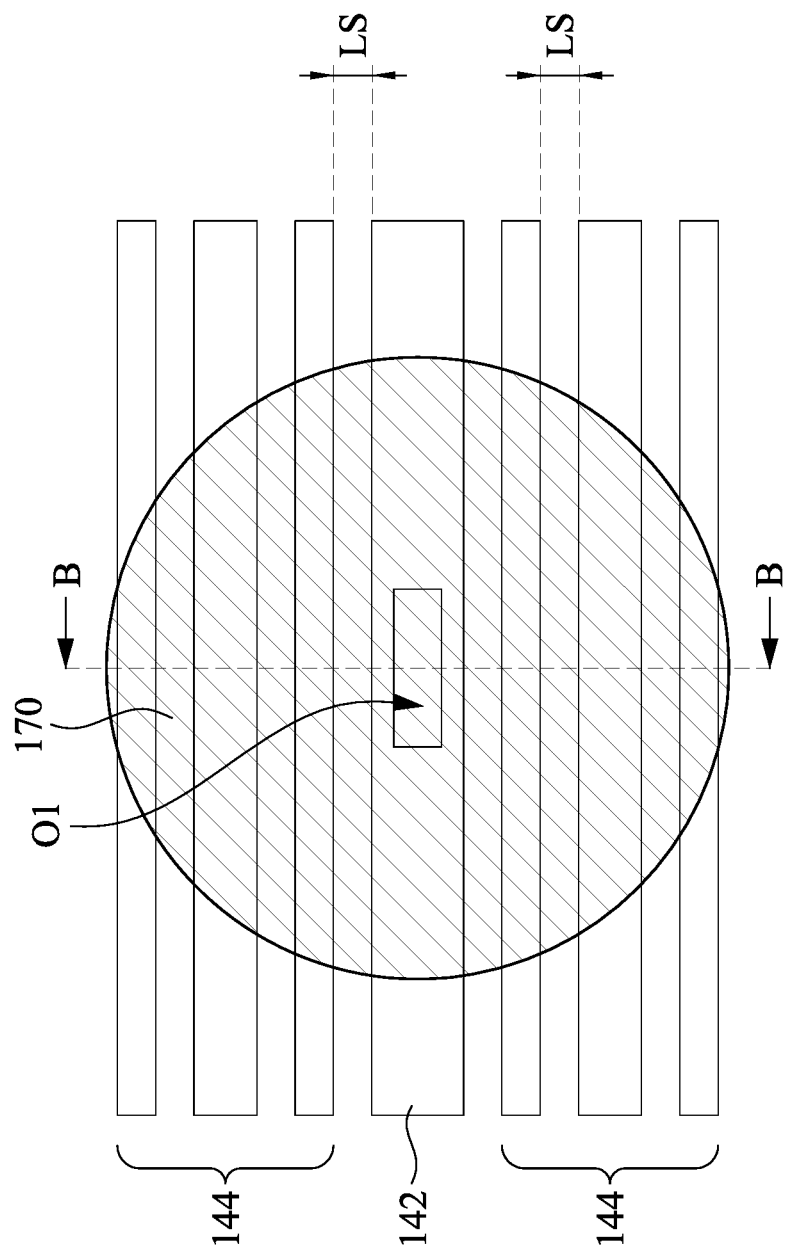
FIG. 2A is a top schematic view of a semiconductor device according to some embodiments of the present disclosure.
Figure 2B:
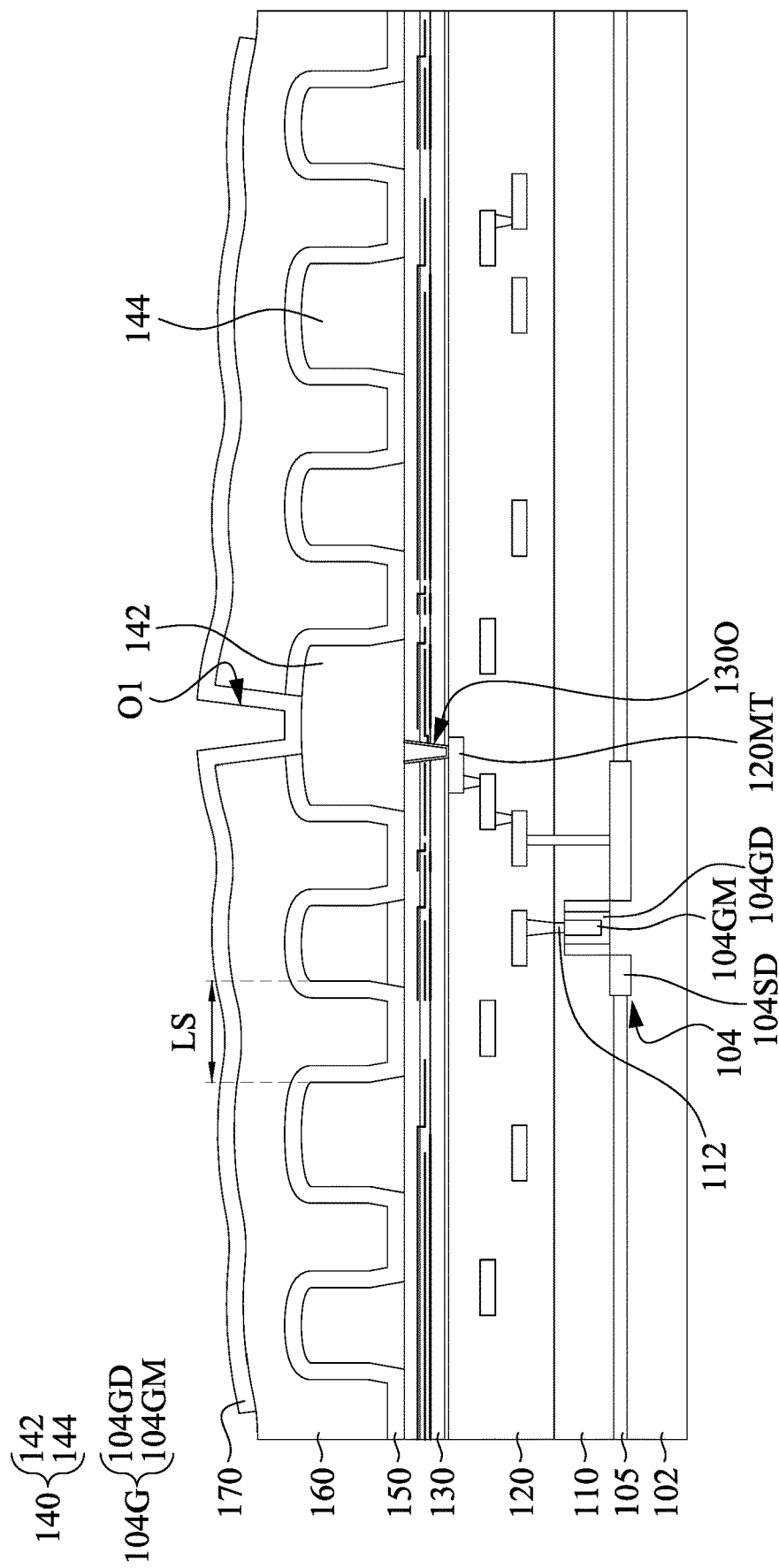
FIG. 2B is a cross-schematic view of the semiconductor device taken along line B-B of FIG. 2A.

FIG. 2A is a top schematic view of a semiconductor device according to some embodiments of the present disclosure. FIG. 2B is a cross-schematic view of the semiconductor device taken along line B-B of FIG. 2A. An opening O1 is formed in the polymer layer 160 and expose a portion of the redistribution line 142 for allowing subsequent bump process. In some embodiments, the opening O1 may be formed by suitable lithography technology and etching processes, such as a dry etch and/or a wet etch process. The portion of the redistribution line 142 exposed by the opening O1 may be referred to as bonding pad. The portion of the redistribution line 142 in the RV hole 1300 and directly contact the top contact region 120MT may be referred to as a RV pad. In the present embodiments, the bonding pad is vertically overlapping with the RV pad. In some alternative embodiments, the bonding pad may not be vertically overlapping with the RV pad, and the redistribution line 142 may vertically extend from the first passivation layer 130 to the second passivation layer 150 and horizontally extend from the RV pad to the bonding pad for pad redistribution.

In some embodiments, after the formation of the opening O1, a under bump metal (UBM) 170 is formed over the polymer layer 160. The UBM 170 may extend into the opening O1 and in electrical connection with the redistribution line 142, thereby being electrically connected to the contact region 120MT of the interconnect structure 120.

Figure 2C:
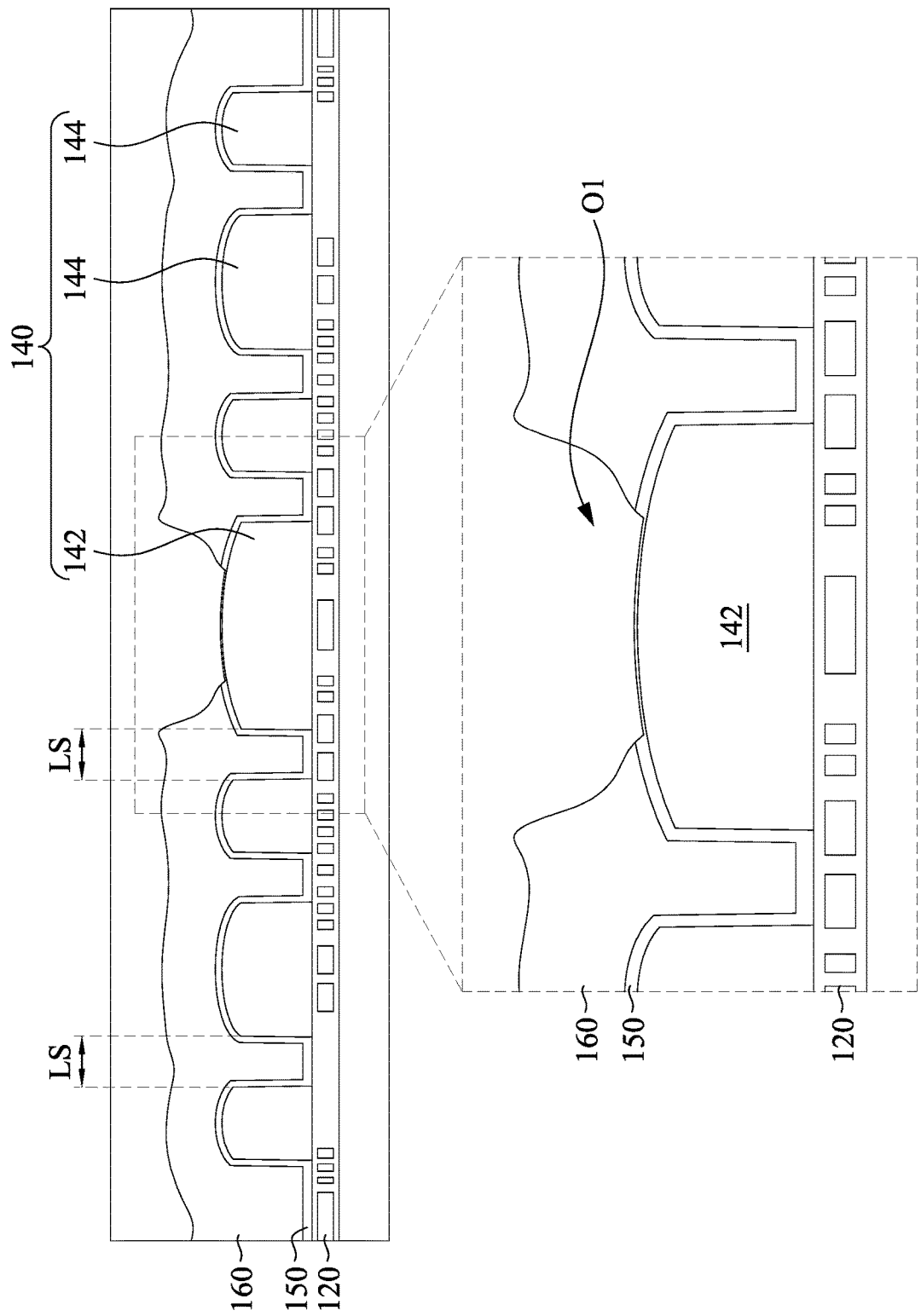
FIG. 2C is a cross-schematic view of a semiconductor device according to some embodiments of the present disclosure.

FIG. 2C is a cross-schematic view of a semiconductor device according to some embodiments of the present disclosure. In FIG. 2C, by the configuration of the dummy redistribution lines 144, the flatness of the topography of the polymer layer 160 is improved. The UBM 170 is omitted from FIG. 2C. The flatness of the topography may increase by decreasing the line space LS between adjacent two of the redistribution lines 142 and 144. In some embodiments, the line space LS between adjacent two of the redistribution lines 142 and 144 may be in a range from about 1 micrometer to about 10 micrometers. If the line space LS is greater than 10 micrometers, it may result in poor surface flatness. If the line space LS is less than 1 micrometers, the redistribution layer may not be fabricated due to process limit. In some embodiments of the present disclosure, a minimum line space may be adopted according to process limit for high surface flatness.

Figure 3:
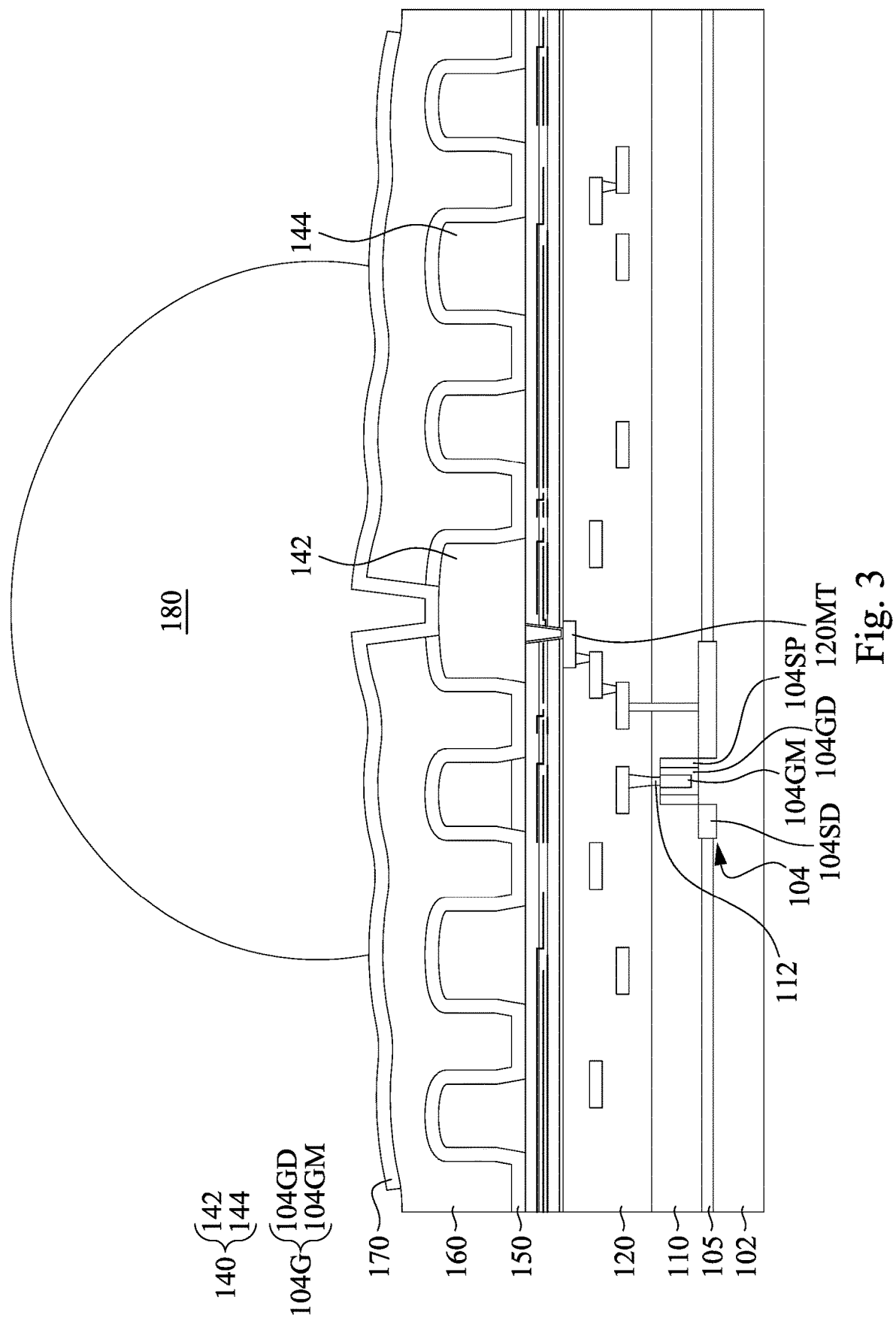
FIG. 3 is a cross-schematic view of the semiconductor device according to some embodiments of the present disclosure.

FIG. 3 is a cross-schematic view of the semiconductor device according to some embodiments of the present disclosure. Conductive connectors 180 are formed on the UBM 170. The conductive connectors 180 may be ball connectors, solder balls, metal pillars, controlled collapse chip connection (C4) bumps, micro bumps, electroless nickel-electroless palladium-immersion gold technique (ENEPIG) formed bumps, or the like. The conductive connectors 180 may include a conductive material such as solder, copper, aluminum, gold, nickel, silver, palladium, tin, the like, or a combination thereof. In some embodiments, the conductive connectors 180 are formed by initially forming a layer of solder through such commonly used methods such as evaporation, electroplating, printing, solder transfer, ball placement, or the like. Once a layer of solder has been formed on the structure, a reflow may be performed in order to shape the material into the desired bump shapes. In another embodiment, the conductive connectors 180 are metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed on the top of the conductive connectors 180. The metal cap layer may include nickel, tin, tin-lead, gold, silver, palladium, indium, nickel-palladium-gold, nickel-gold, the like, or a combination thereof and may be formed by a plating process. In some embodiments of the present disclosure, the configuration of the dummy redistribution lines 144 provides an entire dense and uniform environment, thereby improving the bumping process. For example, the topography of the polymer layer 160 is improved, and the UBM 170 formed over the polymer layer 160 may have a more planar surface for supporting the conductive connectors 180.

Figure 4A:
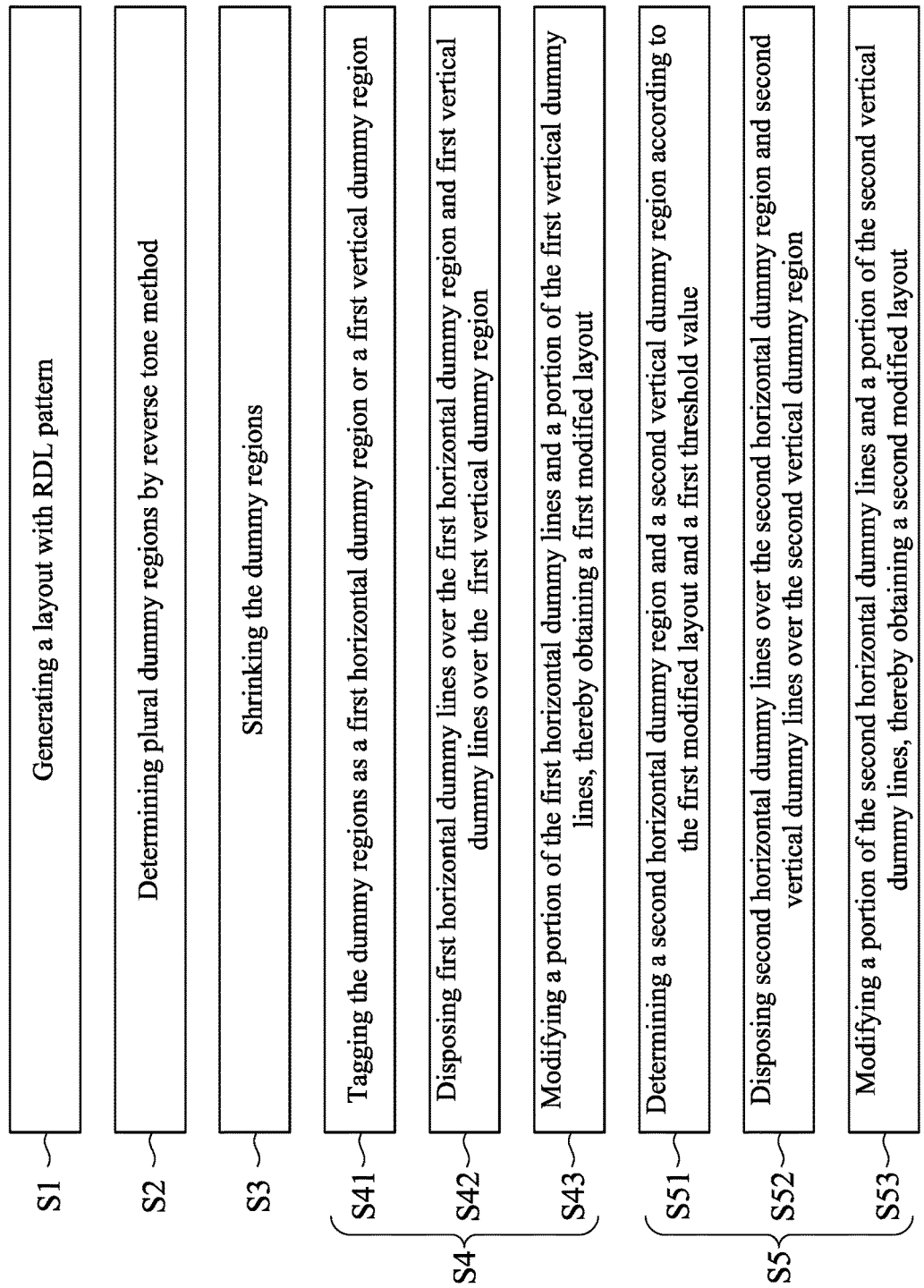
FIGS. 4A and 4B are flow charts of a layout design method according to some embodiments of the present disclosure.
Figure 4B:
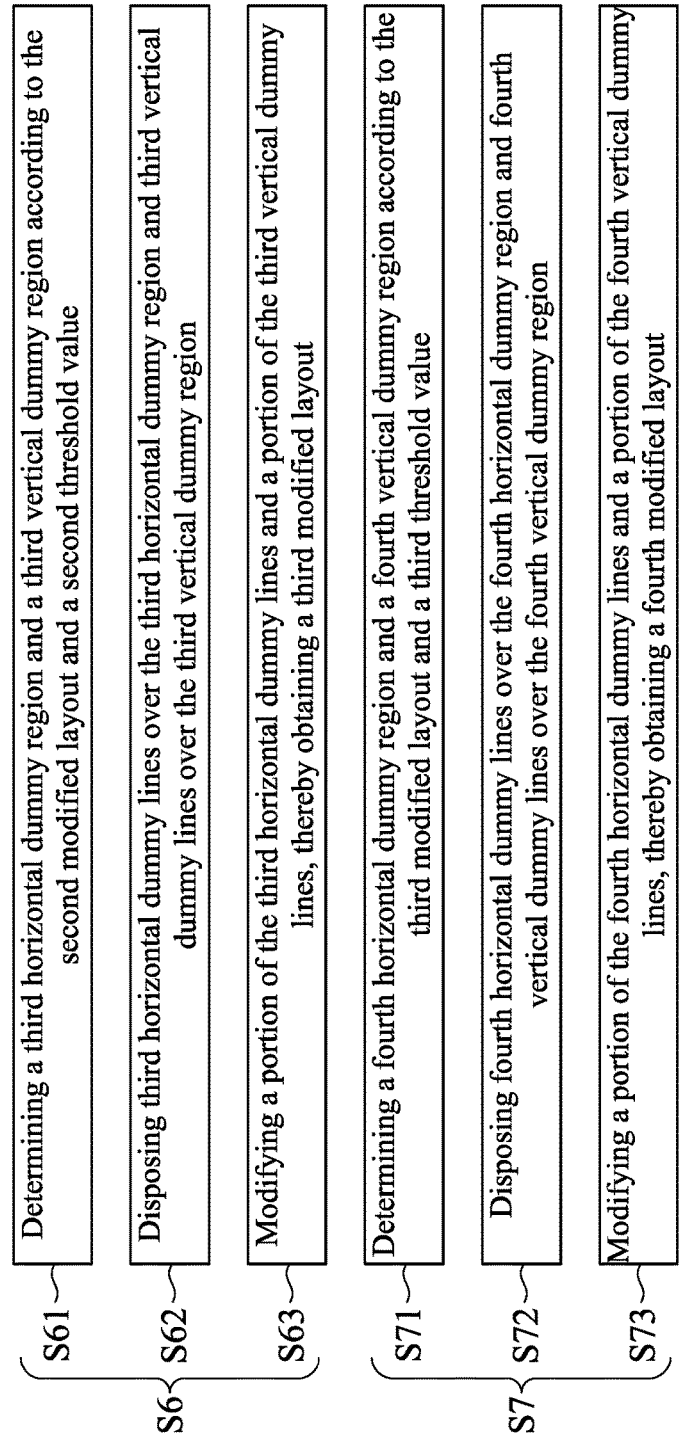

FIGS. 4A and 4B are flow charts of a layout design method M according to some embodiments of the present disclosure. FIGS. 5-19 illustrates an RDL layout at various intermediate stages of a layout design method M according to some embodiments of the present disclosure. The method M includes steps S1-S7. At step S1, a layout with an RDL pattern is generated. At step S2, dummy regions are determined by a reverse tone method. At step S3, the dummy regions are shrunk. The steps S4-S7 are performed to add first to fourth dummy lines to the layout, respectively, in which widths of the first to fourth dummy lines increase in a sequence, and the line of the RDL pattern and the first to fourth dummy lines may be kept from each other by a fixed space (e.g., the minimum line space). The steps S4-S7 may include similar repeating steps. For example, at steps S41, S51, S61, and S71, a horizontal dummy region and a vertical dummy region are determined. At steps S42, S52, S62, and S72, horizontal dummy lines are disposed over the horizontal dummy region, and vertical dummy lines are disposed over the vertical dummy region. At steps S43, S53, S63, and S73, a portion of the horizontal dummy lines and a portion of the vertical dummy lines are modified, thereby obtaining a modified layout. It is understood that additional steps may be provided before, during, and after the steps S1-S7 shown by FIGS. 4A and 4B, and some of the steps described below can be replaced or eliminated for additional embodiments of the method. The order of the operations/processes may be interchangeable.

Figure 5:
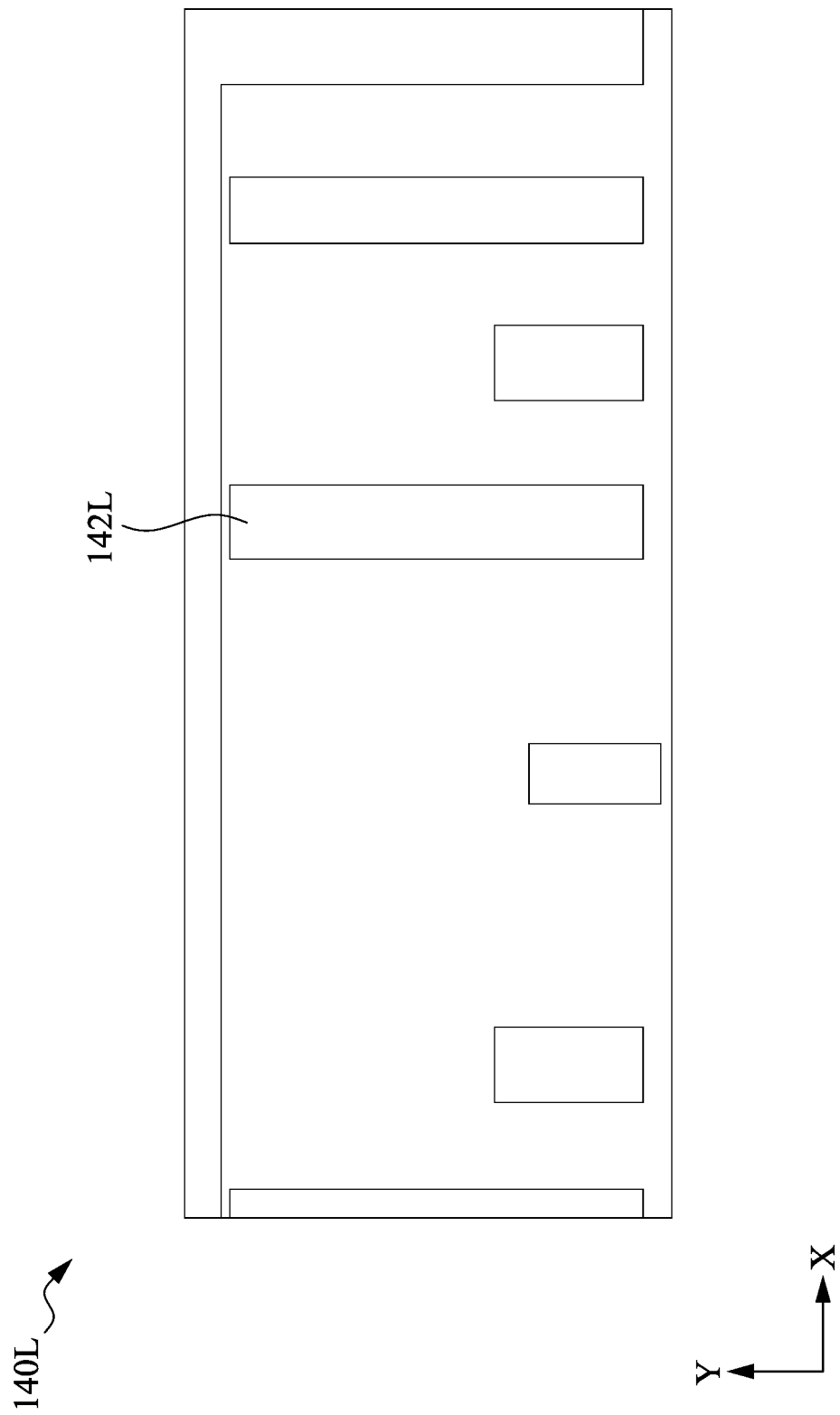
FIGS. 5-19 illustrates a redistribution layer (RDL) layout at various intermediate stages of a layout design method according to some embodiments of the present disclosure.

Reference is made to FIGS. 4A and 5. The method M begins at steps S1, where a layout 140L with an RDL pattern is generated. For example, redistribution lines 142L are arranged in the layout 140L. In some embodiments, a portion of the redistribution lines 142L may extend along a direction X, and another portion of the redistribution lines 142L may extend along a direction Y intersecting the direction X. For example, the direction X is orthogonal to the direction Y.

Figure 6:
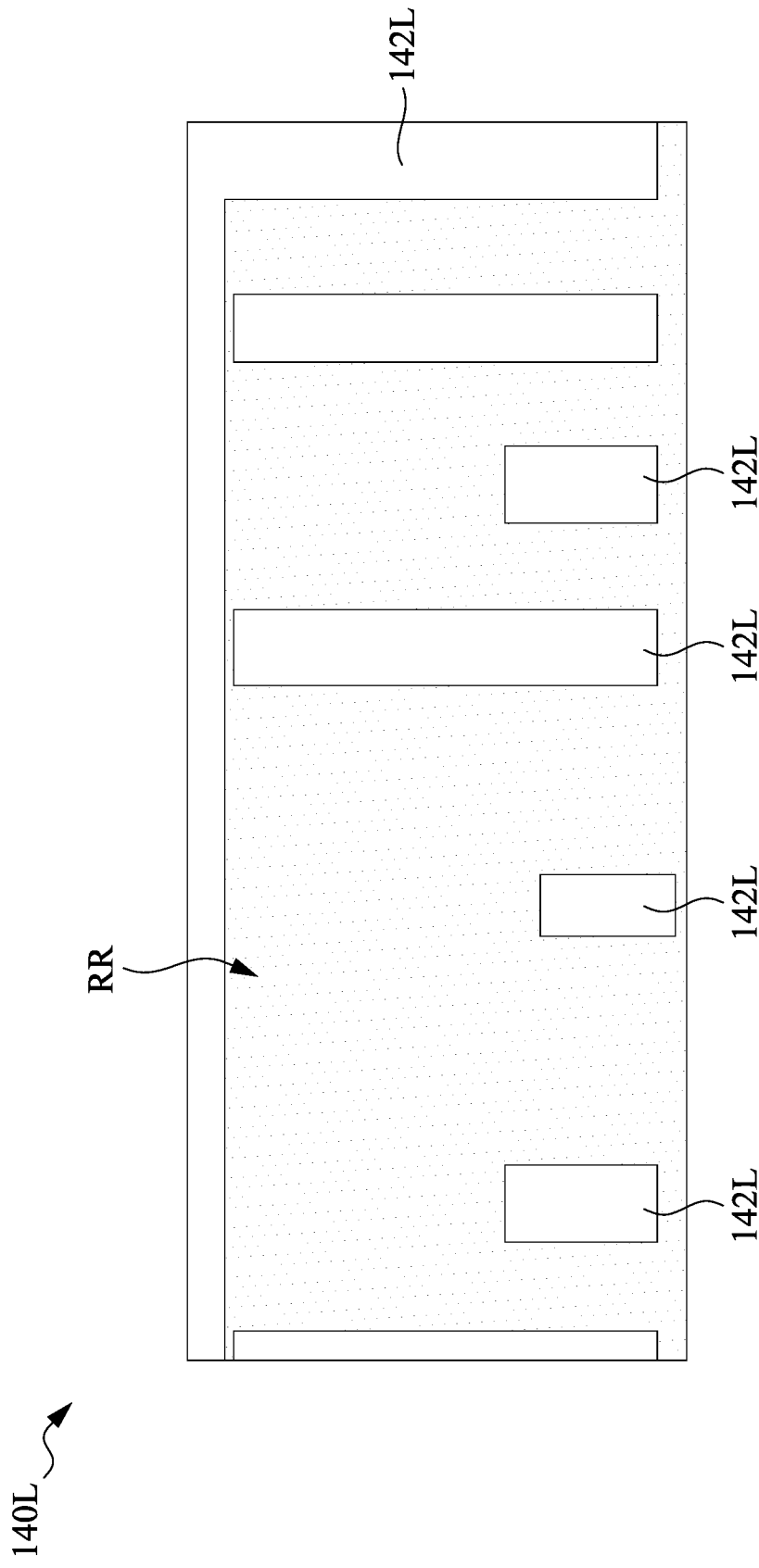

Reference is made to FIGS. 4A and 6. The method M proceeds to step S2, where a dummy region RR are determined by a reverse tone method. For example, the region where the redistribution lines 142L are not disposed is determined as the dummy region RR by the reverse tone method.

Figure 7:
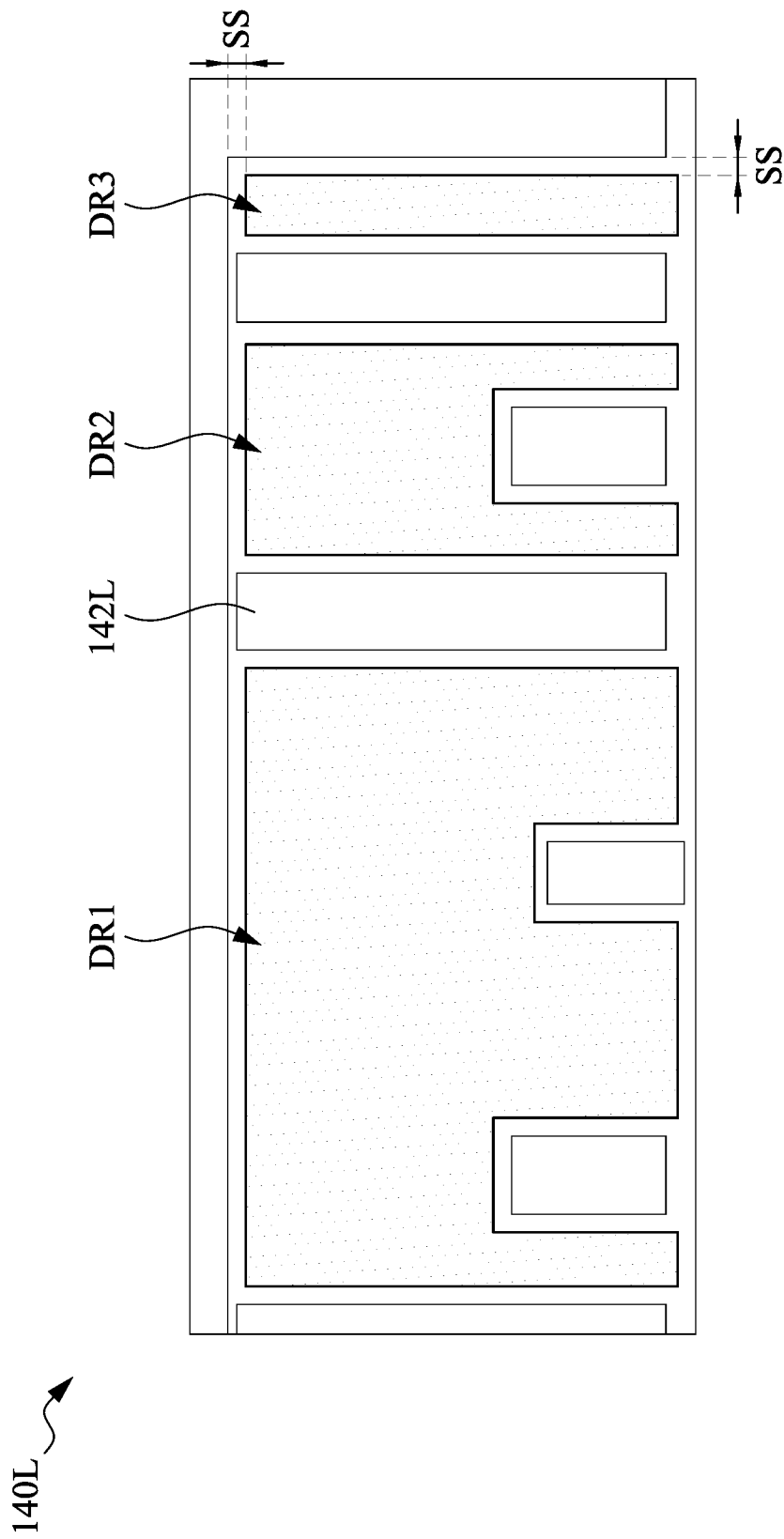

Reference is made to FIGS. 4A and 7. The method M proceeds to step S3, where the dummy regions RR (referring to FIG. 6) are shrunk. In FIG. 7, edges of the dummy regions RR (referring to FIG. 6) are moved away from the redistribution lines 142L by a suitable distance SS, thereby shrinking the dummy regions RR (referring to FIG. 6). The shrunk dummy regions RR (referring to FIG. 6) may be denoted as dummy regions DR1, DR2, and DR3. The shrinking process may divide a dummy region RR (referring to FIG. 6) into plural separated dummy regions DR1, DR2, and DR3 as shown in the figure.

In some embodiments, the distance SS may be in a range from about 1 micrometer to about 10 micrometers. If the distance SS is greater than 10 micrometers, it may result in poor surface flatness. If the distance SS is less than 1 micrometers, the redistribution layer may not be fabricated due to process limit. In some embodiments of the present disclosure, a minimum line space may be adopted according to process limit for high surface flatness. In some embodiments, the distance SS may be equal to the line space LS (referring to FIGS. 1A and 1B).

Reference is made to FIGS. 4A and 8A-8C. The method M proceeds to step S41, where the dummy regions DR1, DR2, and DR3 are tagged as a first horizontal dummy region (e.g., the region $1DR1_H$) or a first vertical dummy region (e.g., the regions $1DR2_V$ and $1DR3_V$).

Figure 8A:
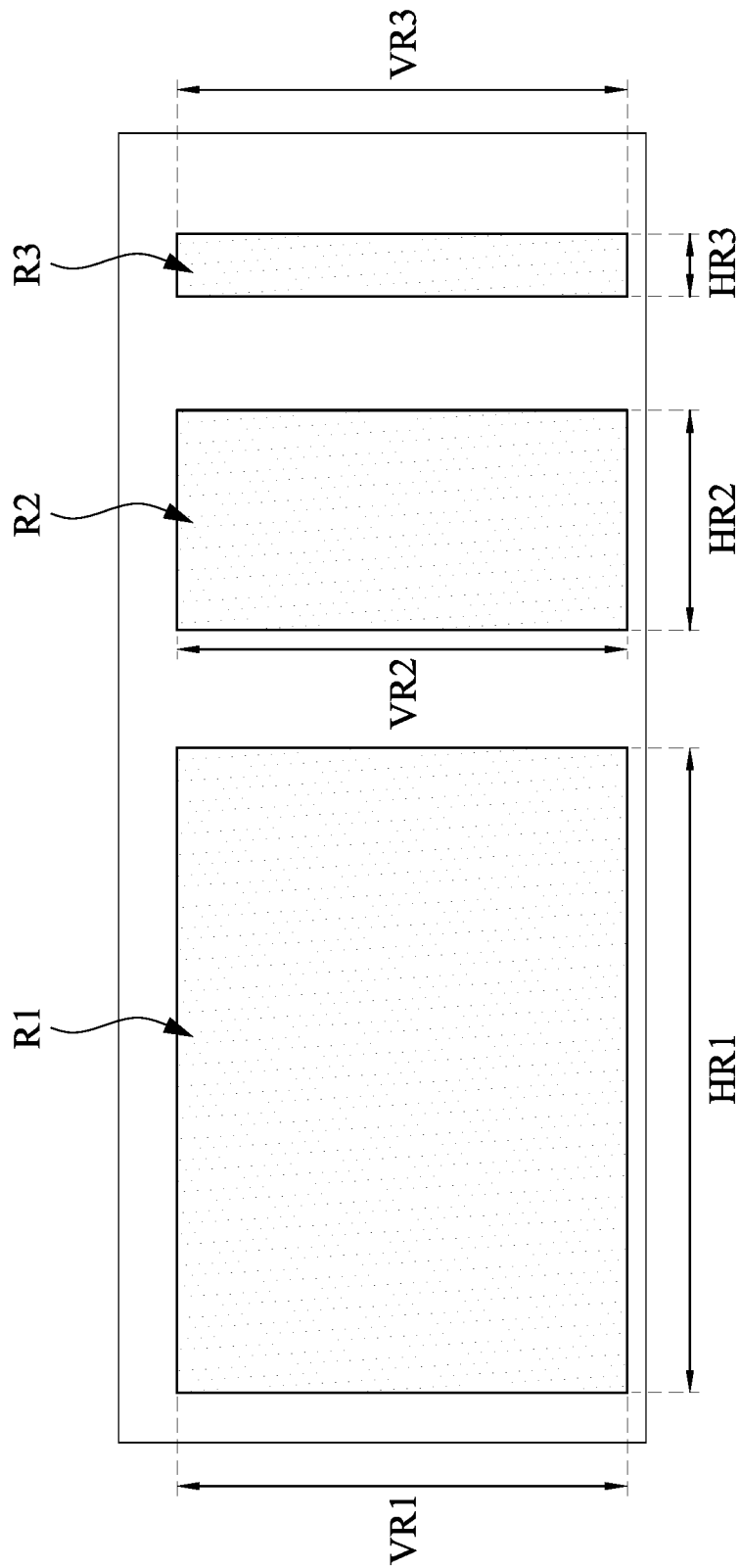

In FIG. 8A, each of the individual dummy regions DR1, DR2, and DR3 (referring to FIG. 7) is used to generate a rectangular region. For example, a topmost edge, a bottommost edge, a leftmost edge, and a rightmost edge of the dummy regions DR1, DR2, and DR3 (referring to FIG. 7) are used as four sides of the rectangular regions R1, R2, and R3, respectively.

In the present embodiments, a ratio of a vertical dimension to a horizontal dimension of the rectangular regions R1, R2, and R3 (denoted as vertical to horizontal ratio hereinafter) is used to identify the rectangular regions R1, R2, and R3 as horizontal/vertical regions. In some examples, when the vertical to horizontal ratio of the rectangular regions R1, R2, and R3 is greater than a determined value (e.g., about 1), the rectangular regions R1, R2, and R3 is identified as a vertical region. In some other examples, when the vertical to horizontal ratio of the rectangular regions R1, R2, and R3 is less than about the determined value (e.g., about 1), the rectangular regions R1, R2, and R3 is identified as a horizontal region. In still some other examples, when the vertical to horizontal ratio of the rectangular regions R1, R2, and R3 is equal to the determined value (e.g., about 1), the rectangular regions R1, R2, and R3 is identified as a vertical region or horizontal region depending on design requirement.

Figure 8B:
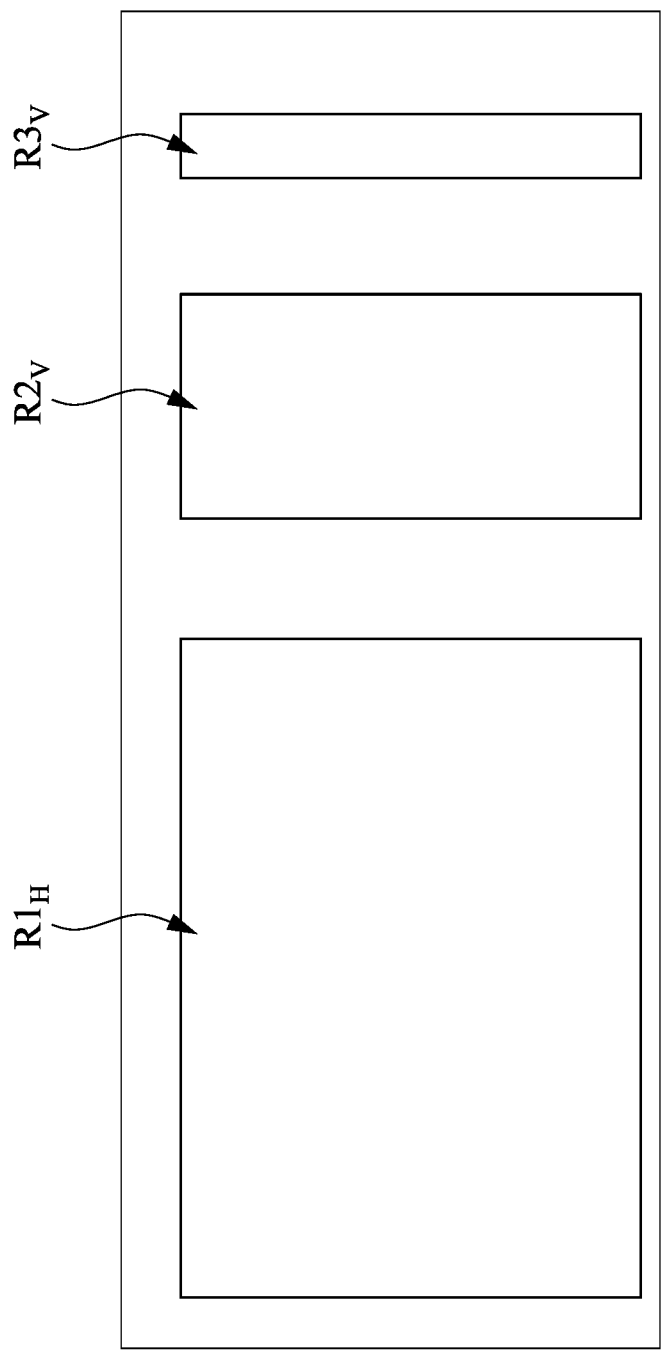

For example, when a vertical dimension VR1 of the rectangular region R1 is less than a horizontal dimension HR1 of the rectangular region R1, the vertical to horizontal ratio is less than 1, and therefore the rectangular region R1 is tagged as a horizonal region $R1_H$ as shown in FIG. 8B. For example, when a vertical dimension VR2 of the rectangular region R2 is greater than a horizontal dimension HR2 of the rectangular region R2, the vertical to horizontal ratio is greater than 1, and therefore the rectangular region R2 is tagged as vertical region $R2_V$ as shown in FIG. 8B. For example, when a vertical dimension VR3 of the rectangular region R3 is greater than a horizontal dimension HR3 of the rectangular region R3, the vertical to horizontal ratio is greater than 1, and therefore the rectangular region R3 is tagged as region $R3_V$ as shown in FIG. 8B.

Figure 8C:
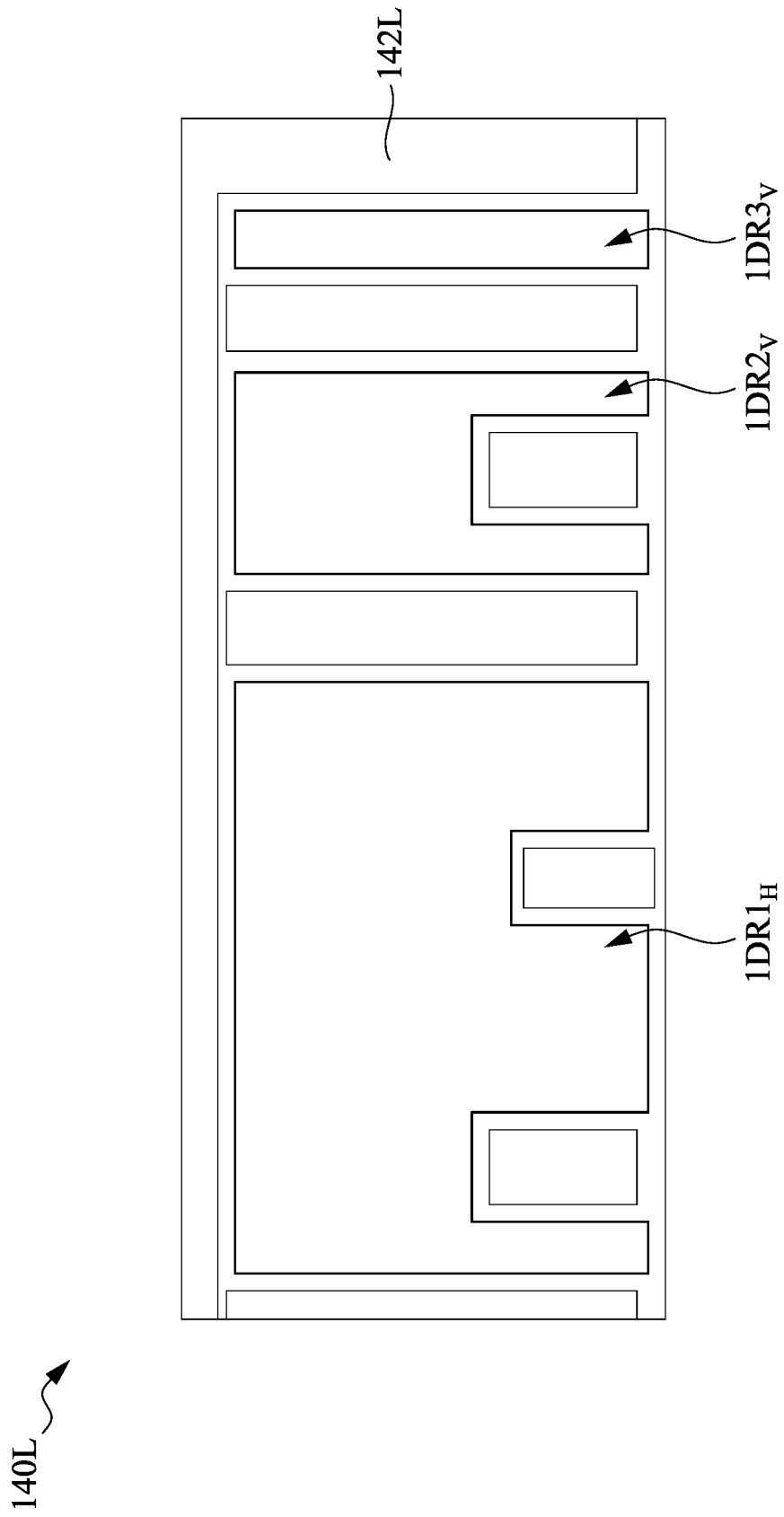

In FIG. 8C, according the tagging result as shown in FIG. 8B, the dummy regions DR1, DR2, and DR3 in the layout 140L are tagged as first dummy regions $1DR1_H$, $1DR2_V$, and $1DR3_V$, respectively.

Reference is made to FIGS. 4A and 9A-9C. The method M proceeds to step S42, where first horizontal dummy lines are disposed over the first horizontal dummy region, and first vertical dummy lines are disposed over the first vertical dummy region.

Figure 9A:
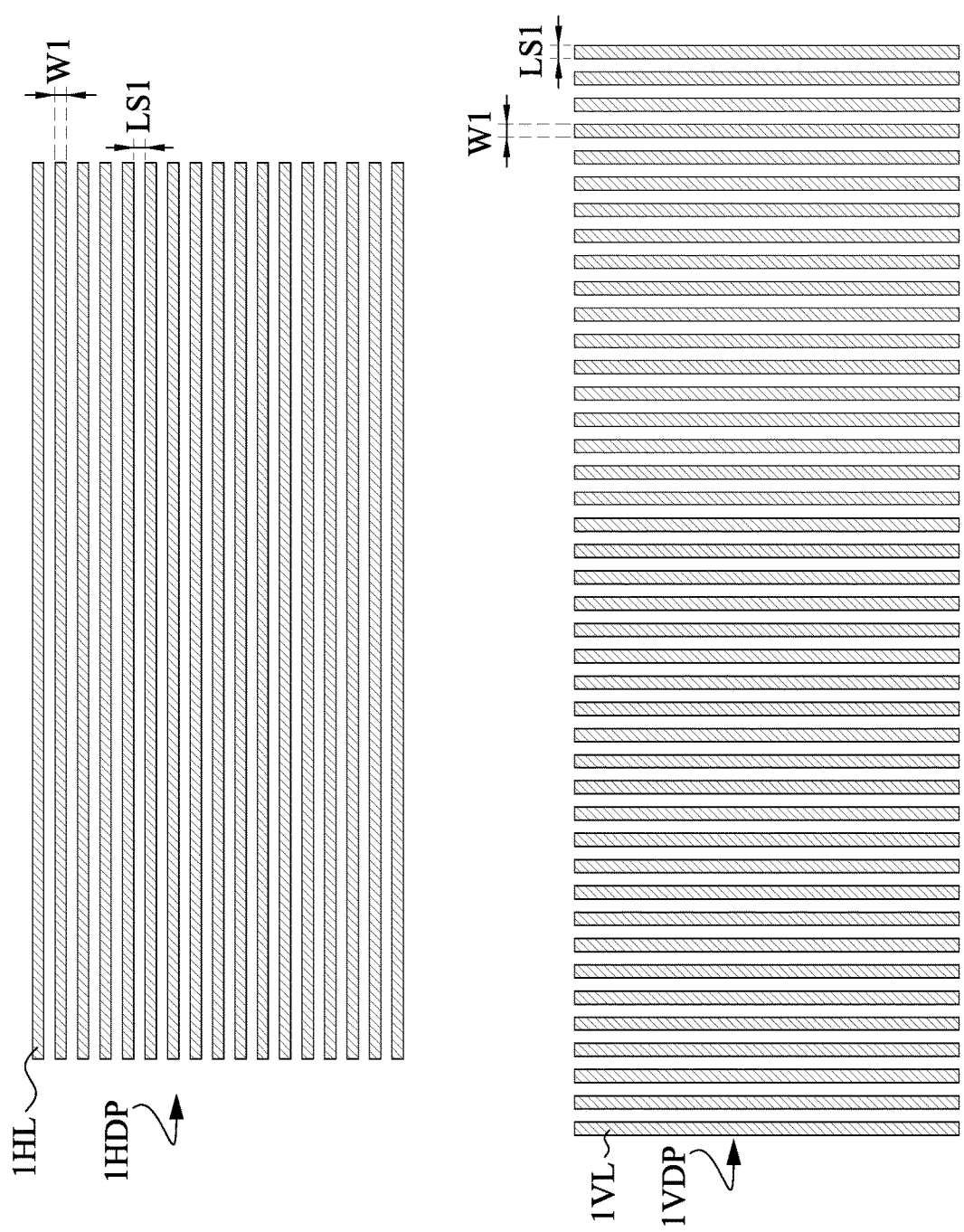

In FIG. 9A, a horizontal dummy pattern 1HDP and a vertical dummy pattern 1VDP are prepared. The horizontal dummy pattern 1HDP includes plural horizontal dummy lines 1HL. The vertical dummy pattern 1VDP includes plural vertical dummy lines 1VL. The horizontal dummy lines 1HL may have a suitable width W1 and spaced from each other by the line space LS1. The vertical dummy lines 1VL may have a suitable width W1 and spaced from each other by the line space LS1. The line space LS1 may be in a range from about 1 micrometer to about 10 micrometers. In some embodiments of the present disclosure, a minimum line space may be adopted according to process limit for high surface flatness. The width W1 may be comparable to the line space LS1. For example, the width W1 may be in a range from about 1 micrometer to about 10 micrometers. In some embodiments, the width W1 may be equal to the line space LS1. In the present embodiments, the widths of the horizontal dummy lines 1HL (e.g., the width W1) are the same as the widths of the vertical dummy lines 1VL (e.g., the width W1), and the line space between the horizontal dummy lines 1HL (e.g., the line space LS1) is the same as the line space between the vertical dummy lines 1VL (e.g., the line space LS1). In some alternative embodiments, the widths of the horizontal dummy lines 1HL may be different from the widths of the vertical dummy lines 1VL, and the line space between the horizontal dummy lines 1HL may be different from the line space between the vertical dummy lines 1VL.

Figure 9B:
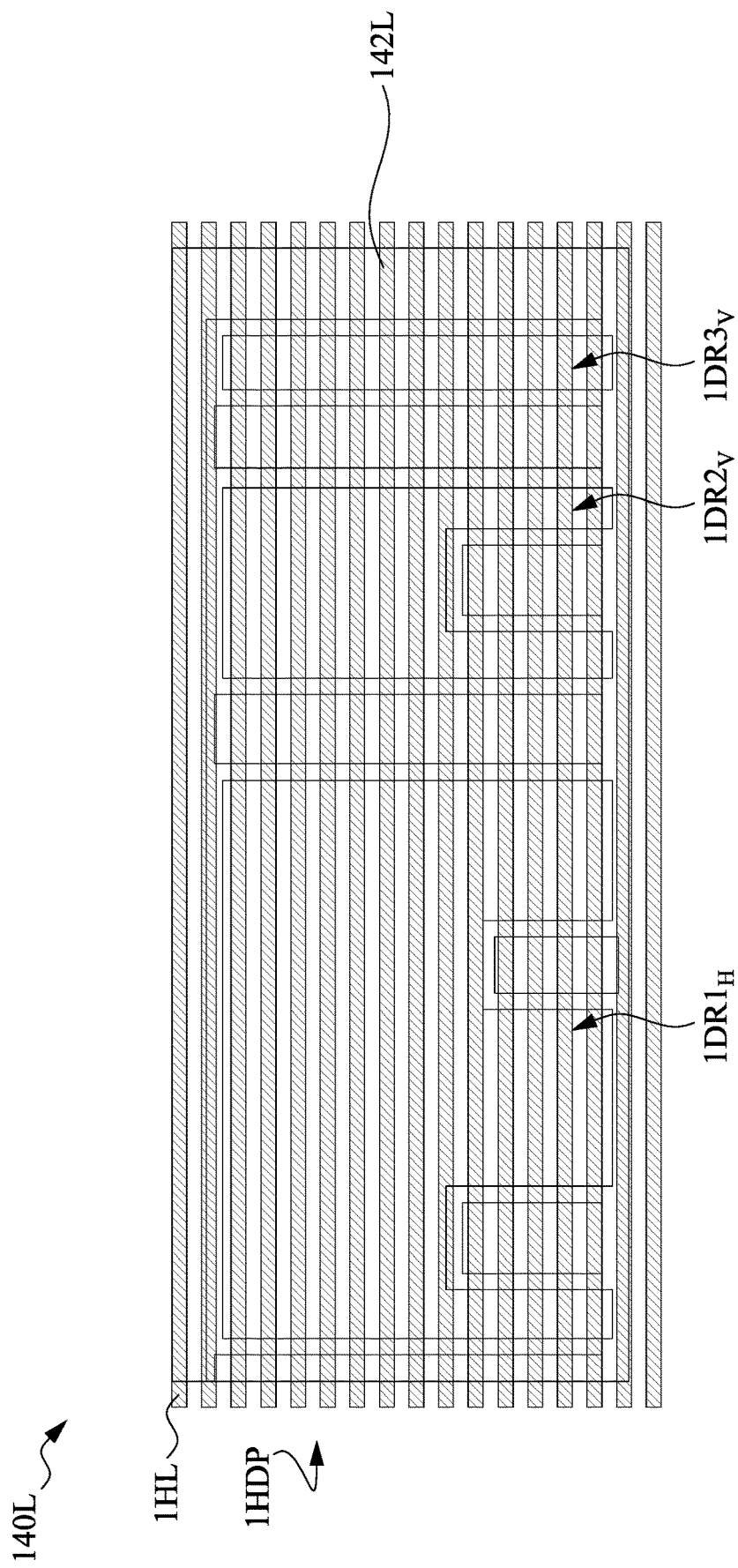

In FIG. 9B, the horizontal dummy pattern 1HDP is put on the layout 140L, and an intersection area of the horizontal dummy pattern 1HDP and the horizontal dummy region (e.g., the first dummy regions $1DR1_H$ in FIG. 8C) are acquired. By acquiring the intersection area, the horizontal dummy lines 1HL fitting the horizontal dummy region (e.g., the first dummy regions $1DR1_H$) are left on the layout 140L as shown in FIG. 9D.

Figure 9C:
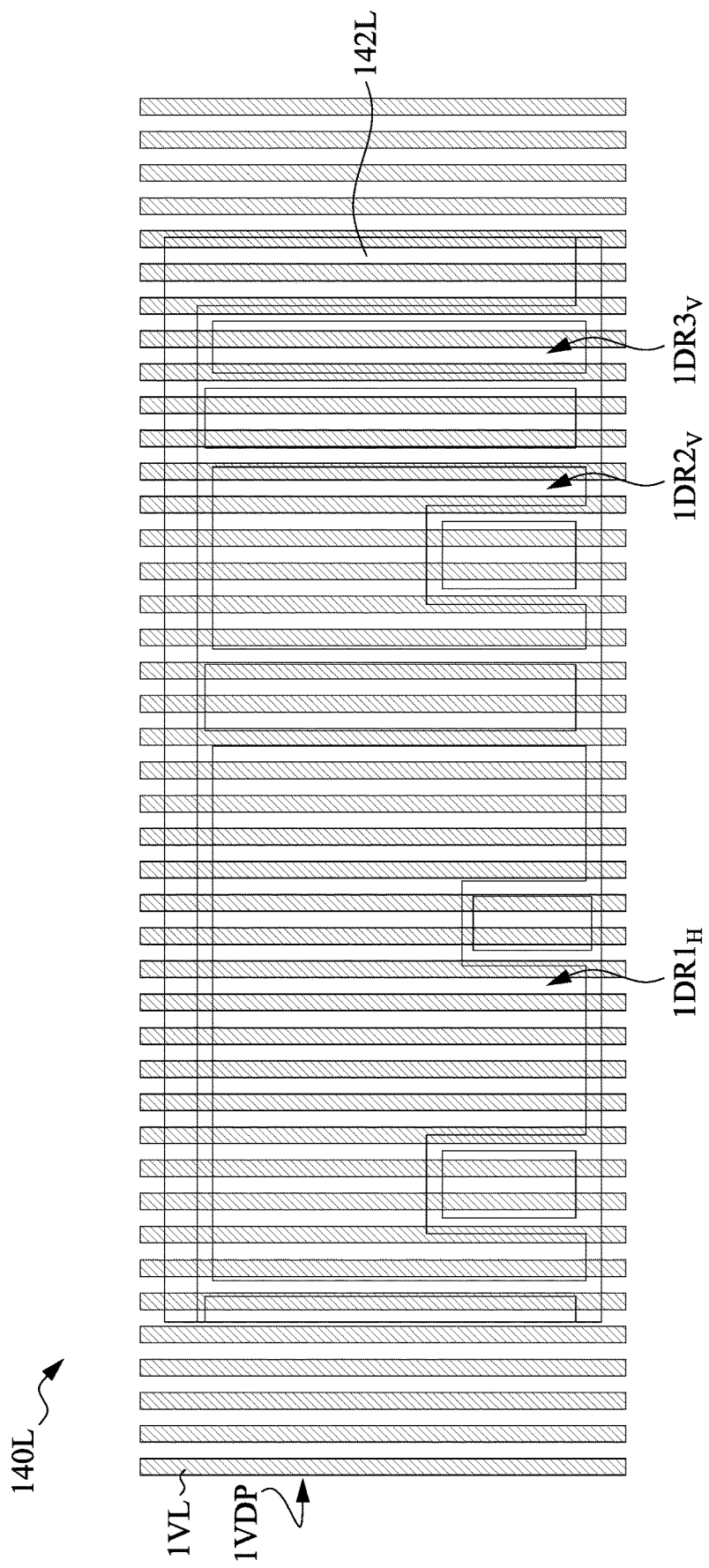

In FIG. 9C, the vertical dummy pattern 1VDP is put on the layout 140L, and an intersection area of the vertical dummy pattern 1VDP and the vertical dummy region (e.g., the first dummy regions $1DR2_V$ and $1DR3_V$ in FIG. 8C) are acquired. By acquiring the intersection area, the vertical dummy lines 1VL fitting the vertical dummy region (e.g., the first dummy regions $1DR2_V$ and $1DR3_V$ in FIG. 8C) are left on the layout 140L as shown in FIG. 9D.

Reference is made to FIGS. 4A and 10A-10G. The method M proceeds to step S43, where a portion of the first horizontal dummy lines 1HL and a portion of the first vertical dummy lines 1VL are modified, thereby obtaining a first modified layout 140L1. The modification may include a series of steps. After the modification, some unsatisfied first horizontal dummy lines 1HL (referring to FIG. 9D) are turned into modified first horizontal dummy line; and some unsatisfied first vertical dummy lines 1VL (referring to FIG. 9D) are turned into modified first vertical dummy line.

Figure 9D:
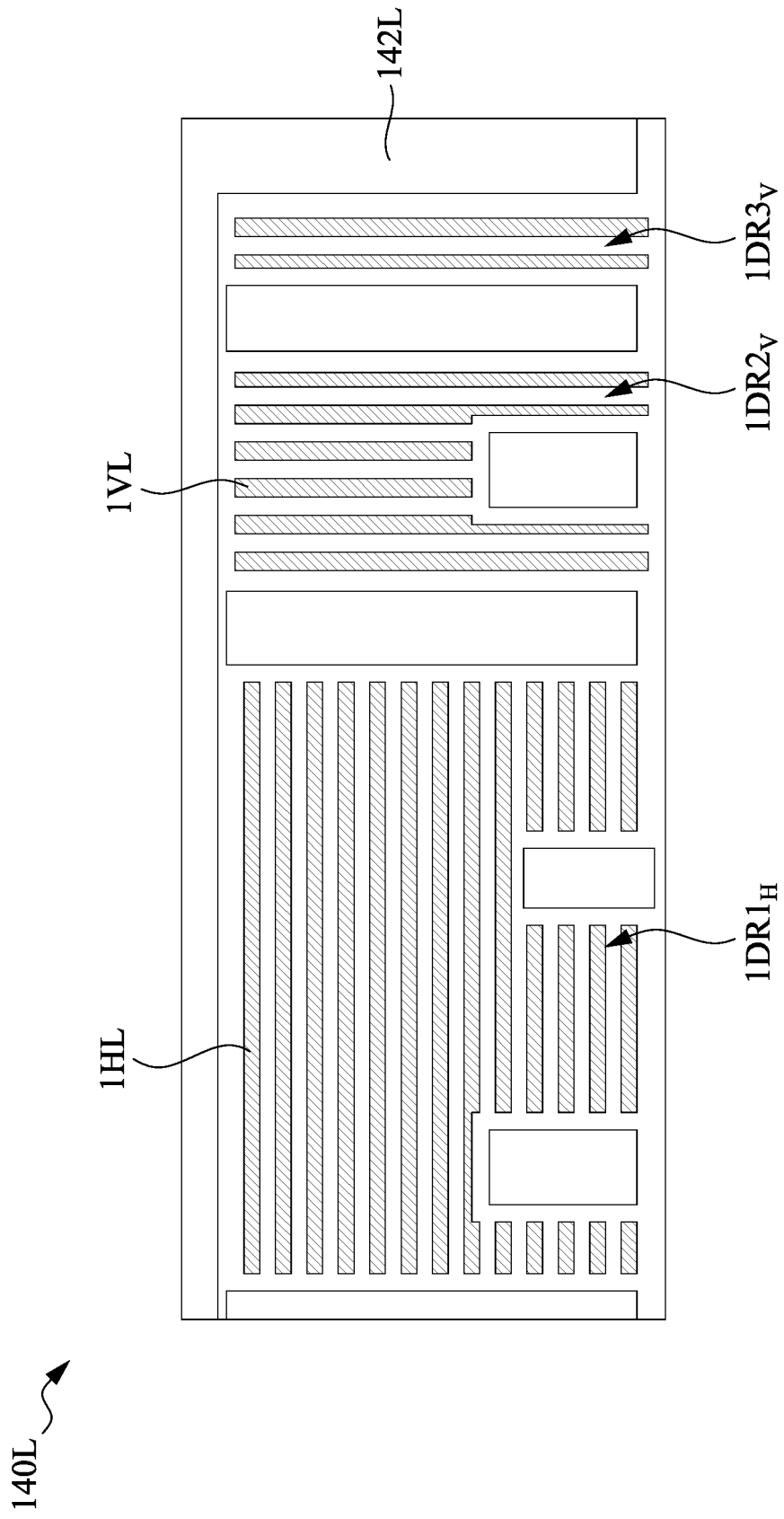
Figure 10A:
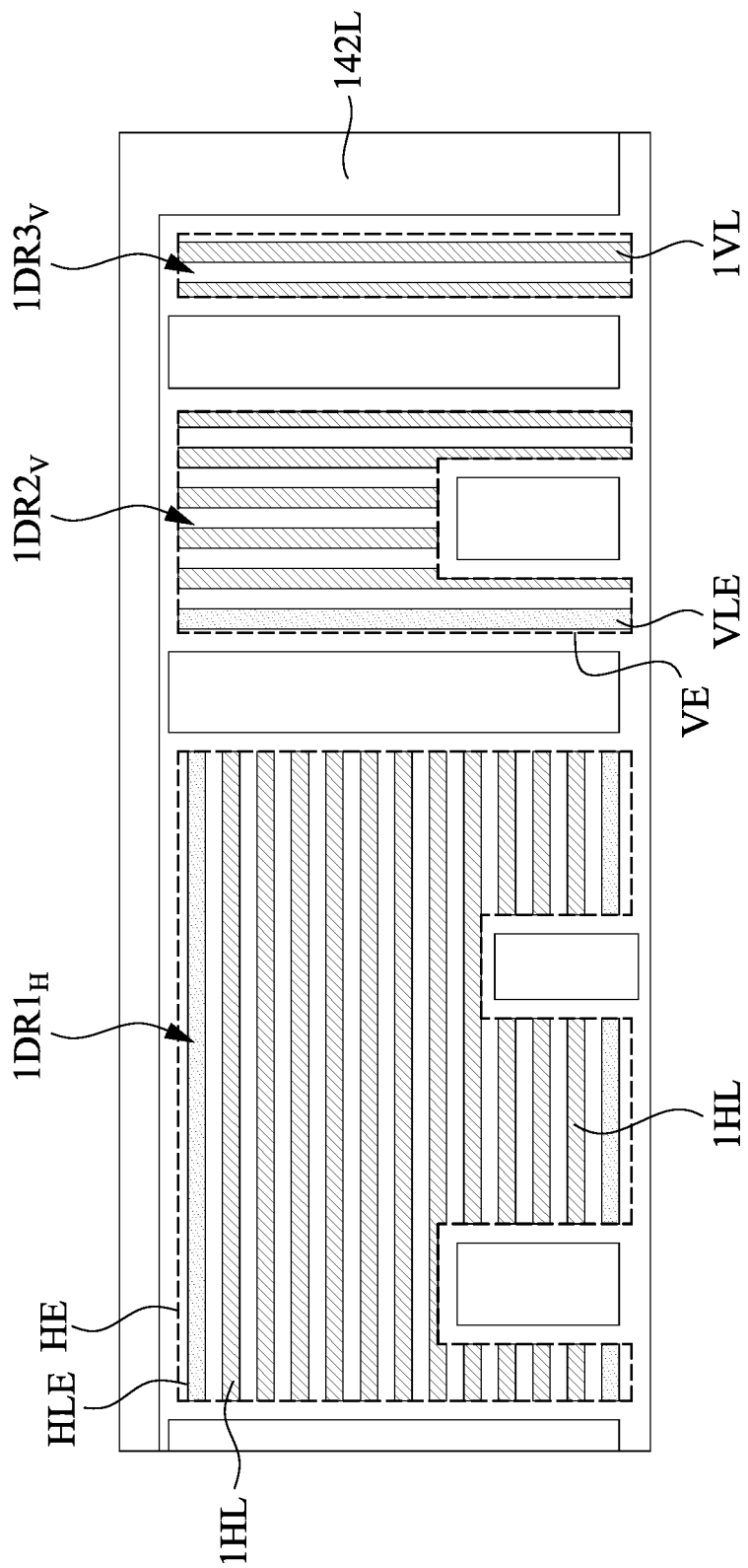
Figure 10B:
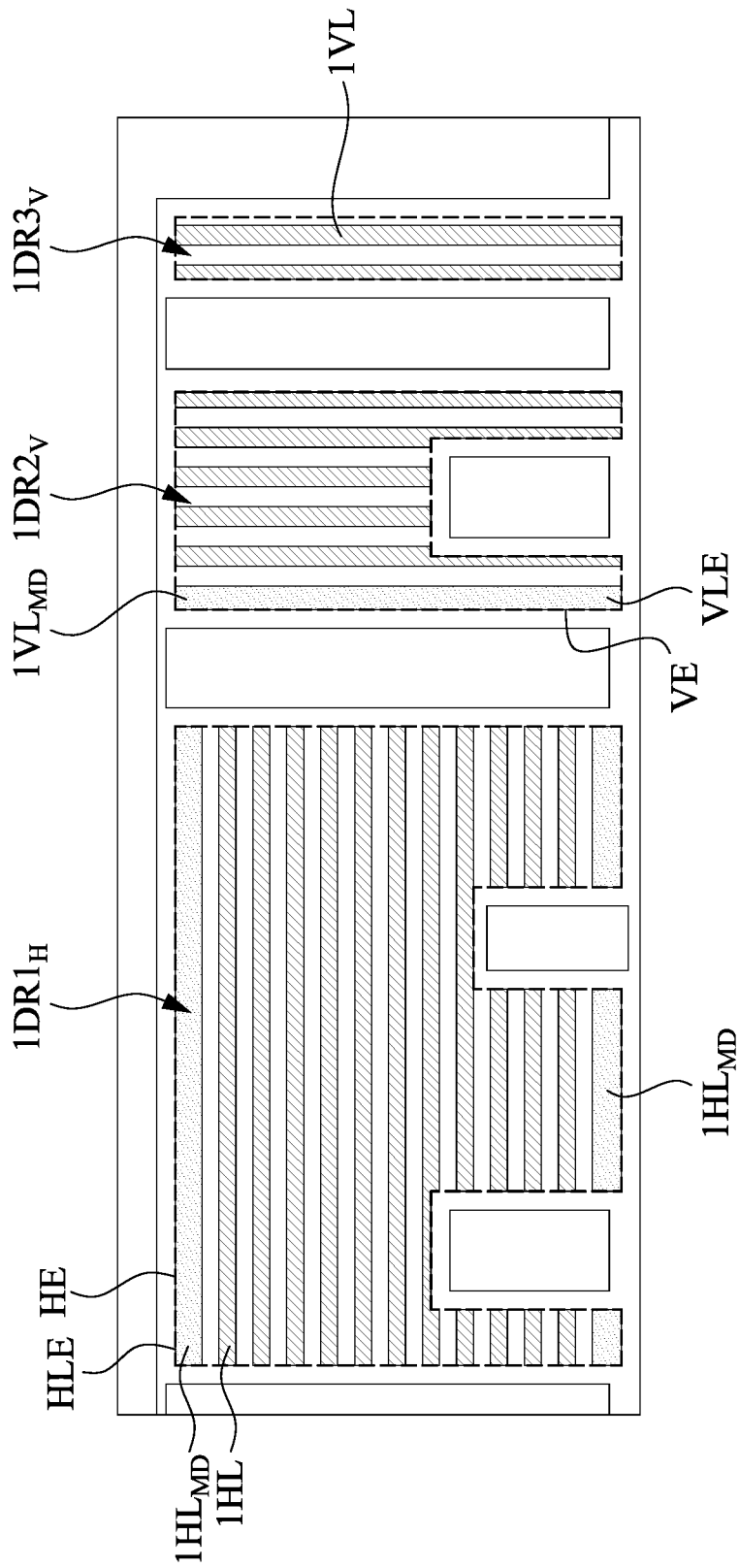

In the layout 140L in FIG. 9D, some outermost/edgemost dummy lines may not meet the edges of the dummy region, leaving a large space between the dummy lines and the redistribution lines 142L, which may result in poor topography of the polyimide layer. FIGS. 10A and 10B show a first modification process for modifying these outermost/edgemost dummy lines.

In FIG. 10A, the outermost/edgemost ones of the first horizontal dummy lines 1HL and the first vertical dummy lines 1VL which does not meet edges of the dummy region, are tagged. The tagged dummy lines are filled with a hatch pattern in the figure. For example, a horizontal edge HLE of the tagged first horizontal dummy lines 1HL does not meet a horizontal edge HE of the first horizontal dummy region $1DR1_H$. For example, a vertical edge VLE of the tagged first vertical dummy lines 1VL does not meet a vertical edge VE of the first vertical dummy region $1DR2_V$.

In FIG. 10B, the horizontal edge HLE of the tagged first horizontal dummy lines 1HL is adjusted to meet/align with the horizontal edge HE of the first horizontal dummy region $1DR1_H$. Also, the vertical edge VLE of the tagged first vertical dummy lines 1VL is adjusted to meet/align with the vertical edge VE of the first vertical dummy region $1DR2_V$. Through the adjustment, the space between the dummy lines and the redistribution lines 142L is equal to the distance SS (referring to FIG. 7), thereby keeping a minimum distance for improving the topography of the polyimide layer. After the edge modification, the modified first horizontal/vertical dummy lines 1HL/1VL are denoted as first horizontal/vertical dummy lines 1HL$_{MD}$/1VL$_{MD}$.

Figure 10C:
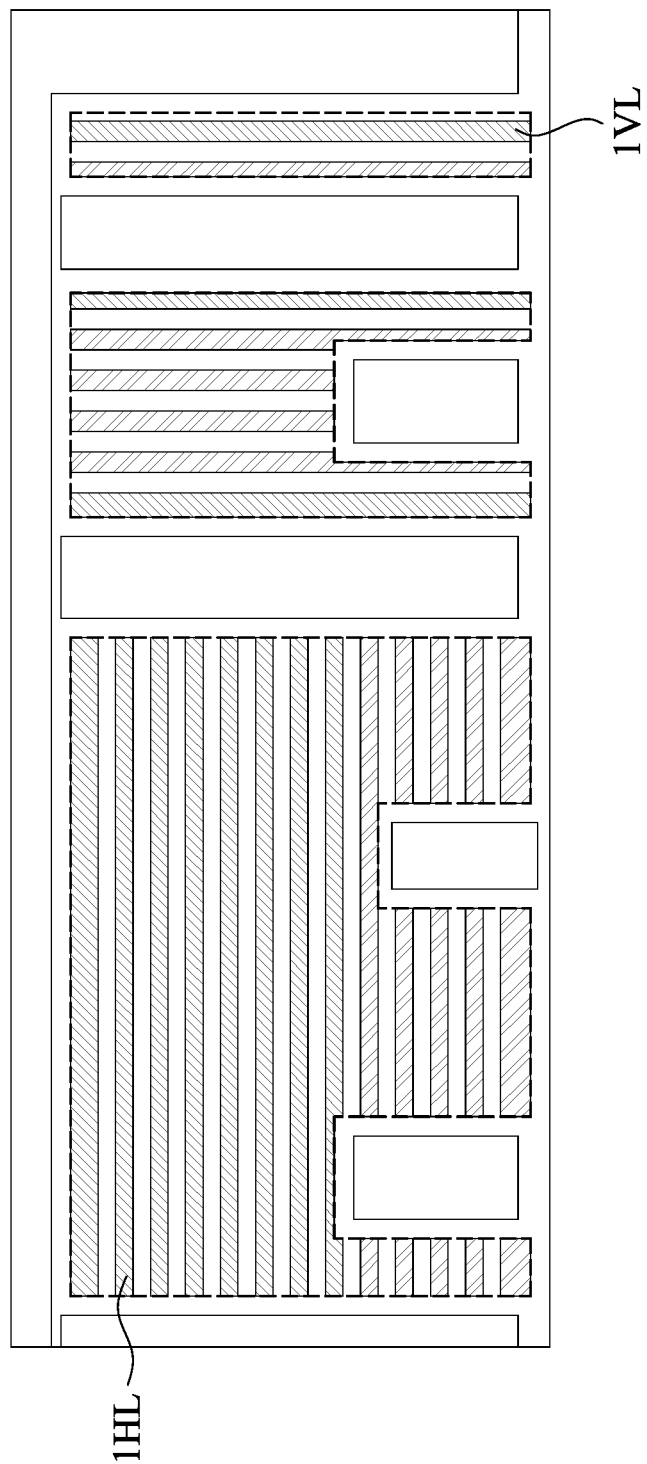
Figure 10D:
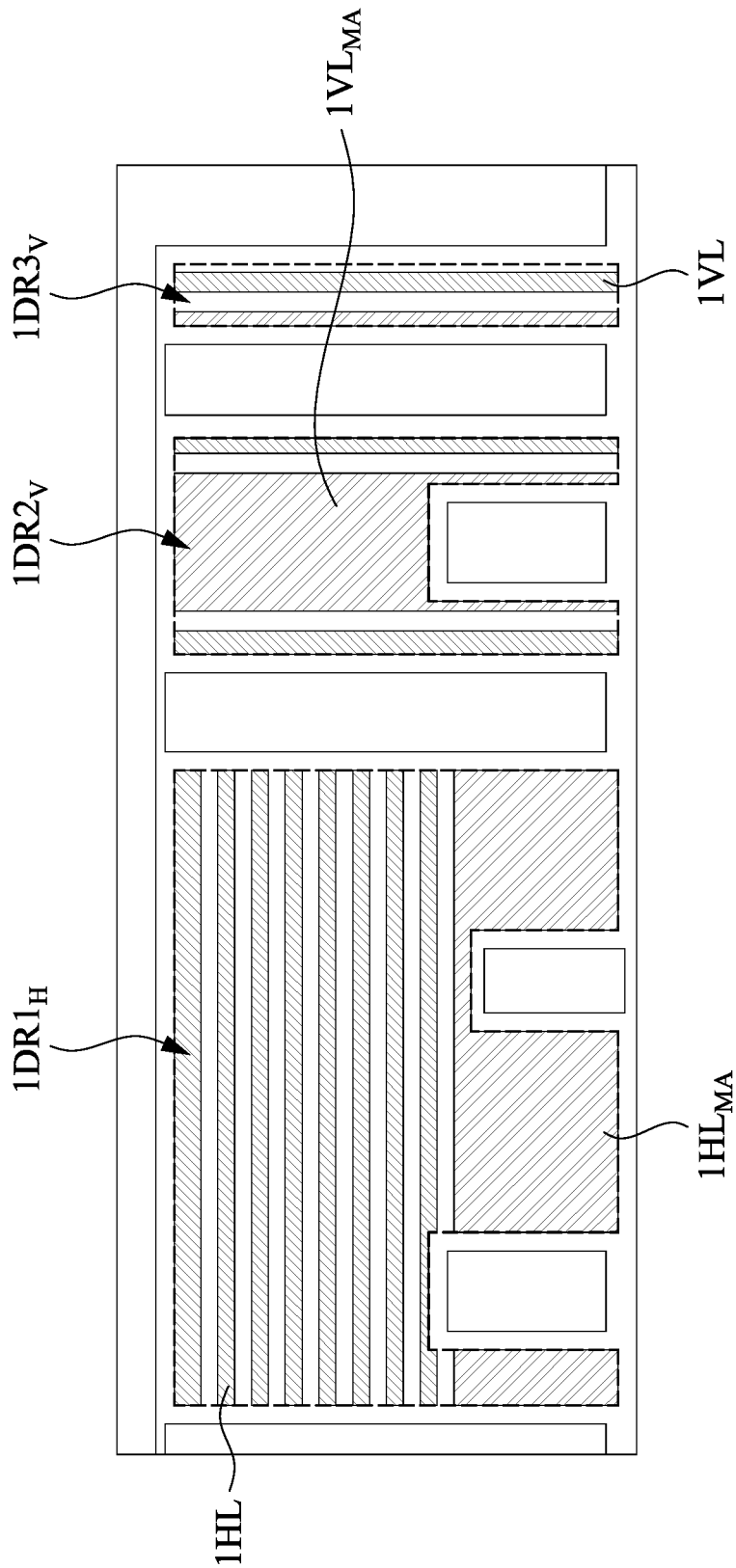
Figure 10E:
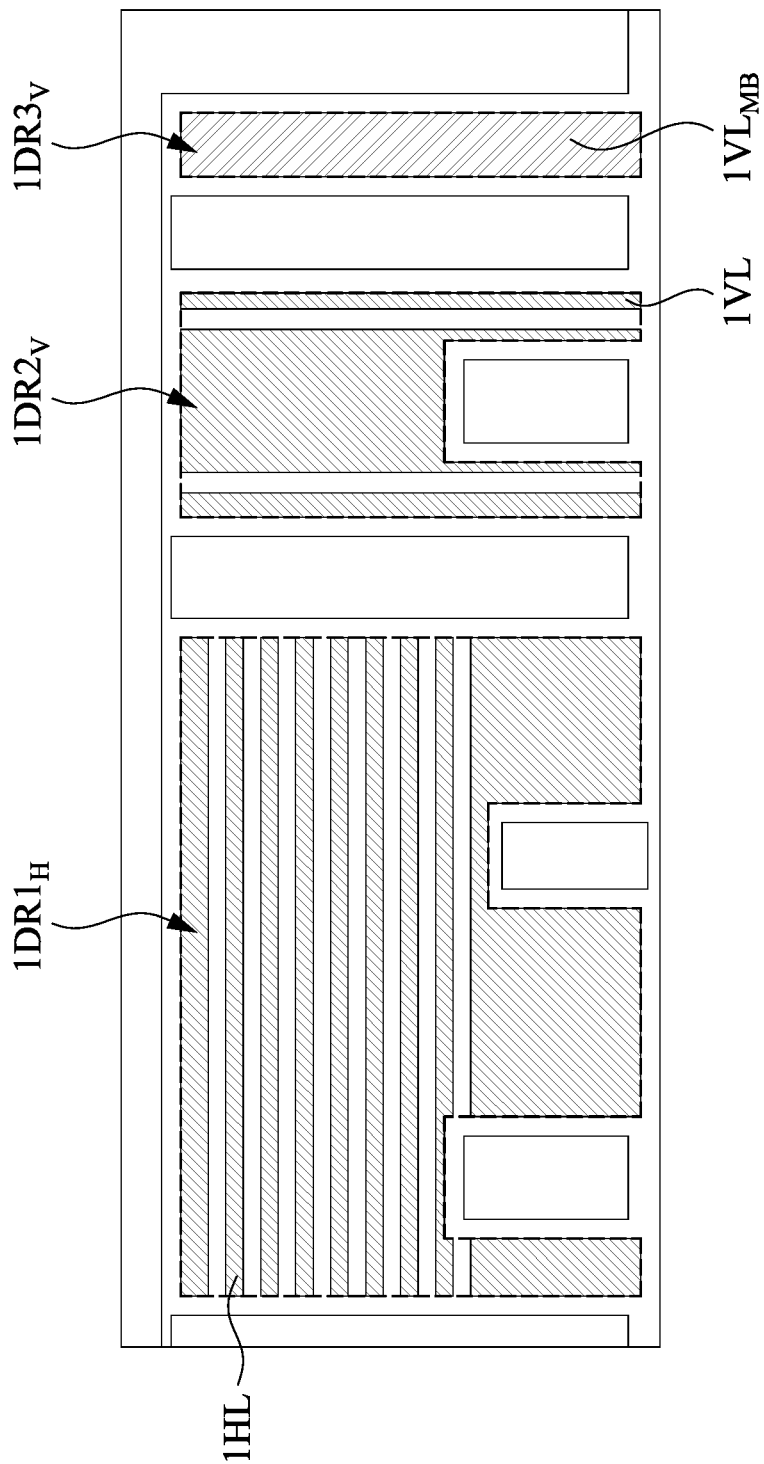

Subsequently, FIGS. 10C-10E show a second modification process for eliminating undersized dummy lines. In FIG. 10C-10E, the undersized dummy lines are merged with neighboring dummy lines for enlarging their sizes.

In FIG. 10C, the first horizontal dummy lines 1HL and the first vertical dummy lines 1VL having an area less than a first threshold value, are tagged. The tagged dummy lines are filled with a hatched pattern in the figure. The first threshold value may be determined according to the width W1. In some embodiments, the first threshold value may be a result of multiplying the width W1 by a suitable length. For example, the suitable length may be in a range of about 15 micrometers to about 25 micrometers.

In FIG. 10D, the tagged first horizontal dummy lines 1HL neighboring each other are merged, thereby enlarging their sizes. Also, the tagged first vertical dummy lines 1VL neighboring each other are merged, thereby enlarging their sizes. For example, in the region 1DR1$_V$, the tagged first horizontal dummy lines 1HL are merged. In the region 1DR2$_V$, the tagged first vertical dummy lines 1VL are merged. At the stage, the tagged dummy lines are not merged with the untagged dummy lines. For example, in region 1DR3$_V$, the tagged first vertical dummy line 1VL is not merged with the untagged first vertical dummy lines 1VL. After the merge modification illustrated FIG. 10D, the merged first horizontal/vertical dummy lines 1HL/1VL are denoted as first horizontal/vertical dummy lines 1HL$_{MA}$/1VL$_{MA}$.

In FIG. 10E, after the merge modification illustrated FIG. 10D, the tagged first horizontal dummy lines 1HL still having an area less than the first threshold value is merged with an untagged first horizontal dummy lines 1HL. Also, the tagged first vertical dummy lines 1VL still having an area less than the first threshold value is merged with an untagged neighboring first vertical dummy lines 1VL. For example, in the region 1DR3$_V$, the tagged first vertical dummy line 1VL is merged with the untagged first vertical dummy lines 1VL. After the merge modification illustrated FIG. 10E, the merged first horizontal/vertical dummy lines 1HL/1VL are also denoted as first horizontal/vertical dummy lines 1HL$_{MB}$/1VL$_{MB}$.

Figure 10F:
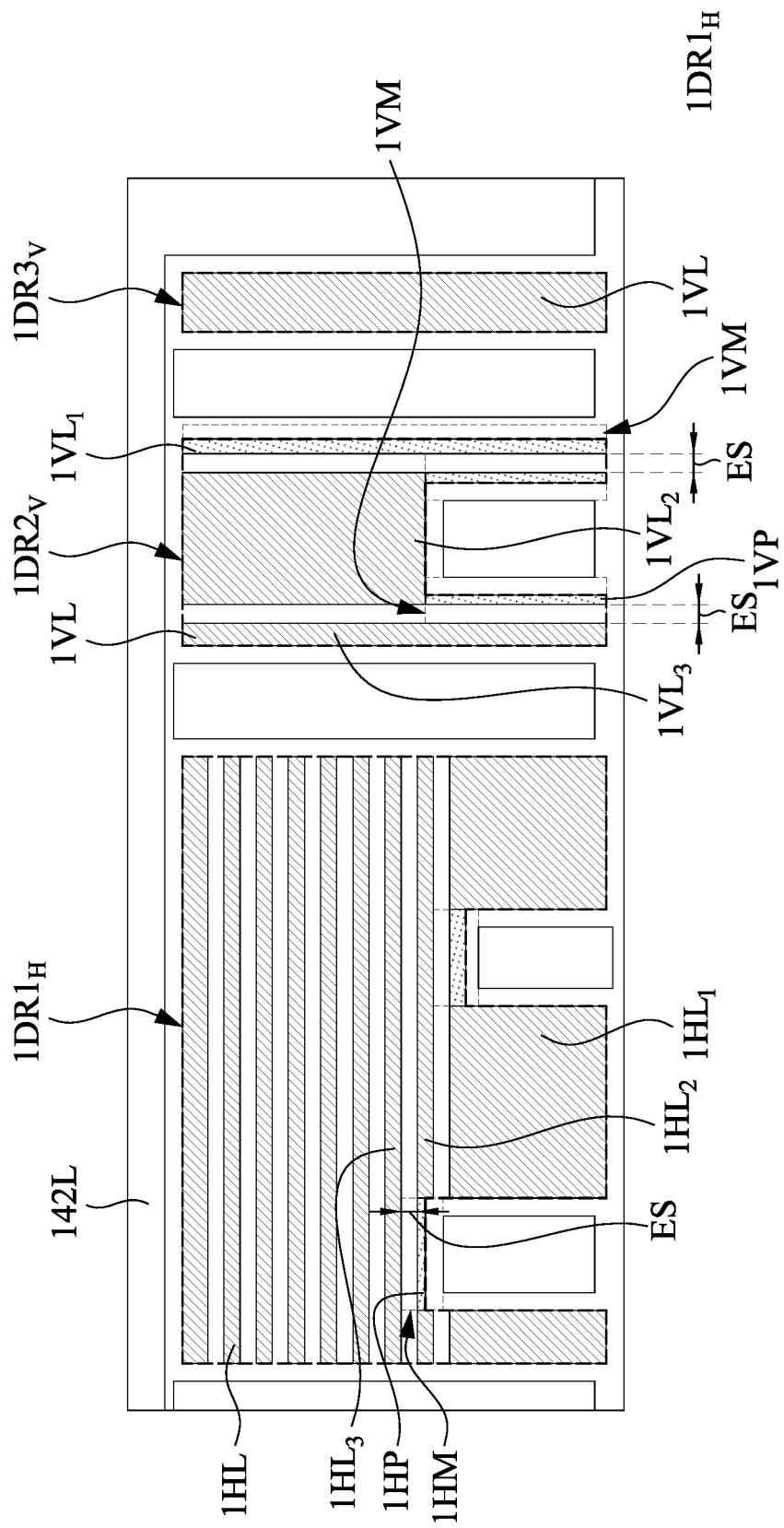
Figure 10G:
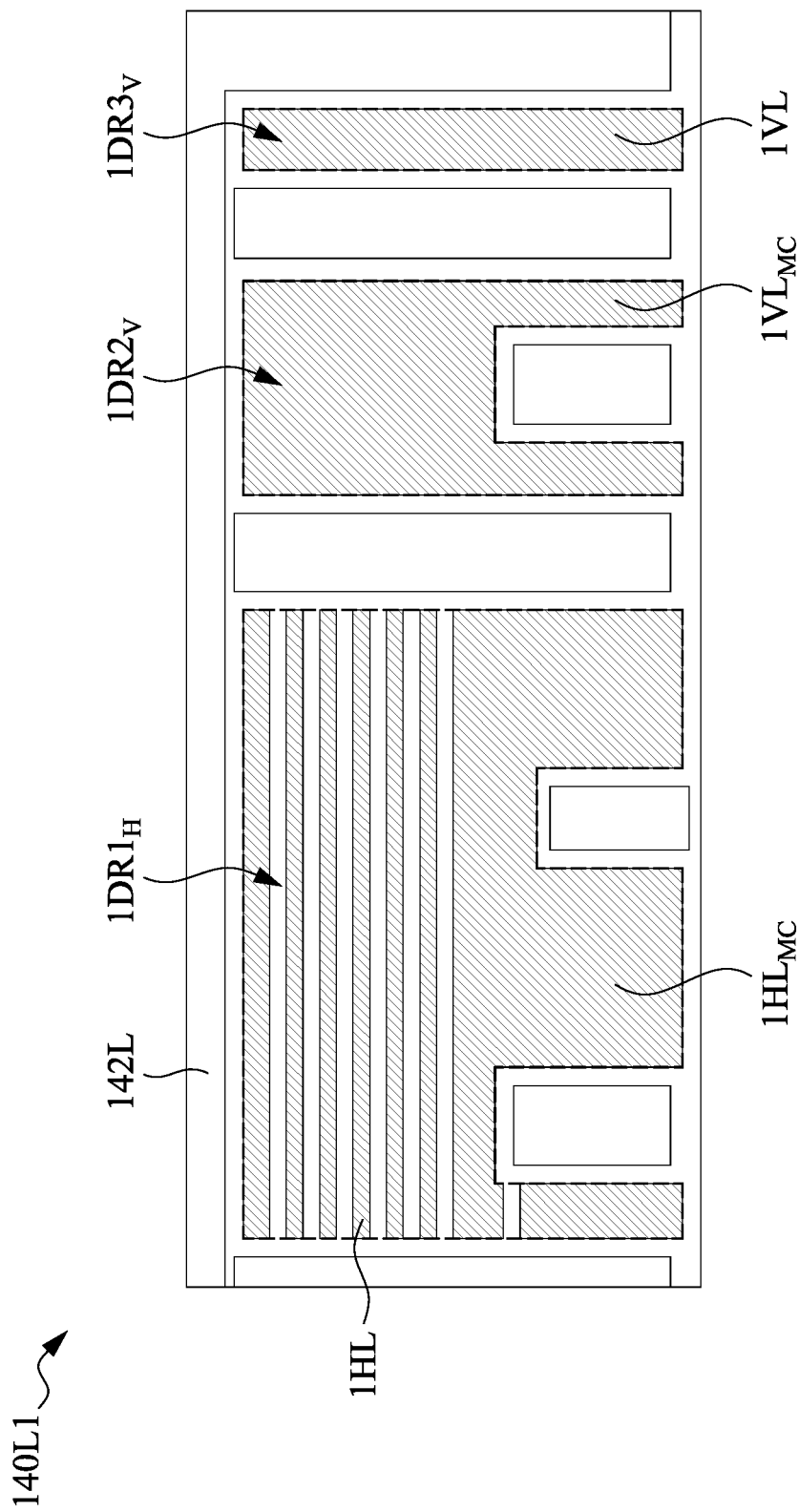

Then, FIGS. 10F-10G show a third modification process for eliminating the dummy line having a portion that is too narrow. In FIG. 10F-10G, the dummy line having the too-narrow portion are merged with neighboring dummy lines for enlarging their width.

In FIG. 10F, portions of the first horizontal dummy lines 1HL and the first vertical dummy lines 1VL having a width less than the width W1, are tagged. For example, the tagged portions 1HP/1VP are filled with a hatched pattern in the figure. Each of the tagged portions may 1HP/1VP correspond to a region 1HM/1VM, which is defined by moving the opposite long edges of the tagged portion 1HP/1VP outward by a space ES. Stated differently, the region 1HM/1VM is a region of the tagged portions 1HP/1VP with a lengthened short edge. The space ES may be in a range from about 1 micrometer to about 10 micrometers. The space ES may be equal to the line space LS1. In some embodiments of the present disclosure, a minimum line space may be adopted according to process limit for high surface flatness.

In FIG. 10G, the dummy line 1HL/1VL having the tagged portion 1HP/1HV (referring to FIG. 10F) is merged with a dummy line 1HL/1VL which is meeting or overlapping the region 1HM/1VM. For clear illustrations, in FIG. 10F, some of the dummy lines 1HL are denoted as dummy lines 1HL$_1$, 1HL$_2$, and 1HL$_3$, and the dummy lines 1VL are denoted as dummy lines 1VL$_1$, 1VL$_2$, and 1VL$_3$. For example, in the region 1DR1$_H$, the first horizontal dummy line 1HL$_1$ having the tagged portion 1HP (referring to FIG. 10F) is merged with an upper first horizontal dummy line 1HL$_2$ that meets/overlaps the region 1HM corresponding to the tagged portion 1HP of the first horizontal dummy line 1HL$_{ma}$. Also, the dummy line 1HL$_1$ having the tagged portion 1HP (referring to FIG. 10F) is merged with an upper first horizontal dummy lines 1HL$_3$ that meets/overlaps the region 1HM corresponding to the tagged portion 1HP of the dummy line 1HL$_1$. The modified first horizontal dummy line is denoted as the lines 1HL$_{me}$ in FIG. 10G.

For example, in the region 1DR2$_V$, the first vertical dummy line 1VL$_2$ having the tagged portions 1VP (referring to FIG. 10F) is merged with first vertical dummy lines 1VL$_2$ and 1VL$_3$ that meet/overlap the regions 1VM corresponding to the tagged portions 1VP of the first vertical dummy line 1VL$_2$. Also, the dummy line 1VL$_1$ having the tagged portion 1VP (referring to FIG. 10F) is merged with the first vertical dummy line 1VL$_2$ that meets/overlaps the region 1VM corresponding to the tagged portion 1VP of the dummy line 1VL$_1$. The modified first vertical dummy line is denoted as the lines 1VL$_{MC}$ in FIG. 10G. Through the steps shown in FIGS. 10F and 10G, the dummy lines does not have a too-narrow portion.

In above method, the first to third modification processes are performed in a sequence for obtaining a modified layout (e.g., the first modified layout 140L1) in some embodiments of the present disclosure. In some alternative embodiments, some of the processes/steps described above can be replaced or eliminated for additional embodiments of the method. The order of the processes/steps may be interchangeable.

The step S4 illustrated above with FIG. 8A-10G may be a first cycle of plural repeated cycles. The following step S5, S6, and S7 are respectively second, third, and fourth cycle of the repeated cycles. Each cycle may include determining the horizontal/vertical dummy region, putting horizontal/vertical dummy lines over the horizontal/vertical dummy region, and modifying the horizontal/vertical dummy lines. The repeated cycles are performed such that the dummy lines are inserted with a fixed line space (e.g., the minimum line space) from each other and from the redistribution line for improving the PI topography. The size of the determined horizontal/vertical dummy region and the width of the horizontal/vertical line may vary in each cycle, thereby optimizing the layout. In some embodiments, the criteria for determining the unsatisfied dummy lines to be modified may be the same for each cycle. For example, in the second modification process in each of the steps S5, Sb, and S7, the dummy lines having an area below the first threshold value are considered as unsatisfied, and thus are tagged for merging process.

Figure 11:
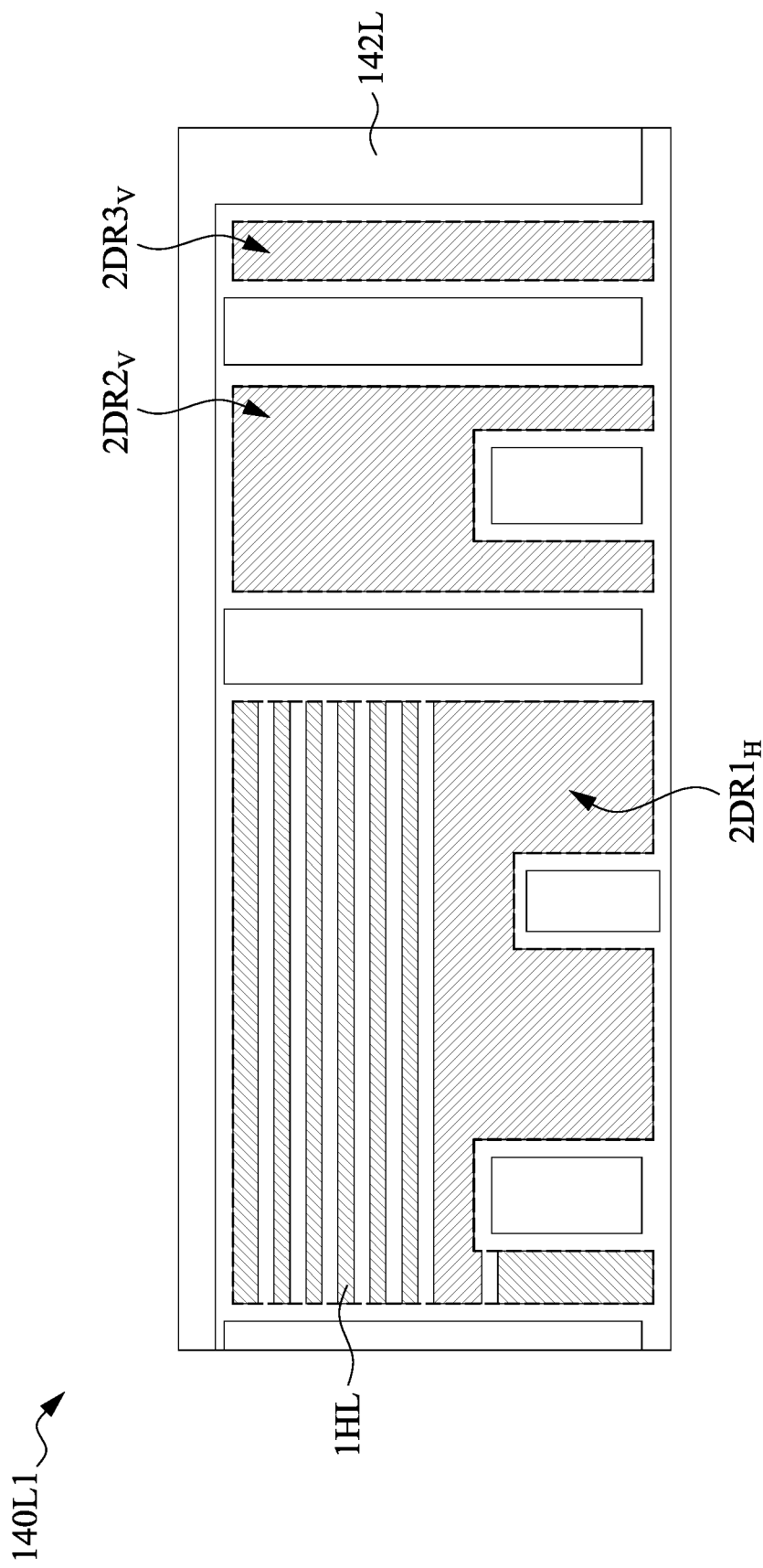

Reference is made to FIGS. 4A and 11. The method M proceeds to step S51 of S5, where a second horizontal dummy region (e.g., the region 2DR1$_H$) and a second vertical dummy region (e.g., the regions 2DR2$_V$ and 2DR3$_V$) are determined according to the first modified layout 140L1 (referring to FIG. 10G) and a second threshold value. If an area of a first horizontal dummy line 1HL of the first modified layout 140L1 (referring to FIG. 10G) (e.g., the modified line 1HL) is greater than the second threshold value, the area of the first horizontal dummy line 1HL (referring to FIG. 10G) (e.g., the modified line 1HL) is determined as a second horizontal dummy region (e.g., the region 2DR1$_H$). Similarly, if an area of a first vertical dummy line 1VL of the first modified layout 140L1 (referring to FIG. 10G) (e.g., the modified line 1VL) is greater than the second threshold value, the area of the first vertical dummy line 1VL (referring to FIG. 10G) (e.g., the modified line 1VL) is determined as a second vertical dummy region (e.g., the regions $2DR2_V$ and $2DR3_V$). The second threshold value may be determined according to a width W2 of the second dummy lines to be disposed (illustrated later in FIG. 12). In some embodiments, the second threshold value may be a result of multiplying the width W2 by a suitable length. For example, the suitable length may be in a range of about 15 micrometers to about 25 micrometers. As the width W2 of the second dummy lines to be disposed (illustrated later in FIG. 12) is greater than the width W1 of the first dummy lines, the second threshold value is greater than the first threshold value.

Figure 12:
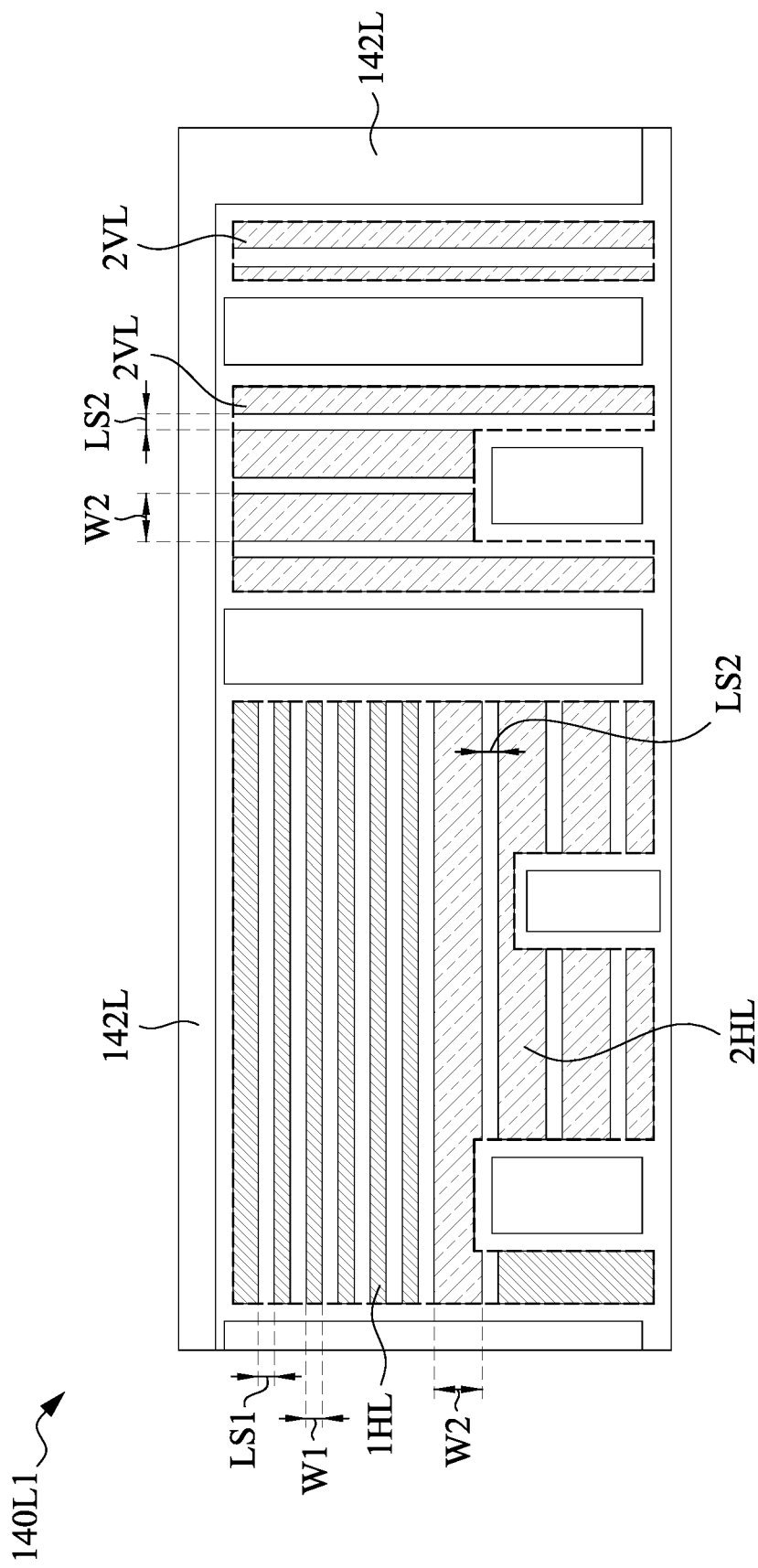

Reference is made to FIGS. 4A and 12. The method M proceeds to step S52, where second horizontal dummy lines 2HL are disposed over the second horizontal dummy region (e.g., the region $2DR1_H$ in FIG. 11) and second vertical dummy lines 2VL are disposed over the second vertical dummy region (e.g., the regions $2DR2_V$ and $2DR3_V$ in FIG. 11). The method of disposing the second dummy lines 2HL/2HL may be similar to the method of disposing the first dummy lines 1HL/1HL illustrated in FIGS. 9A-9D.

For example, like the step shown in FIG. 9A, a second horizontal dummy pattern including plural second horizontal dummy lines 2HL and a vertical dummy pattern including plural second vertical dummy lines 2VL are prepared. In the present embodiments, the second horizontal dummy lines 2HL may have a suitable width W2 and spaced from each other by a line space LS2. The second vertical dummy lines 2VL may have a suitable width W2 and spaced from each other by a line space LS2. The width W2 may be greater than that of the width W1 of the first dummy lines 1HL/1VL. The width W2 may be greater than that of the line space LS2. For example, the width W2 may be in a range from about 1 micrometer to about 10 micrometers, and the line space LS2 may be in a range from about 1 micrometer to about 10 micrometers. If the space LS2 is greater than 10 micrometers, it may result in poor surface flatness. If the space LS2 is less than 1 micrometers, the redistribution layer may not be fabricated due to process limit. In some embodiments of the present disclosure, a minimum line space may be adopted according to process limit for high surface flatness. For example, the line space LS2 may be equal to the line space LS1 between the first dummy lines 1HL/1VL.

In the present embodiments, the widths of the horizontal dummy lines 2HL (e.g., the width W2) are the same as the widths of the vertical dummy lines 2VL (e.g., the width W2), and the line space between the horizontal dummy lines 2HL (e.g., the line space LS2) is the same as the line space between the vertical dummy lines 2VL (e.g., the line space LS2). In some alternative embodiments, the widths of the horizontal dummy lines 2HL may be different from the widths of the vertical dummy lines 2VL, and the line space between the horizontal dummy lines 2HL may be different from the line space between the vertical dummy lines 2VL.

Then, like the step shown in FIG. 9B, the second horizontal dummy pattern is put on the layout 140L1 (referring to FIG. 11), and an intersection area of the second horizontal dummy pattern and the second horizontal dummy region (e.g., the second horizontal dummy regions $2DR1_H$ in FIG. 11) are acquired. By acquiring the intersection area, the second horizontal dummy lines 2HL fitting the second horizontal dummy region (e.g., the second horizontal dummy regions $2DR1_H$) are left on the layout 140L1 as shown in FIG. 12.

Like the step shown in FIG. 9C, the second vertical dummy pattern is put on the layout 140L1 (referring to FIG. 11), and an intersection area of the second vertical dummy pattern and the second vertical dummy region (e.g., the second vertical dummy regions $2DR2_V$ and $2DR3_V$ in FIG. 11) are acquired. By acquiring the intersection area, the second vertical dummy lines 2VL fitting the second vertical dummy region (e.g., the second vertical dummy regions $2DR2_V$ and $2DR3_V$) are left on the layout 140L1 as shown in FIG. 12. Other details of disposing the second dummy lines 2HL/2HL are similar to those shown in FIGS. 9A-9D, and thereto not repeated herein.

Figure 13:
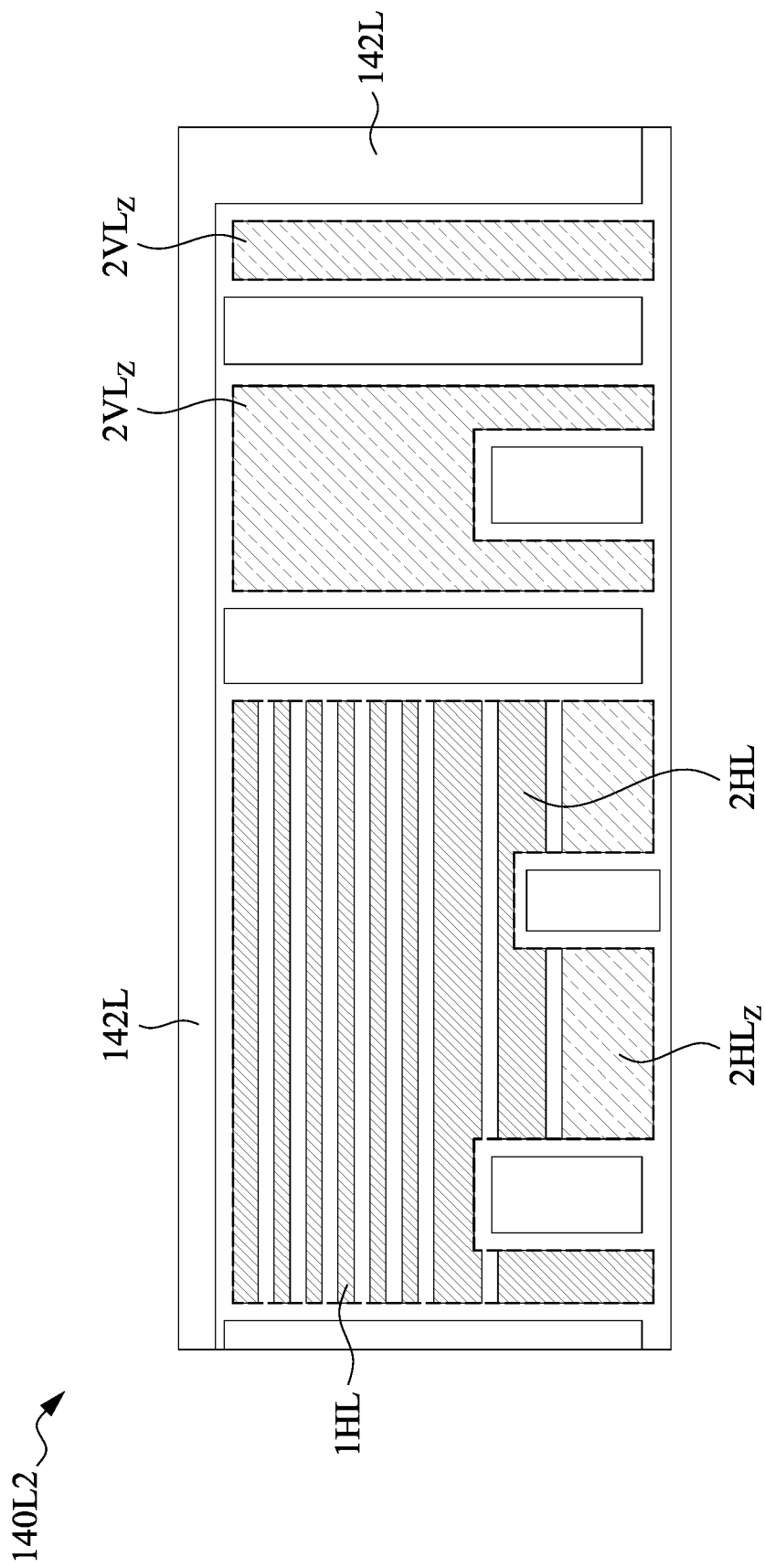

Reference is made to FIGS. 4A and 13. The method M proceeds to step S53, where a portion of the second horizontal dummy lines 2HL and a portion of the second vertical dummy lines 2VL are modified, thereby obtaining a second modified layout 140L2. The modification may include a series of steps. For example, the modification includes a first modification process for modifying outermost/edgemost dummy lines (referring to FIGS. 10A and 10B), a second modification process for eliminating undersized dummy lines (referring to FIGS. 10C-10E), and a third modification process for eliminating the dummy line having a portion that is too narrow (referring to FIGS. 10F and 10G). As aforementioned, at step S53, the second modification process that merges the dummy lines for eliminating undersized dummy lines may use the same first threshold value. After the modification, some unsatisfied second horizontal/vertical dummy lines 2HL/2VL (referring to FIG. 12) are turned into modified second horizontal/vertical dummy lines, respectively denoted as the lines $2HL_Z/2VL_Z$. The method of modifying the second dummy lines may be similar to the method of modifying the first dummy lines 11-IL illustrated in FIGS. 10A-10G. Other details of modifying the second dummy lines 2HL are similar to those shown in FIGS. 10A-10G, and thereto not repeated herein.

Figure 14:
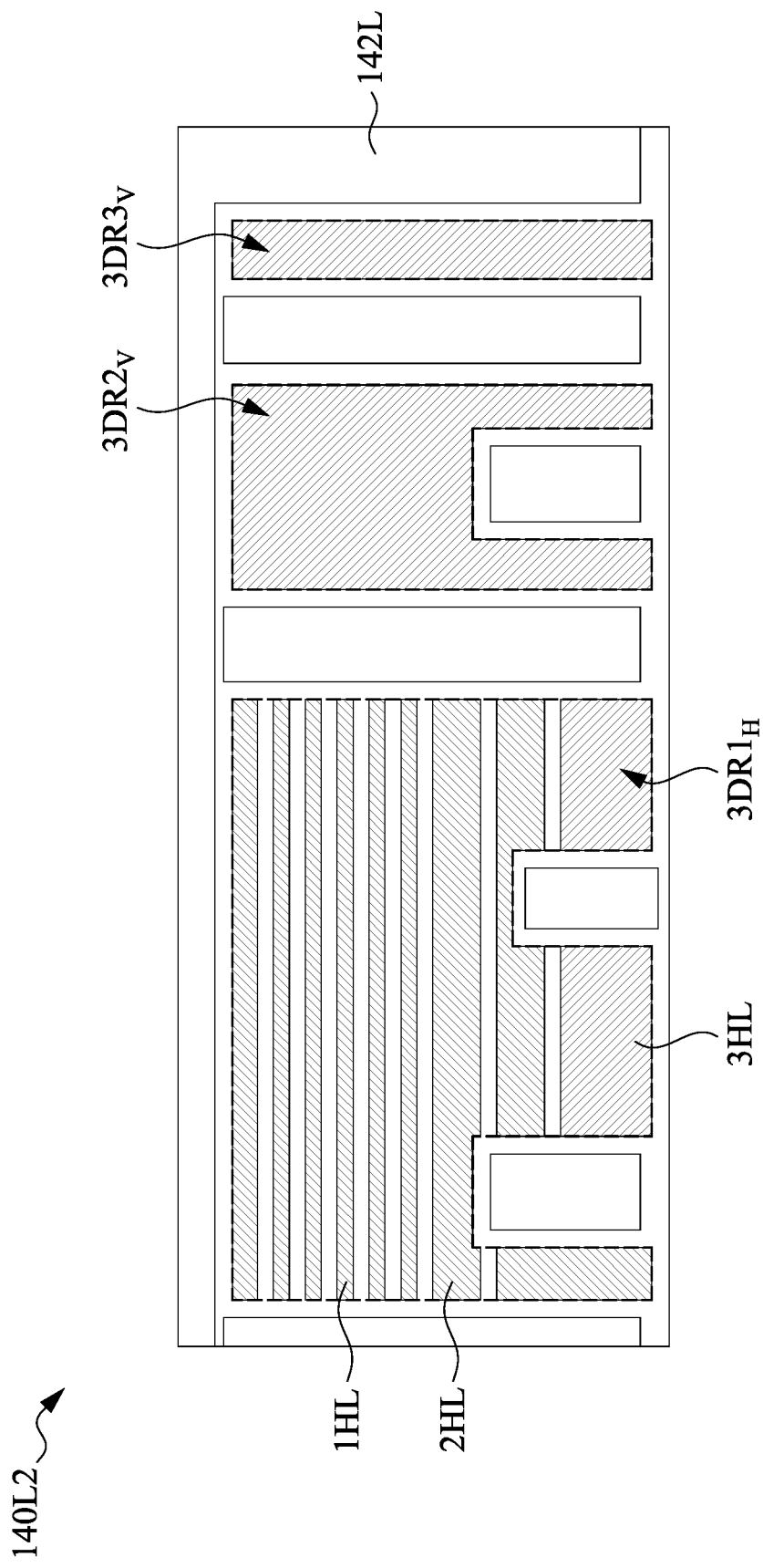

Reference is made to FIGS. 4B and 14. The method M proceeds to step S61, where a third horizontal dummy region (e.g., the region $3DR1_H$) and a third vertical dummy region (e.g., the regions $3DR2_V$ and $3DR3_V$) are determined according to the second modified layout 140L2 (referring to FIG. 13) and a third threshold value. If an area of a second horizontal dummy line 2HL of the second modified layout 140L2 (referring to FIG. 13) (e.g., the modified line 2HL') is greater than the third threshold value, the area of the second horizontal dummy line 2HL (referring to FIG. 13) (e.g., the modified line 2HL') is determined as a third horizontal dummy region (e.g., the region $3DR1_H$). Similarly, if an area of a second vertical dummy line 2VL of the second modified layout 140L2 (referring to FIG. 13) (e.g., the modified line 2VL') is greater than the third threshold value, the area of the second vertical dummy line 2VL (referring to FIG. 13) (e.g., the modified line 2VL') is determined as a third vertical dummy region (e.g., the regions $3DR2_V$ and $3DR3_V$). The third threshold value may be determined according to a width W3 of the third dummy lines to be disposed (illustrated later in FIG. 15). In some embodiments, the third threshold value may be a result of multiplying the width W3 by a suitable length. For example, the suitable length may be in a range of about 15 micrometers to about 25 micrometers. As the width W3 of the third dummy lines to be disposed (illustrated later in FIG. 15) is greater than the width W2 of the second dummy lines, the third threshold value is greater than the second threshold value.

Figure 15:
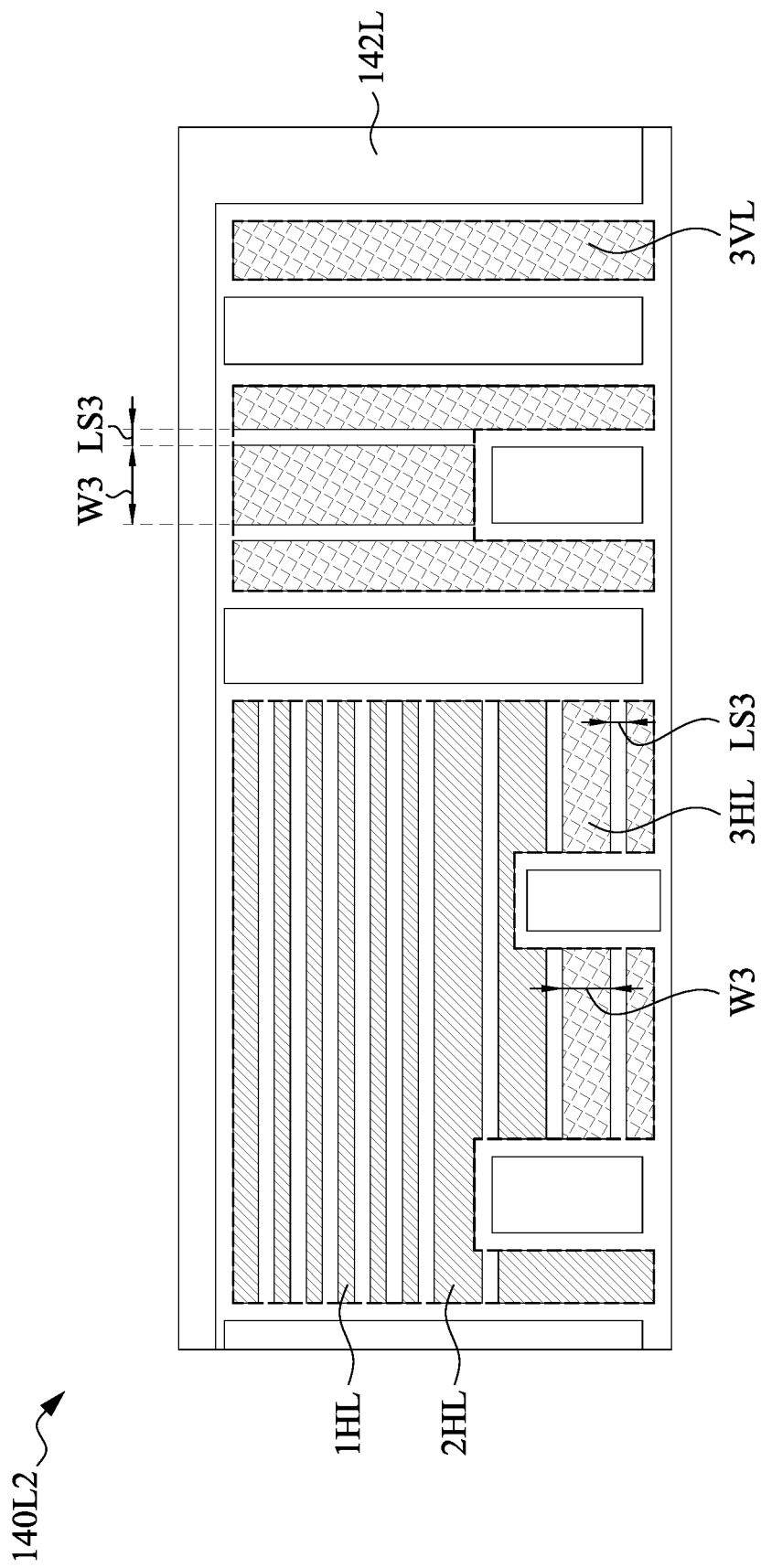

Reference is made to FIGS. 4B and 15. The method M proceeds to step S62, where third horizontal dummy lines 3HL are disposed over the third horizontal dummy region (e.g., the region $3DR1_H$ in FIG. 14) and third vertical dummy lines 3VL are disposed over the third vertical dummy region (e.g., the regions $3DR2_V$ and $3DR3_V$ in FIG. 14). The method of disposing the third dummy lines 3HL/3HL may be similar to the method of disposing the first dummy lines 1HL/1HL illustrated in FIGS. 9A-9D.

For example, like the step shown in FIG. 9A, a third horizontal dummy pattern including plural third horizontal dummy lines 3HL and a third dummy pattern including plural third vertical dummy lines 3HL are prepared. In the present embodiments, the third horizontal dummy lines 3HL may have a suitable width W3 and spaced from each other by a line space LS3, and the third vertical dummy lines 3VL may have the suitable width W3 and spaced from each other by the line space LS3. The width W3 may be greater than that of the width W2 of the second dummy lines 2HL/2VL (referring to FIG. 12). The width W3 may be greater than that of the line space LS3. For example, the width W3 may be in a range from about 1 micrometer to about 20 micrometers, and the line space LS3 may be in a range from about 1 micrometer to about 10 micrometers. If the space LS3 is greater than 10 micrometers, it may result in poor surface flatness. If the space LS3 is less than 1 micrometers, the redistribution layer may not be fabricated due to process limit. In some embodiments of the present disclosure, a minimum line space may be adopted according to process limit for high surface flatness. For example, the line space LS3 may be equal to the line space LS1 between the first dummy lines 1HL/1VL and the line space LS2 between the second dummy lines 2HL/2VL (referring to FIG. 12).

In the present embodiments, the widths of the horizontal dummy lines 3HL (e.g., the width W3) are the same as the widths of the vertical dummy lines 3VL (e.g., the width W3), and the line space between the horizontal dummy lines 3HL (e.g., the line space LS3) is the same as the line space between the vertical dummy lines 3VL (e.g., the line space LS3). In some alternative embodiments, the widths of the horizontal dummy lines 3HL may be different from the widths of the vertical dummy lines 3VL, and the line space between the horizontal dummy lines 3HL may be different from the line space between the vertical dummy lines 3VL.

Then, like the step shown in FIG. 9B, the third horizontal dummy pattern is put on the layout 140L2 (referring to FIG. 14), and an intersection area of the third horizontal dummy pattern and the third horizontal dummy region (e.g., the third dummy regions $3DR1_H$ in FIG. 14) are acquired. By acquiring the intersection area, the third horizontal dummy lines 3HL fitting the third horizontal dummy region (e.g., the third dummy regions $3DR1_H$ in FIG. 14) are left between the redistribution lines 142L as shown in FIG. 15.

Like the step shown in FIG. 9C, the third vertical dummy pattern is put on the layout 140L2 (referring to FIG. 14), and an intersection area of the third vertical dummy pattern and the third vertical dummy region (e.g., the third dummy regions $3DR2_V$ and $3DR3_V$ in FIG. 14) are acquired. By acquiring the intersection area, the third vertical dummy lines 3VL fitting the third horizontal dummy region (e.g., the third dummy regions $3DR2_V$ and $3DR3_V$) are left between the redistribution lines 142L as shown in FIG. 15. Other details of disposing the third dummy lines 3HL/3HL are similar to those shown in FIGS. 9A-9D, and thereto not repeated herein.

Figure 16:
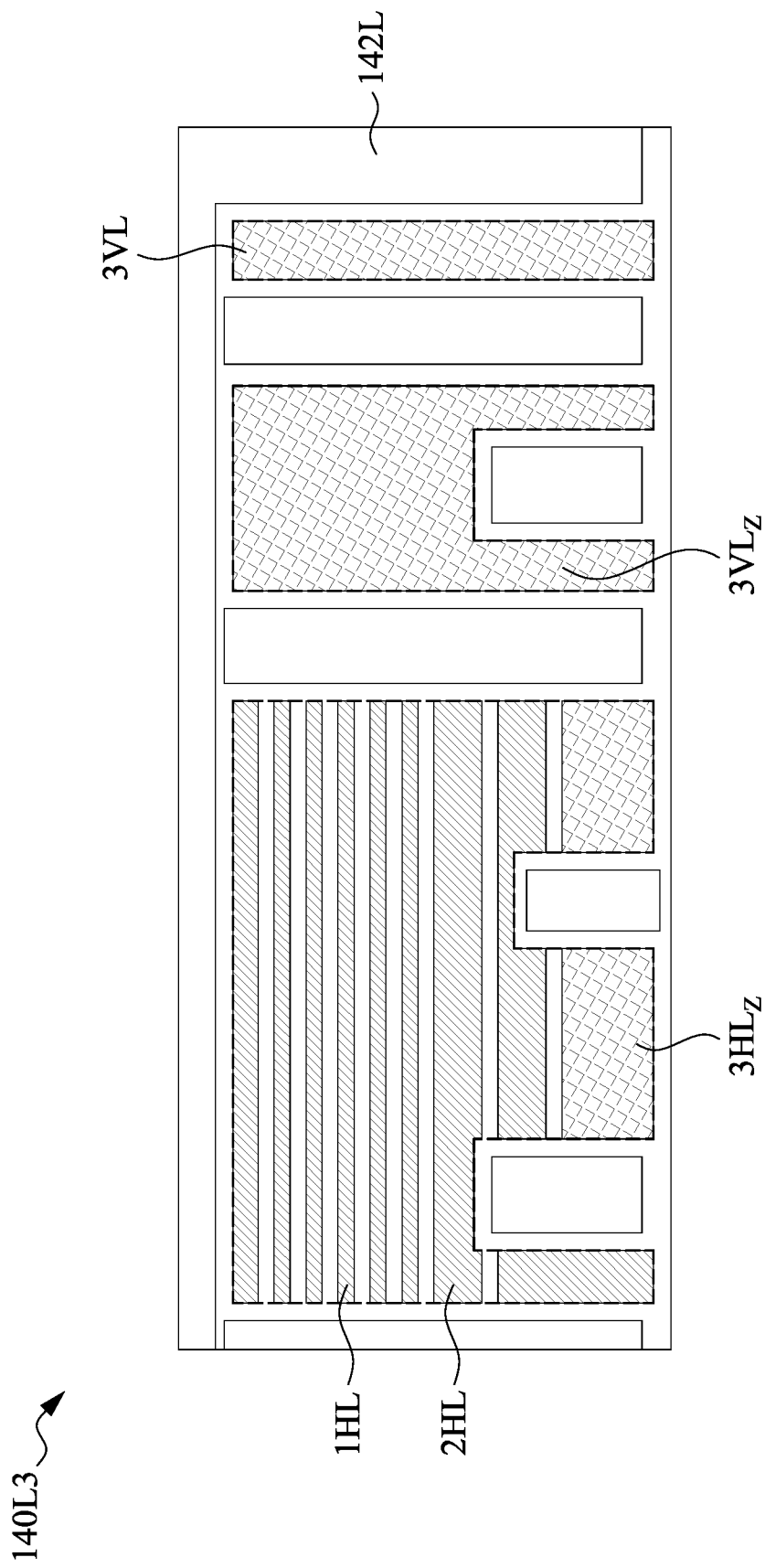

Reference is made to FIGS. 4B and 16. The method M proceeds to step S63, where a portion of the third horizontal dummy lines 3HL and a portion of the third vertical dummy lines 3VL are modified, thereby obtaining a third modified layout 140L3. For example, the modification includes a first modification process for modifying outermost/edgemost dummy lines (referring to FIGS. 10A and 10B), a second modification process for eliminating undersized dummy lines (referring to FIGS. 10C-10E), and a third modification process for eliminating the dummy line having a portion that is too narrow (referring to FIGS. 10F and 10G). As aforementioned, at step S63, the second modification process that merges the dummy lines for eliminating undersized dummy lines may use the same first threshold value. After the modification, some unsatisfied third horizontal dummy lines 3HL (referring to FIG. 15) are turned into a modified third horizontal dummy line, which is denoted as line $3HL_Z$; and some unsatisfied third vertical dummy lines 3VL (referring to FIG. 15) are turned into a modified third vertical dummy line, which is denoted as line $3VL_Z$. The method of modifying the third dummy lines 3HL/3HL may be similar to the method of modifying the first dummy lines 1HL/1HL illustrated in FIGS. 10A-10G. Other details of modifying the third dummy lines 3HL/3HL are similar to those shown in FIGS. 10A-10G, and thereto not repeated herein.

Figure 17:
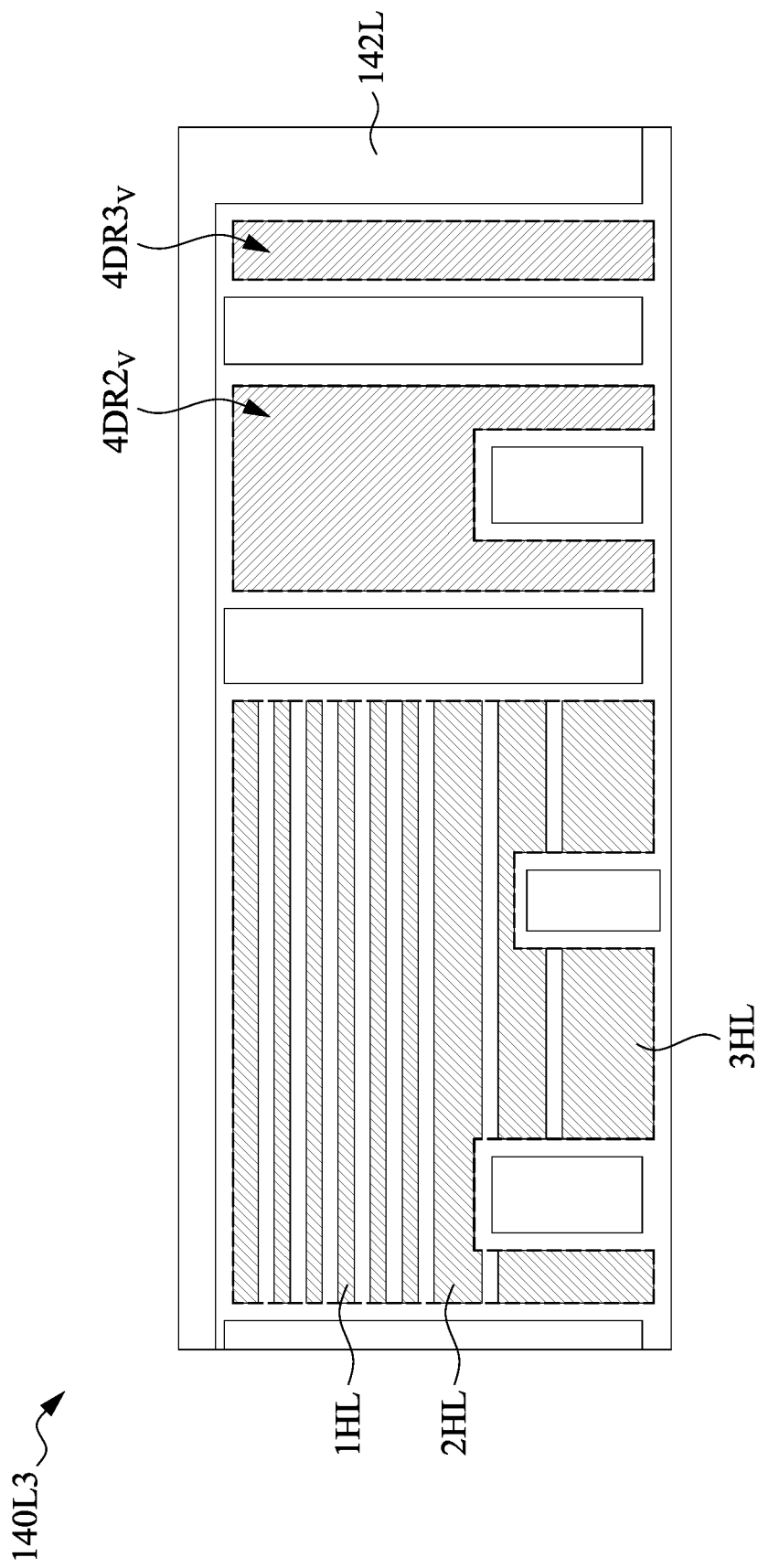

Reference is made to FIGS. 4B and 17. The method M proceeds to step S71, where a fourth horizontal dummy region and a fourth vertical dummy region (e.g., the regions $4DR2_V$ and $4DR3_V$) are determined according to the third modified layout 140L3 (referring to FIG. 16) and a fourth threshold value. If an area of a third horizontal dummy line 3HL of the second modified layout 140L3 (referring to FIG. 16) (e.g., the modified line 3HL') is greater than the fourth threshold value, the area of the third horizontal dummy line 3HL (referring to FIG. 16) (e.g., the modified line 3HL') is determined as a fourth horizontal dummy region. In the present embodiments, as the area of the third horizontal dummy line 3HL (e.g., the modified line 3HL') in FIG. 16 is less than the fourth threshold value, no fourth horizontal dummy region is determined in FIG. 17. Similarly, if an area of a third vertical dummy line 3VL of the third modified layout 140L3 (referring to FIG. 16) (e.g., the modified line 3VL') is greater than the fourth threshold value, the area of the third vertical dummy line 3VL (referring to FIG. 16) (e.g., the modified line 3VL') is determined as a fourth vertical dummy region (e.g., the regions $4DR2_V$ and $4DR3_V$). The fourth threshold value may be determined according to a line width W4 of the fourth dummy lines to be disposed (illustrated later in FIG. 18). In some embodiments, the fourth threshold value may be a result of multiplying the width W4 by a suitable length. For example, the suitable length may be in a range of about 15 micrometers to about 25 micrometers. As the width W4 of the fourth dummy lines to be disposed (illustrated later in FIG. 18) is greater than the width W3 of the third dummy lines, the fourth threshold value is greater than the third threshold value.

Figure 18:
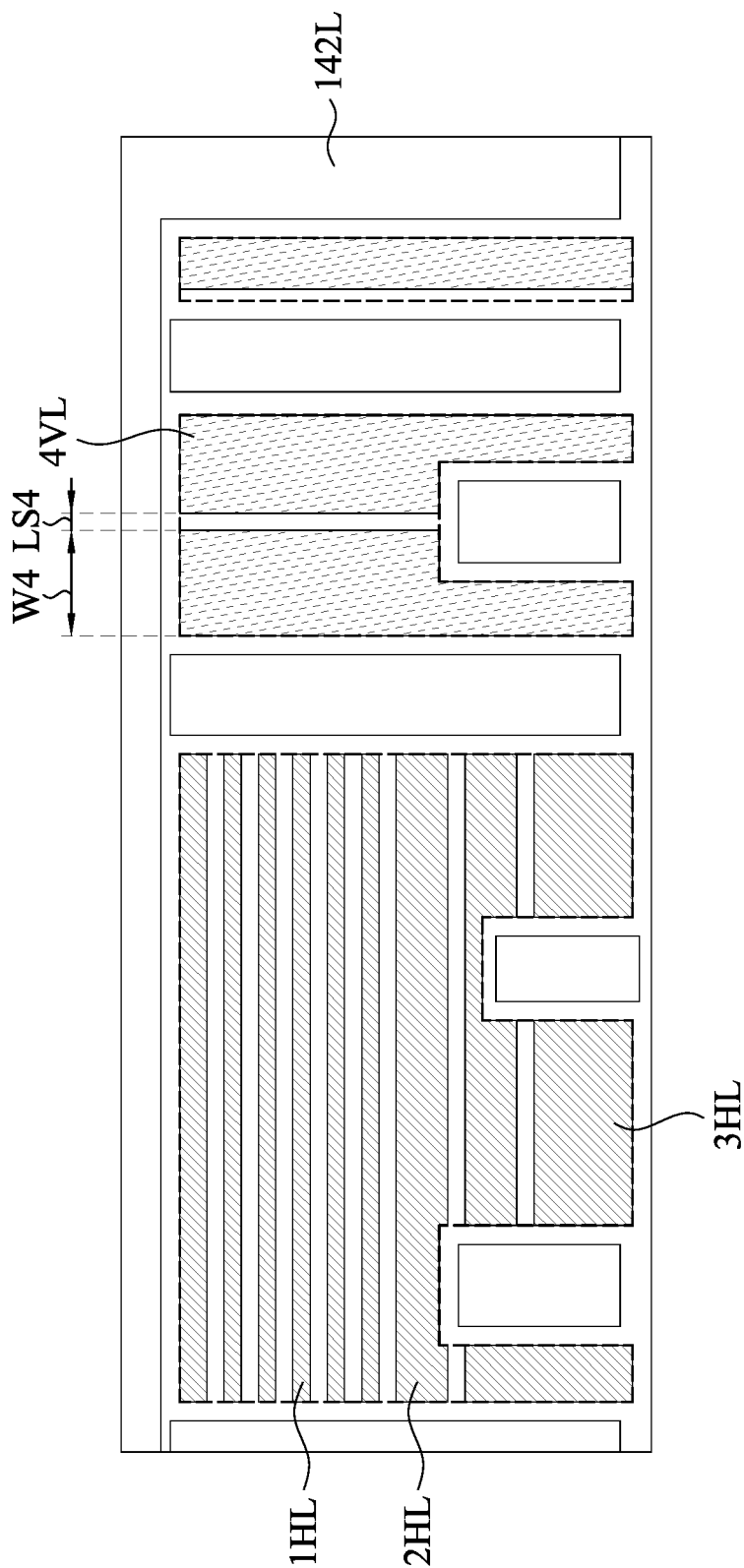

Reference is made to FIGS. 4B and 18. The method M proceeds to step S72, where fourth horizontal dummy lines (not shown in FIG. 17) are disposed over the fourth horizontal dummy region (not shown in FIG. 17) and fourth vertical dummy lines are 4VL disposed over the fourth vertical dummy region (e.g., the regions $4DR2_V$ and $4DR3_V$ in FIG. 17). The method of disposing the fourth dummy lines may be similar to the method of disposing the first dummy lines 1HL/1HL illustrated in FIGS. 9A-9D.

For example, like the step shown in FIG. 9A, a fourth horizontal dummy pattern including plural fourth horizontal dummy lines (not shown in FIG. 17) and a fourth dummy pattern including plural fourth vertical dummy lines 4HL are prepared. In the present embodiments, the fourth horizontal dummy lines (not shown in FIG. 17) may have a suitable width W4 and spaced from each other by a line space LS4, and the fourth vertical dummy lines 4VL may have the suitable width W4 and spaced from each other by the line space LS4. The width W4 may be greater than that of the width W3 of the third dummy lines 3HL/3VL (referring to FIG. 15). The width W4 may be greater than that of the line space LS4. For example, the width W4 may be in a range from about 1 micrometer to about 20 micrometers, and the line space LS4 may be in a range from about 1 micrometer to about 10 micrometers. If the space LS4 is greater than 10 micrometers, it may result in poor surface flatness. If the space LS4 is less than 1 micrometers, the redistribution layer may not be fabricated due to process limit. In some embodiments of the present disclosure, a minimum line space may be adopted according to process limit for high surface flatness. For example, the line space LS4 may be equal to the line space LS1 between the first dummy lines 1HL/1VL, the line space LS2 between the second dummy lines 2HL/2VL (referring to FIG. 12), and the line space LS3 between the third dummy lines 3HL/3VL (referring to FIG. 15).

In the present embodiments, the widths of the horizontal dummy lines are the same as the widths of the vertical dummy lines 4VL (e.g., the width W4), and the line space between the horizontal dummy lines is the same as the line space between the vertical dummy lines 4VL (e.g., the line space LS4). In some alternative embodiments, the widths of the horizontal dummy lines may be different from the widths of the vertical dummy lines 4VL, and the line space between the horizontal dummy lines may be different from the line space between the vertical dummy lines 4VL.

Then, like the step shown in FIG. 9B, the fourth horizontal dummy pattern is put on the layout 140L3 (referring to FIG. 17), and an intersection area of the fourth horizontal dummy pattern and the fourth horizontal dummy region (not shown in FIG. 17) are acquired. By acquiring the intersection area, the fourth horizontal dummy lines fitting the fourth horizontal dummy region (not shown in FIG. 17) are left between the redistribution lines 142L.

Like the step shown in FIG. 9C, the fourth vertical dummy pattern is put on the layout 140L3 (referring to FIG. 17), and an intersection area of the fourth vertical dummy pattern and the fourth vertical dummy region (e.g., the third dummy regions 4DR2$_V$ and 4DR3$_V$ in FIG. 17) are acquired. By acquiring the intersection area, the fourth vertical dummy lines 4VL fitting the fourth horizontal dummy region (e.g., the third dummy regions 4DR2$_V$ and 4DR3$_V$) are left between the redistribution lines 142L as shown in FIG. 18. Other details of disposing the fourth dummy lines are similar to those shown in FIGS. 9A-9D, and thereto not repeated herein.

Figure 19:
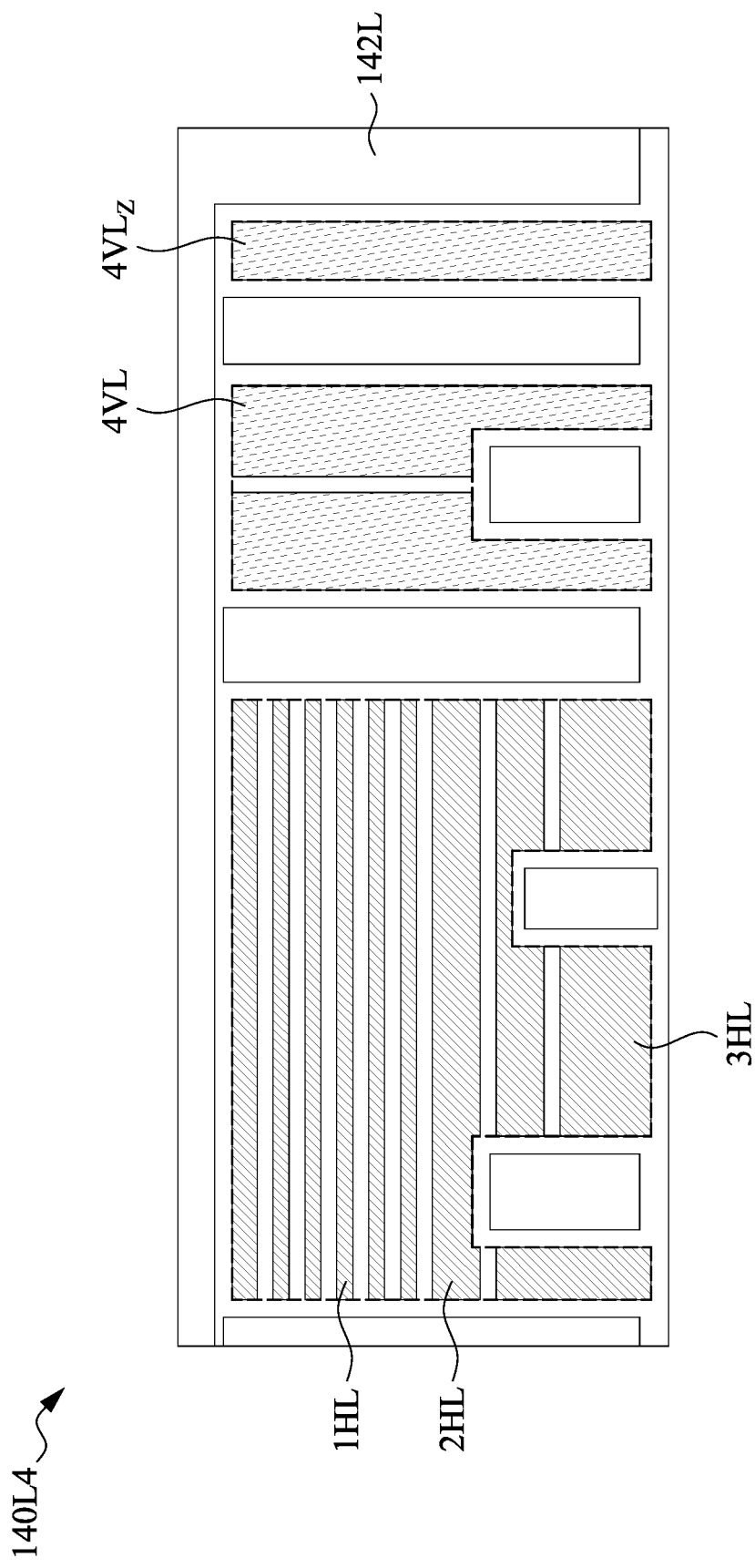

Reference is made to FIGS. 4B and 19. The method M proceeds to step S73, where a portion of the fourth horizontal dummy lines (not shown) and a portion of the fourth vertical dummy lines 4VL are modified, thereby obtaining a fourth modified layout 140L4. For example, the modification includes a first modification process for modifying outermost/edgemost dummy lines (referring to FIGS. 10A and 10B), a second modification process for eliminating undersized dummy lines (referring to FIGS. 10C-10E), and a third modification process for eliminating the dummy line having a portion that is too narrow (referring to FIGS. 10F and 10G). As aforementioned, at step S73, the second modification process that merges the dummy lines for eliminating undersized dummy lines may use the same first threshold value. After the modification, some unsatisfied fourth horizontal dummy lines (not shown) are turned into a modified fourth horizontal dummy line; and some unsatisfied fourth vertical dummy lines 4VL (referring to FIG. 18) are turned into a modified fourth vertical dummy line, which is denoted as lines 4VL$_Z$. The method of modifying the fourth dummy lines 4HL/4HL may be similar to the method of modifying the first dummy lines 1HL/1HL illustrated in FIGS. 10A-10G. Other details of modifying the third dummy lines 3HL/3HL are similar to those shown in FIGS. 10A-10G, and thereto not repeated herein.

The method M illustrated above includes four cycles (e.g., steps S4-S7), in which each cycle may include determining the horizontal/vertical dummy region, putting horizontal/vertical dummy lines over the horizontal/vertical dummy region, and modifying the horizontal/vertical dummy lines. In some other embodiments, the number of the cycles may be less or greater than four. For example, three, five, or six cycles may be applicable. After these cycles, the final modified layout (e.g., the layout 140L4 herein) is outputted for semiconductor fabrication. In some embodiments, an artificial intelligence (AI) model may be built between an input data of reference RDL layouts and an output data of reference final modified layouts obtained through the method M, and thus the RDL layout 140L (referring to FIG. 5) may be converted into the layout 140L4 through the AI model.

In some embodiments, one or more reticles (interchangeably referred to as photomasks) are generated according to the outputted layout 140L4 during the fabrication process of the semiconductor device. Therefore, features of the semiconductor device may be formed by one or more photolithography processes through these reticles. For example, referring to FIGS. 1A and 1B, a metal layer (e.g., copper layer) is deposited over the first passivation layer 130, a photoresist layer is formed over the metal layer, the photoresist layer is patterned by exposure through the reticle generated according to the outputted layout 140L4. An etching process may be performed to the metal layer through the patterned photoresist for removing portions of the metal layer. After the etching process, the other portions of the metal layer covered by the patterned photoresist may form the RDL layer 140 including redistribution lines 142L and dummy redistribution lines 144.

FIGS. 20-26 illustrate an RDL layout at various intermediate stages of a layout design method according to some embodiments of the present disclosure. The method M of FIGS. 4A and 4B may be applicable to the present embodiments. It is understood that additional steps may be provided before, during, and after the steps shown by FIGS. 20-26, and some of the steps described below can be replaced or eliminated for additional embodiments of the method. The order of the operations/processes may be interchangeable.

Figure 20:
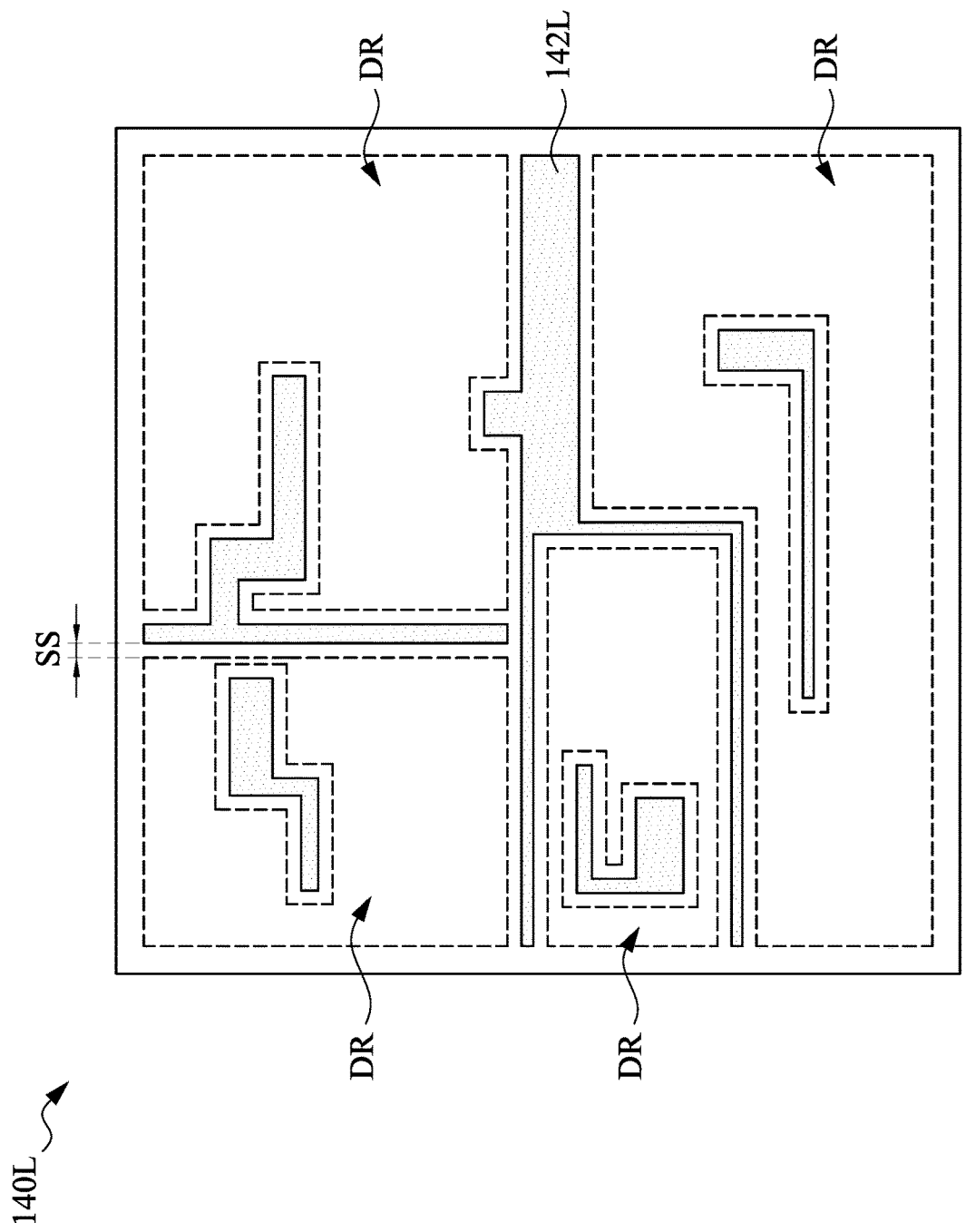
FIGS. 20-26 illustrate an RDL layout at various intermediate stages of a layout design method according to some embodiments of the present disclosure.

FIG. 20 shows an RDL layout 140L including redistribution lines 142L. Dummy regions DR are determined by a reverse tone method as the step S2 in FIG. 4A, followed by the shrinking step S3 in FIG. 4A. By the shrinking step, edges of the dummy regions DR are away from the redistribution lines 142L by the distance SS.

Figure 21:
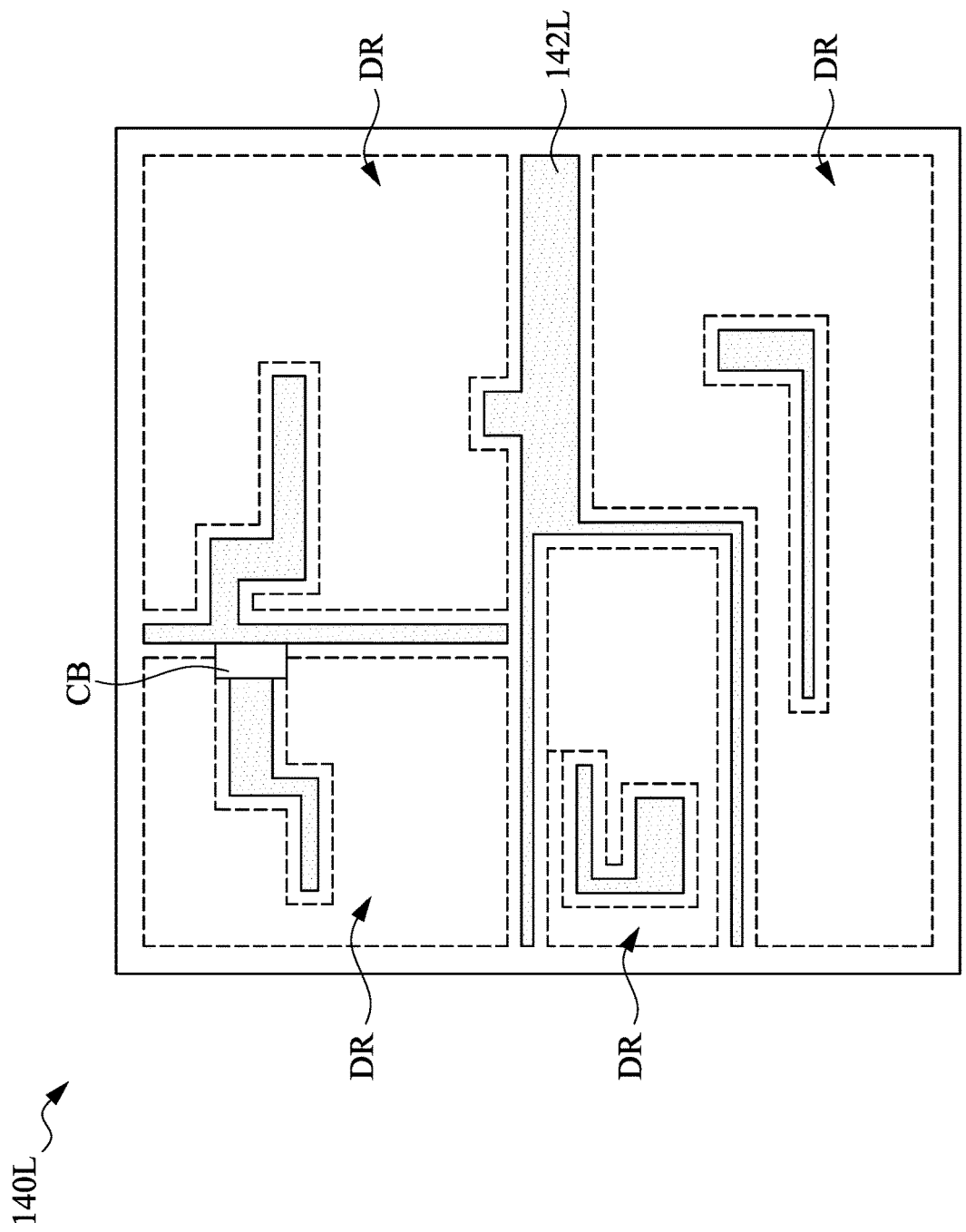

Referring to FIG. 21, a cutting block CB may be placed over the layout 140L for cutting a narrow portion of the dummy regions DR. For example, when the narrow portion of the dummy regions DR has a width less than a width of the width W1 of the first dummy lines, the cutting block CB is placed on the narrow portion of the dummy regions DR, thereby eliminating the narrow portion of the dummy regions DR.

Figure 22A:
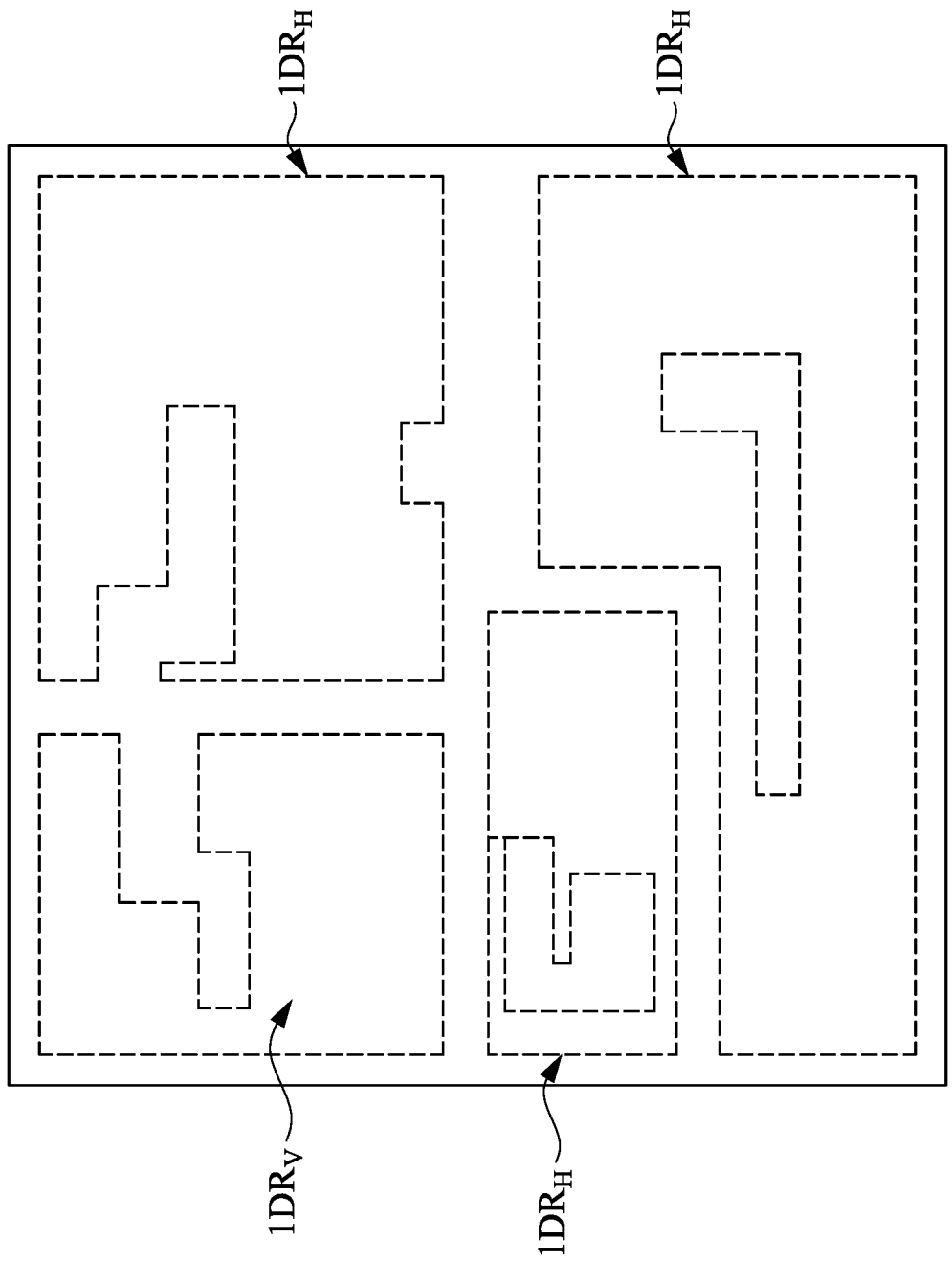
Figure 22B:
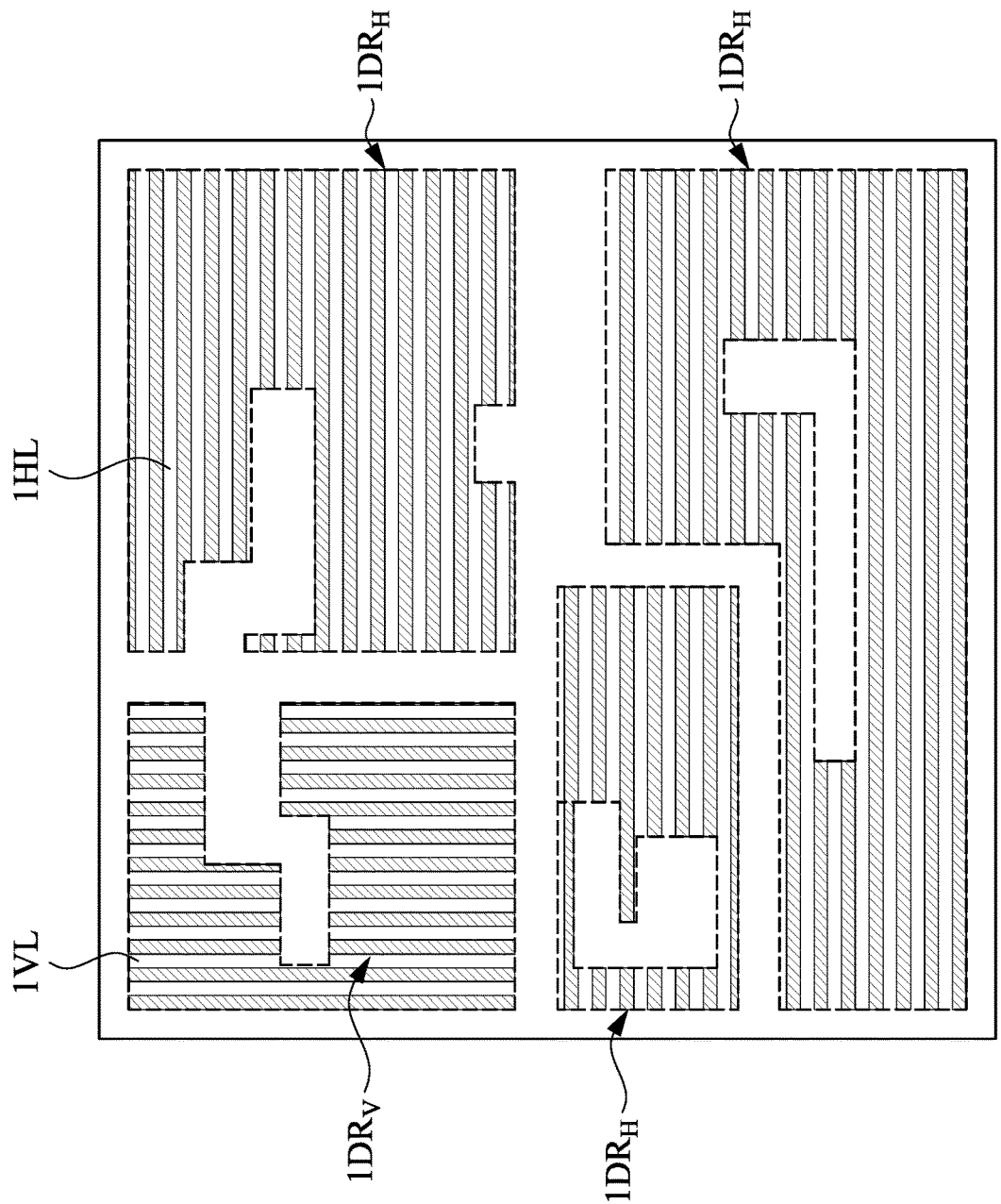

Reference is made to FIG. 22A-22F. The step S4 of FIG. 4A is performed, thereby converting the layout 140L into a first modified layout 140L1. As illustrated above with respect to steps S41, the dummy regions DR are tagged as first horizontal and vertical dummy regions $1DR_H$ and $1DR_V$, as shown in FIG. 22A. Subsequently, as illustrated above with respect to steps S42, first horizontal and vertical dummy lines 1HL and 1VL are disposing in the first horizontal and vertical dummy regions $1DR_H$ and $1DR_V$, respectively, as shown in FIG. 22B. Then, as illustrated above with respect to steps S43, some first horizontal and vertical dummy lines 1HL/1VL are modified, as shown in FIGS. 22C-22F.

Figure 22C:
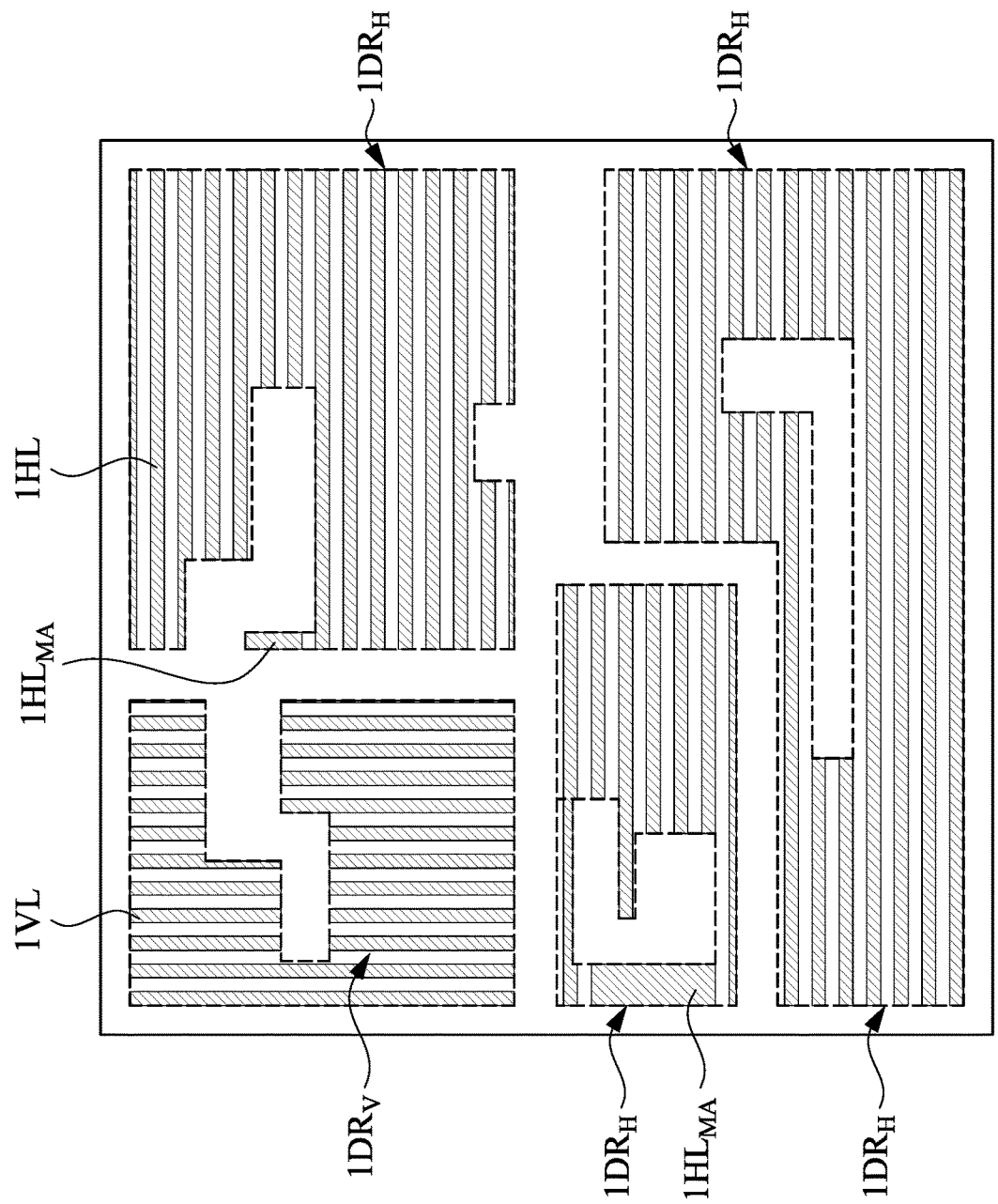
Figure 22D:
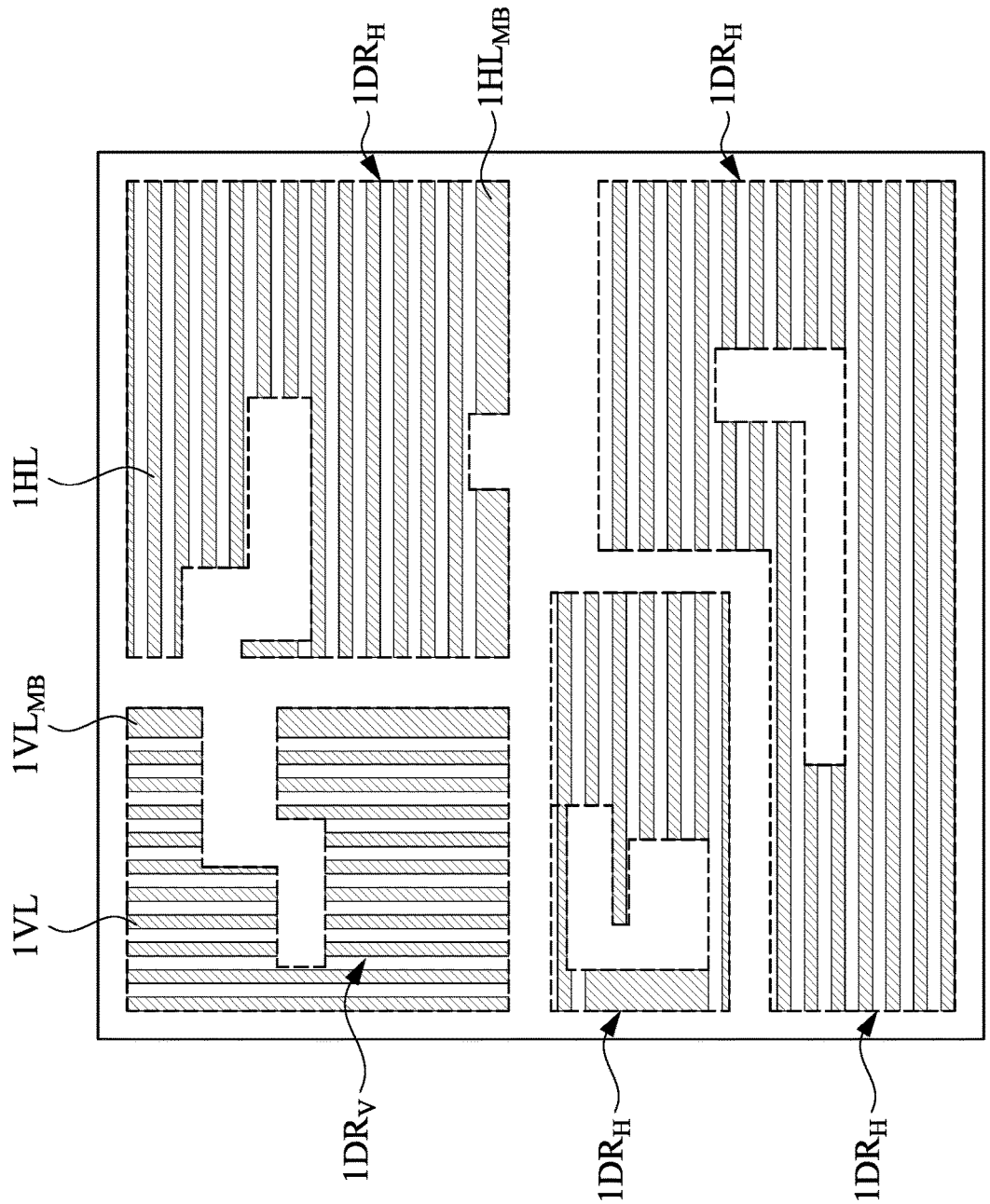

FIGS. 22C and 22D show the second modification process for eliminating undersized dummy lines, as illustrated previously with respect to FIGS. 10C-10E. In FIG. 22C, the first horizontal dummy lines 1HL having an area less than the first threshold value are merged with each other; and the first vertical dummy lines 1VL having an area less than the first threshold value are merged with each other, as the steps shown in FIGS. 10C and 10D. The merged first horizontal dummy lines are denoted as the lines $1HL_{MA}$ in FIG. 22C. Subsequently, in FIG. 22D, the first horizontal dummy lines 1HL having an area less than the first threshold value are merged with another adjacent first horizontal dummy lines 1HL having an area equal to or greater than the first threshold; and the first vertical dummy lines 1VL having an area less than the first threshold value are merged with another adjacent first vertical dummy lines 1VL having an area equal to or greater than the first threshold, as the steps shown in FIG. 10E. The merged first horizontal/vertical dummy lines are denoted as the lines $1HL_{MB}/1VL_{MB}$ in FIG. 22D.

Figure 22E:
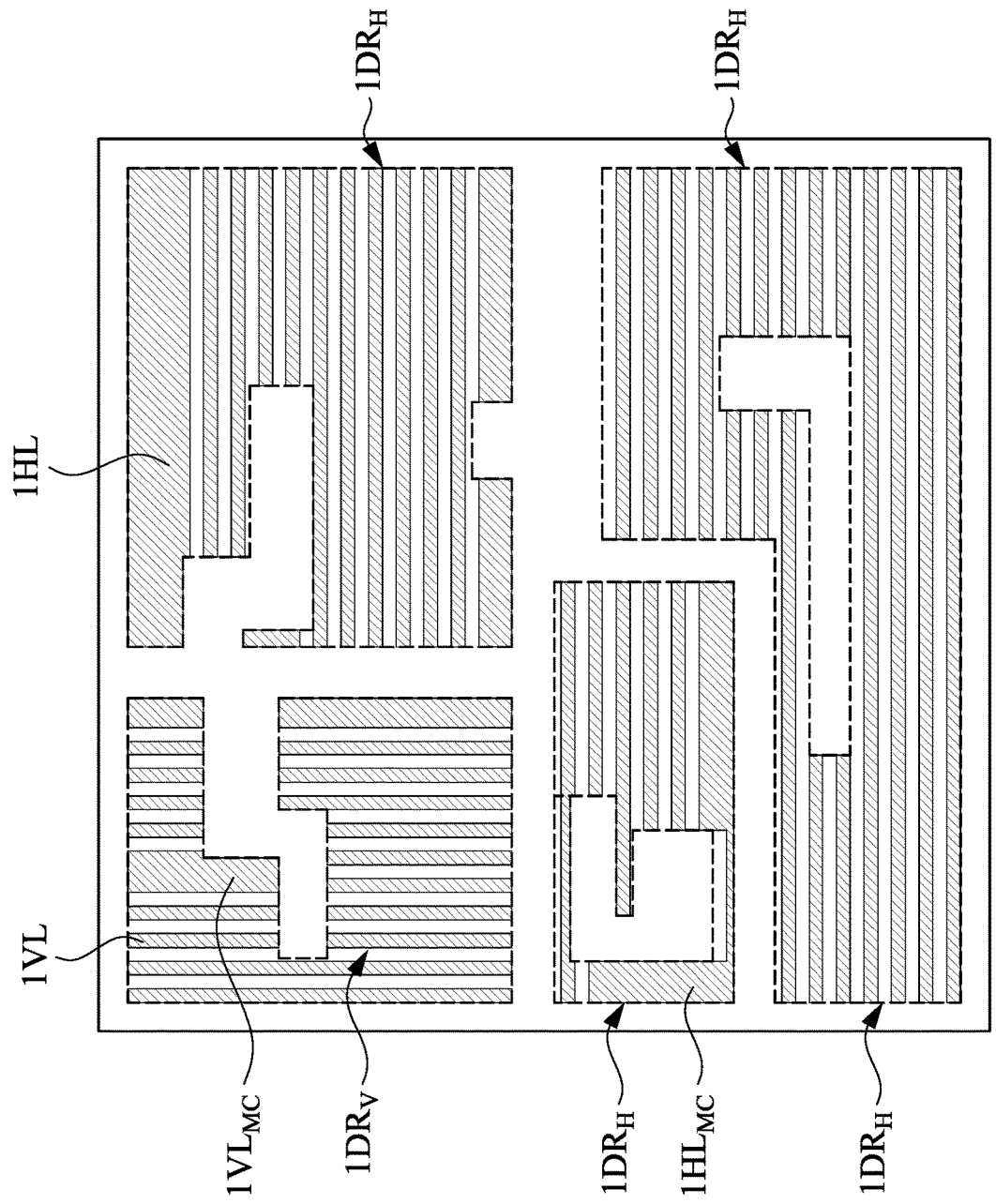

FIG. 22E shows the third modification process for eliminating the dummy line having a portion that is too narrow, as illustrated previously with respect to FIGS. 10E-10G. The modified first horizontal/vertical dummy lines are denoted as the lines $1HL_{MC}/1VL_{MC}$ in FIG. 22E.

Figure 22F:
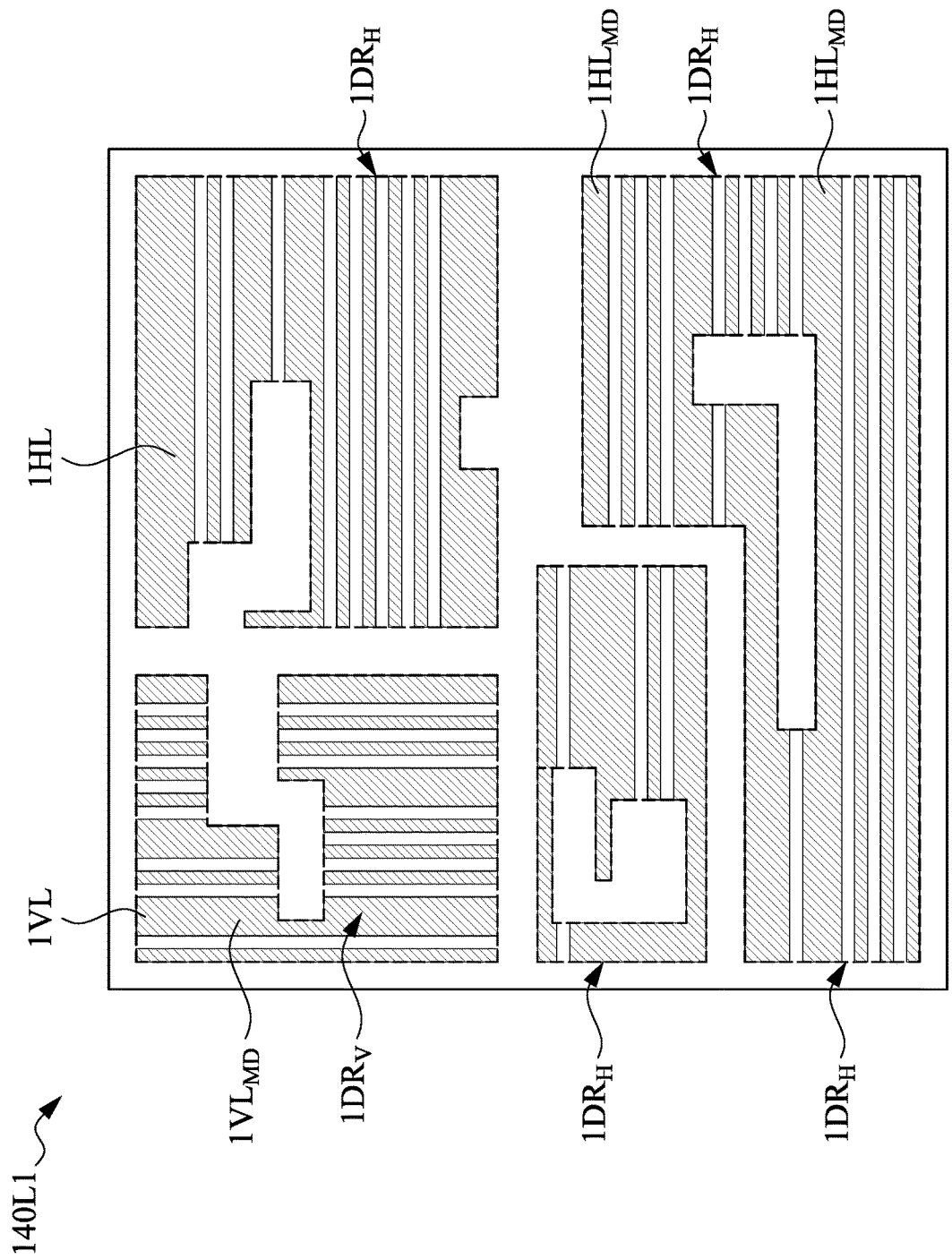

FIG. 22F shows the first modification process for modifying outermost/edgemost dummy lines. The outermost/edgemost ones of the first horizontal dummy lines 1HL are adjusted to meet/align with the horizontal edges of the first horizontal dummy regions $1DR_H$. The outermost/edgemost ones of the first vertical dummy lines 1VL are adjusted to meet/align with the vertical edges of the first vertical dummy regions $1DR_V$. The adjusted first horizontal/vertical dummy lines are denoted as the lines $1HL_{MD}/1VL_{MD}$ in FIG. 22F. Therefore, a first modified layout 140L1 is obtained.

Figure 23A:
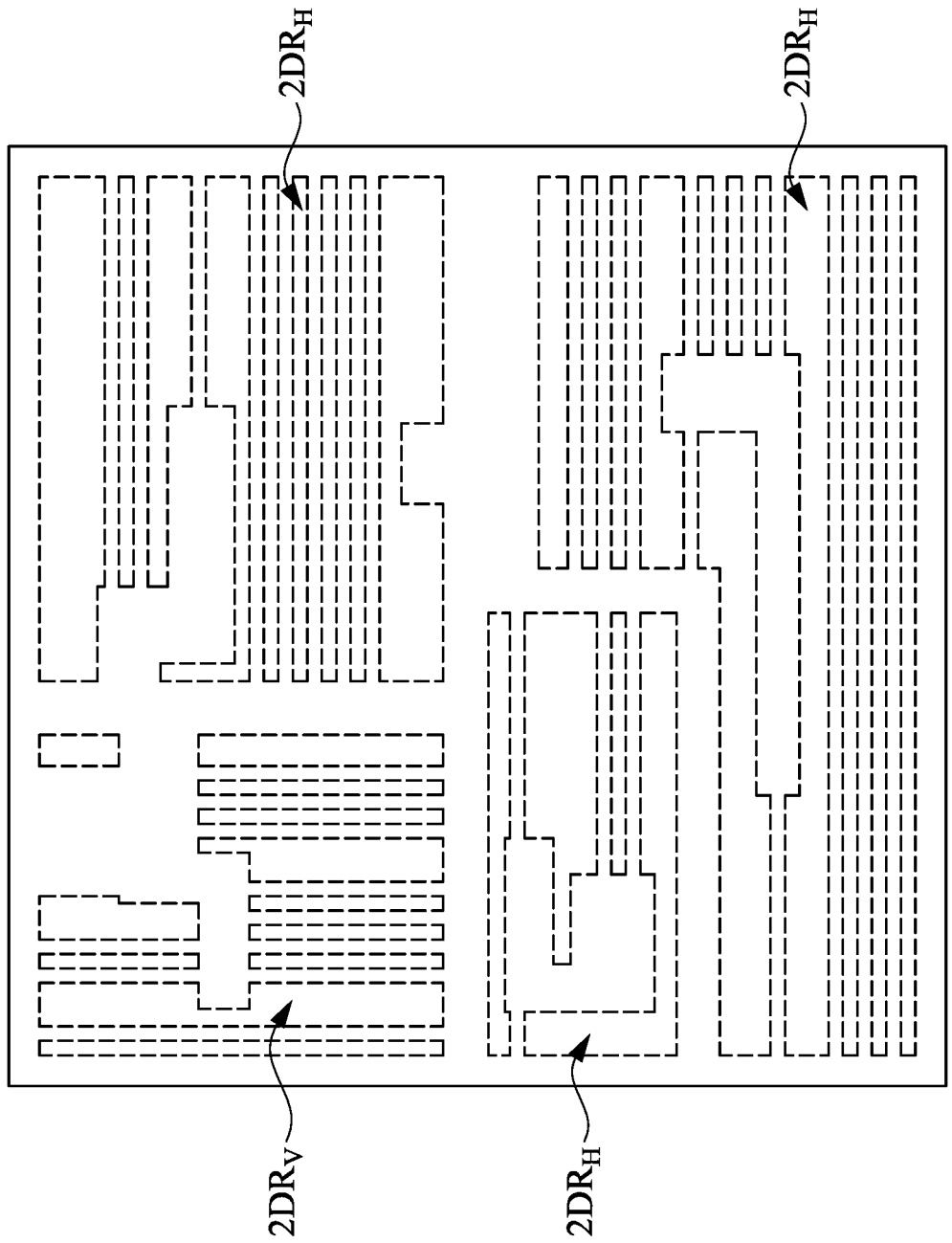
Figure 23B:
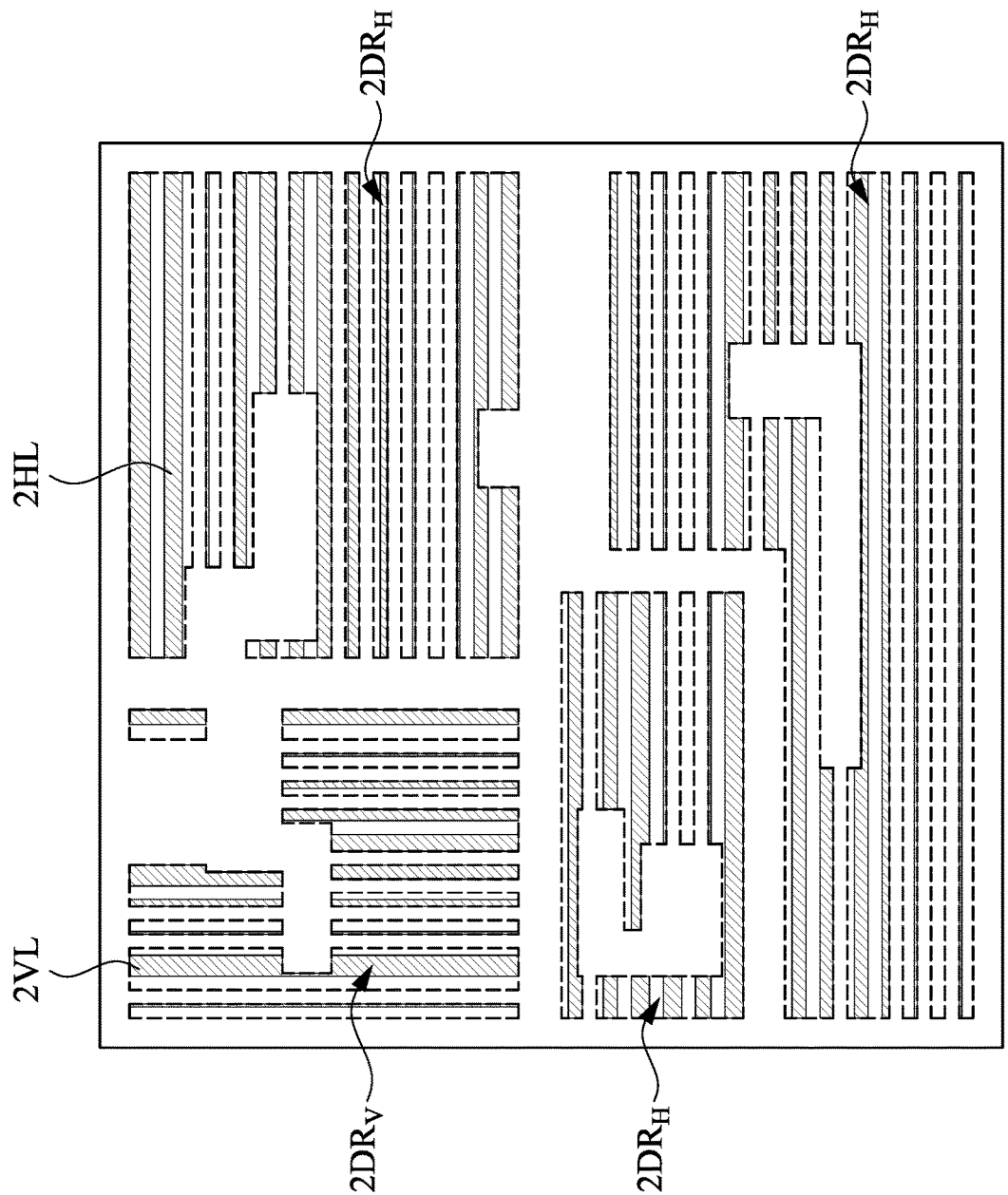

Reference is made to FIG. 23A-23G. The step S5 of FIG. 4A is performed, thereby converting the first modified layout 140L1 into a second modified layout 140L2. As illustrated above with respect to step S51, the second horizontal and vertical dummy regions $2DR_H$ and $2DR_V$ are determined, as shown in FIG. 23A. Subsequently, as illustrated above with respect to steps S52, the second horizontal and vertical dummy lines 2HL and 2VL are disposing in the second horizontal and vertical dummy regions $2DR_H$ and $2DR_V$, respectively, as shown in FIG. 23B. Then, as illustrated above with respect to steps S53, some second horizontal and vertical dummy lines 2HL/2VL are modified, as shown in FIGS. 23C-23G.

Figure 23C:
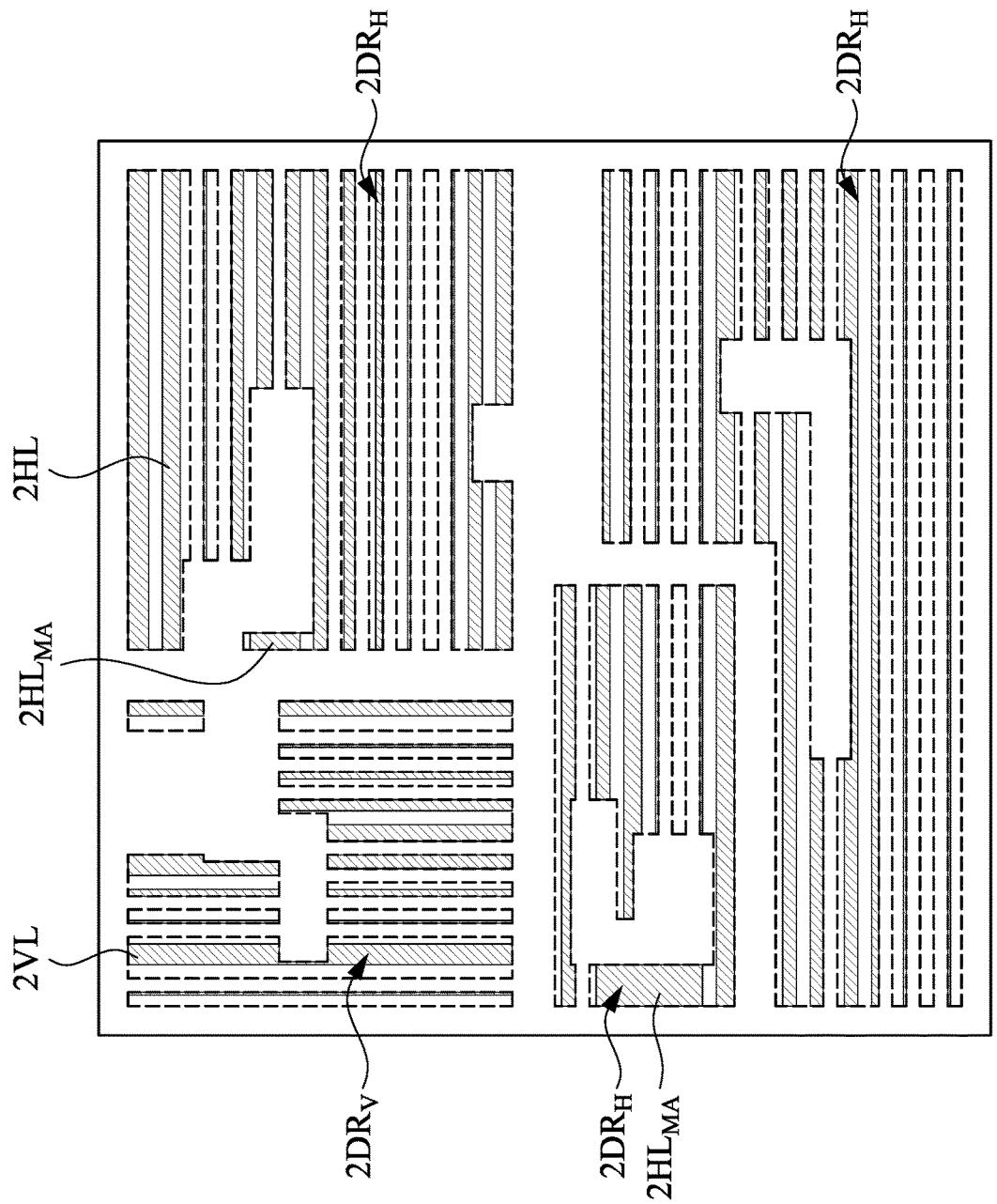
Figure 23D:
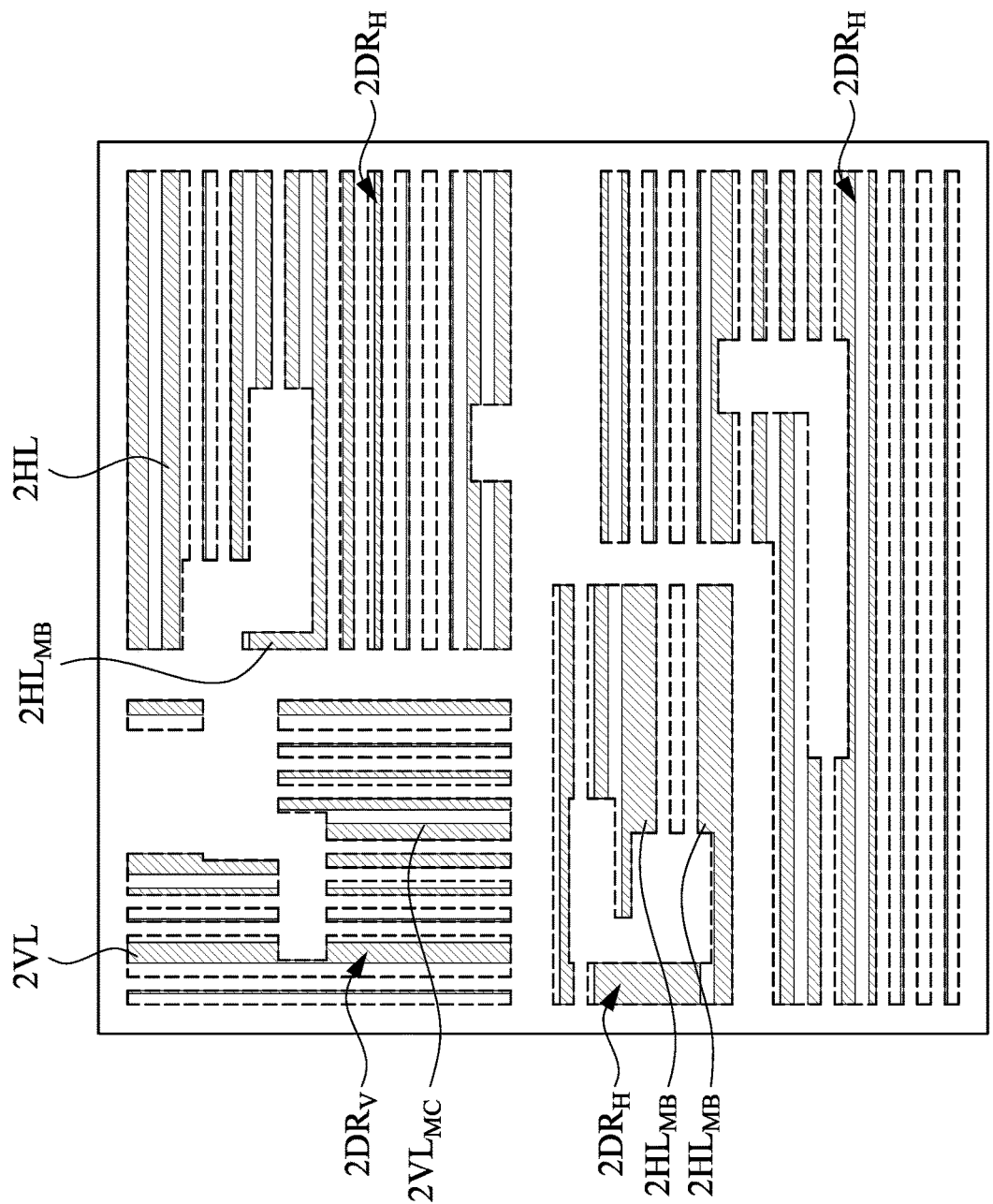

FIGS. 23C and 23D show the second modification process for eliminating undersized dummy lines, as illustrated previously with respect to FIGS. 10C-10E. In FIG. 23C, the second horizontal dummy lines 2HL having an area less than the first threshold value are merged with each other; and the second vertical dummy lines 2VL having an area less than the first threshold value are merged with each other, as the steps shown in FIGS. 10C and 10D. The merged second horizontal dummy lines are denoted as the lines $2HL_{MA}$ in FIG. 23C. Subsequently, in FIG. 22D, the second horizontal dummy lines 2HL having an area less than the first threshold value are merged with another adjacent second horizontal dummy lines 2HL having an area equal to or greater than the first threshold; and the second vertical dummy lines 2VL having an area less than the first threshold value are merged with another adjacent second horizontal dummy lines 2VL having an area equal to or greater than the first threshold, as the steps shown in FIG. 10E. The merged second horizontal/vertical dummy lines are denoted as the lines $2HL_{MB}$ in FIG. 23D.

Figure 23E:
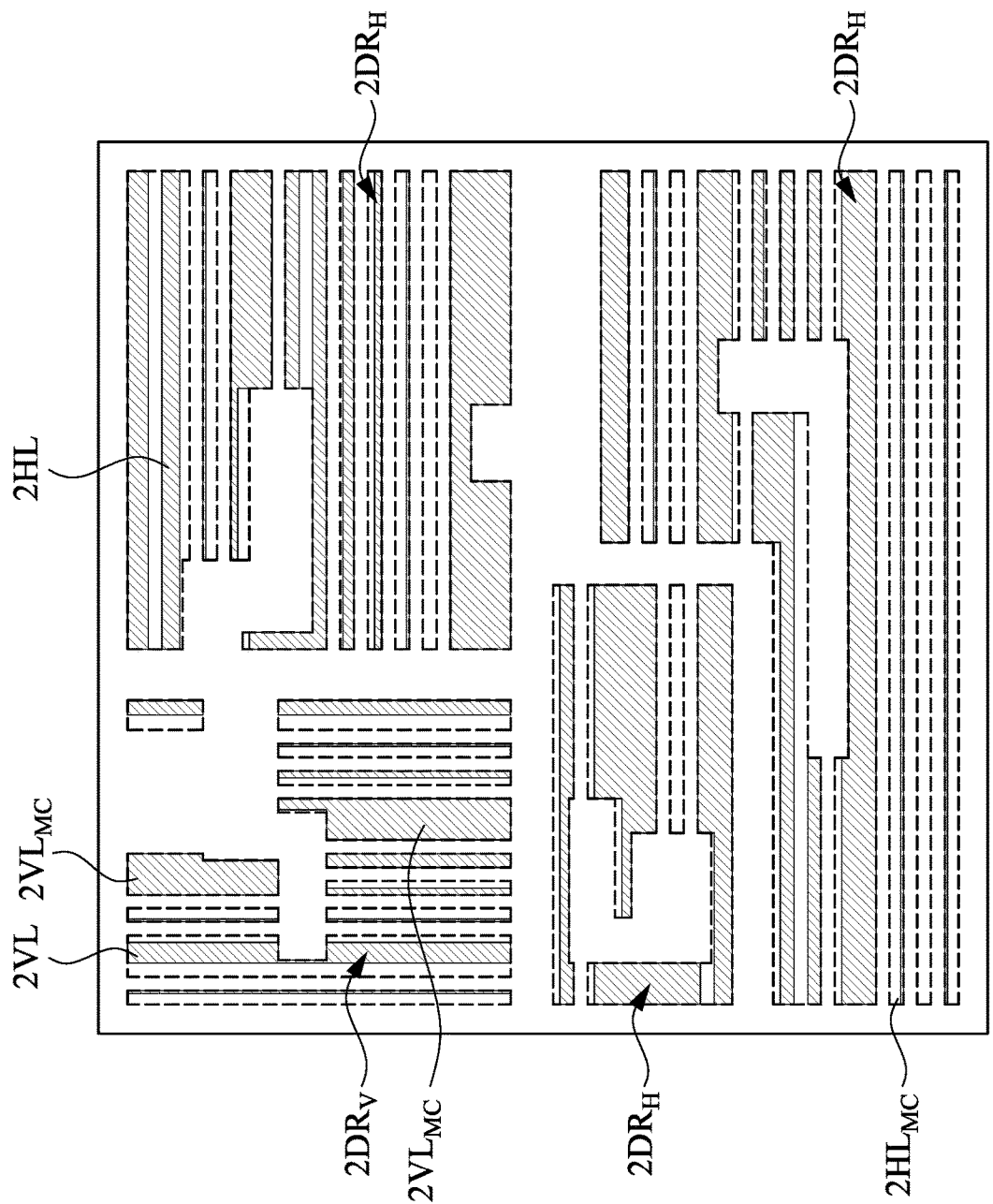

FIG. 23E shows the third modification process for eliminating the dummy line having a portion that is too narrow, as illustrated previously with respect to FIGS. 10F-10G. The modified second horizontal/vertical dummy lines are denoted as the lines $2HL_{MC}/2VL_{MC}$ in FIG. 23E.

Figure 23F:
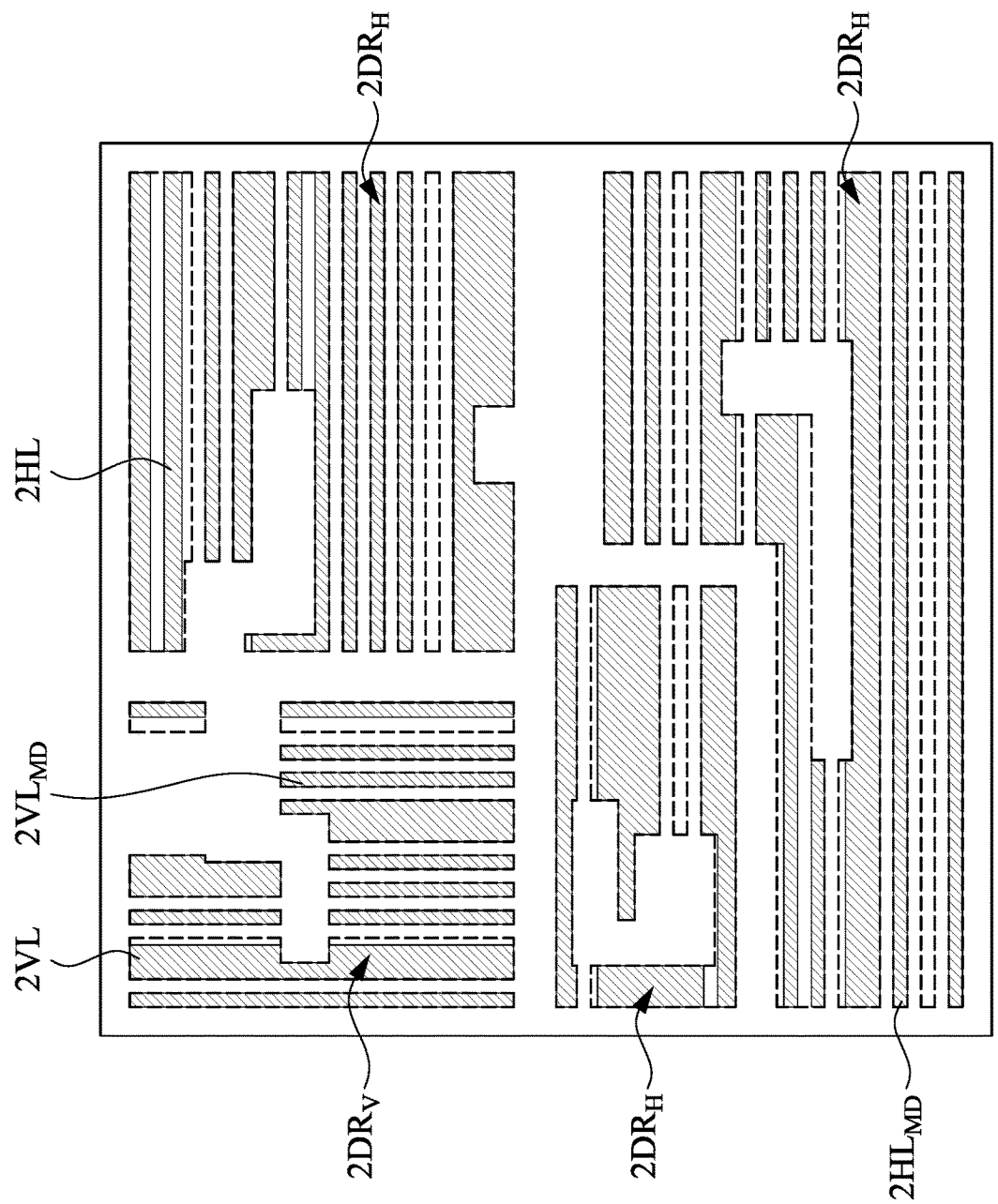

FIG. 23F shows the first modification process for modifying outermost/edgemost dummy lines. The outermost/edgemost ones of the second horizontal dummy lines 2HL are adjusted to meet/align with the horizontal edges of the second horizontal dummy regions $2DR_H$. The outermost/edgemost ones of the second vertical dummy lines 2VL are adjusted to meet/align with the vertical edges of the second vertical dummy regions $2DR_V$. The adjusted second horizontal/vertical dummy lines are denoted as the lines $2HL_{MD}/2VL_{MD}$ in FIG. 23F.

Figure 23G:
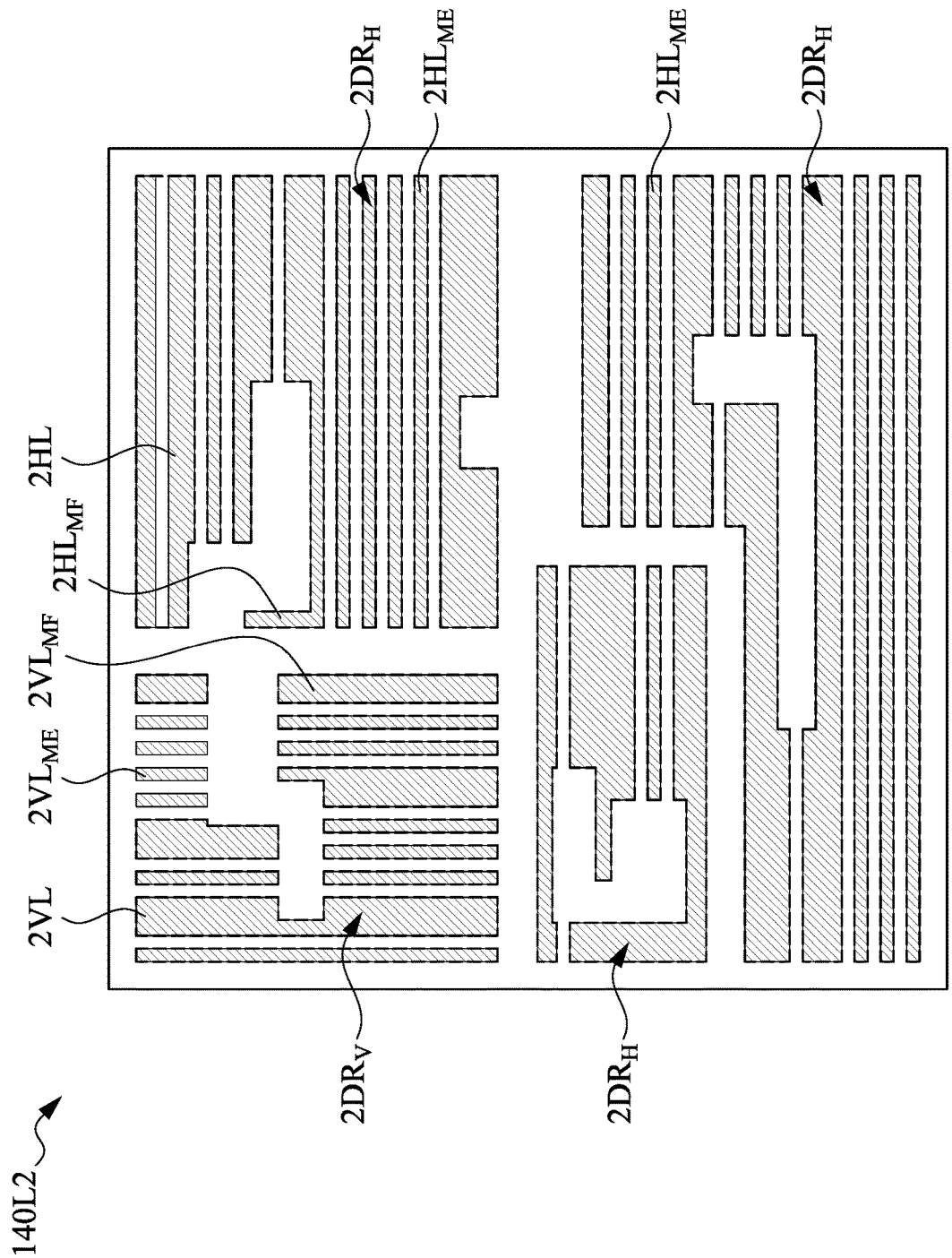

In FIG. 23G, for ensuring the fixed space (e.g., the minimum line space), if a space between adjacent dummy lines is greater than the fixed space (e.g., the minimum line space), the dummy lines of the layout 140L1 of FIG. 22F may be kept in the layout. For example, if a space between adjacent dummy lines is greater than the fixed space (e.g., the minimum line space), some first dummy lines 1VL/1HL (referring to FIG. 22F) that are in the space but not overlap the second dummy lines 2HL/2VL, are added into the layout in FIG. 23F and denoted as second dummy lines $2VL_{ME}/2HL_{ME}$ in FIG. 23G. Subsequently, if a space between adjacent dummy lines is greater than the fixed space (e.g., the minimum line space), some first dummy lines 1VL/1HL (referring to FIG. 22F) that are in the space and overlapping the second dummy lines 2HL/2VL, are added and merged with the second dummy lines 2HL/2VL, and the merged dummy lines are denoted as dummy lines $2VL_{MF}/2HL_{MF}$ in FIG. 23G.

For ensuring the fixed space (e.g., the minimum line space), the dummy lines of the layout 140L1 of FIG. 22F that does not touch the second dummy lines 2HL/2VL are kept in the layout. For example, the first dummy lines 1VL/1HL of FIG. 22F are added into the layout and denoted as second dummy lines $2VL_{ME}/2HL_{ME}$ in FIG. 23F. Subsequently, if a space between adjacent dummy lines is greater than the fixed space (e.g., the minimum line space), the first dummy lines 1HL/1VL (referring to FIG. 22F) in the space are added and merged with the second dummy lines 2HL/2VL, the merged dummy lines are denoted as dummy lines $2VL_{MF}/2HL_{MF}$ in FIG. 23G. Therefore, a second modified layout 140L2 is obtained.

Figure 24A:
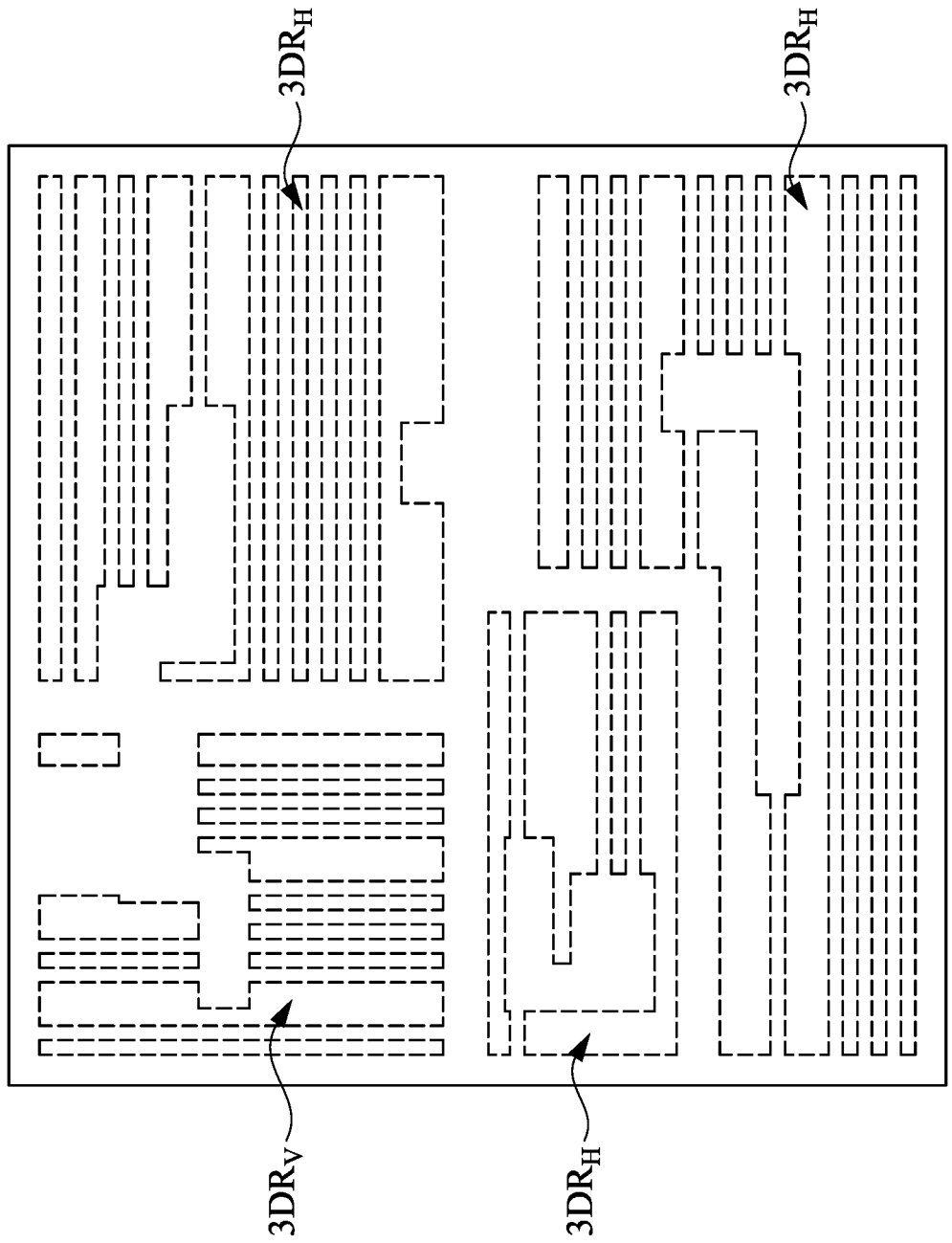
Figure 24B:
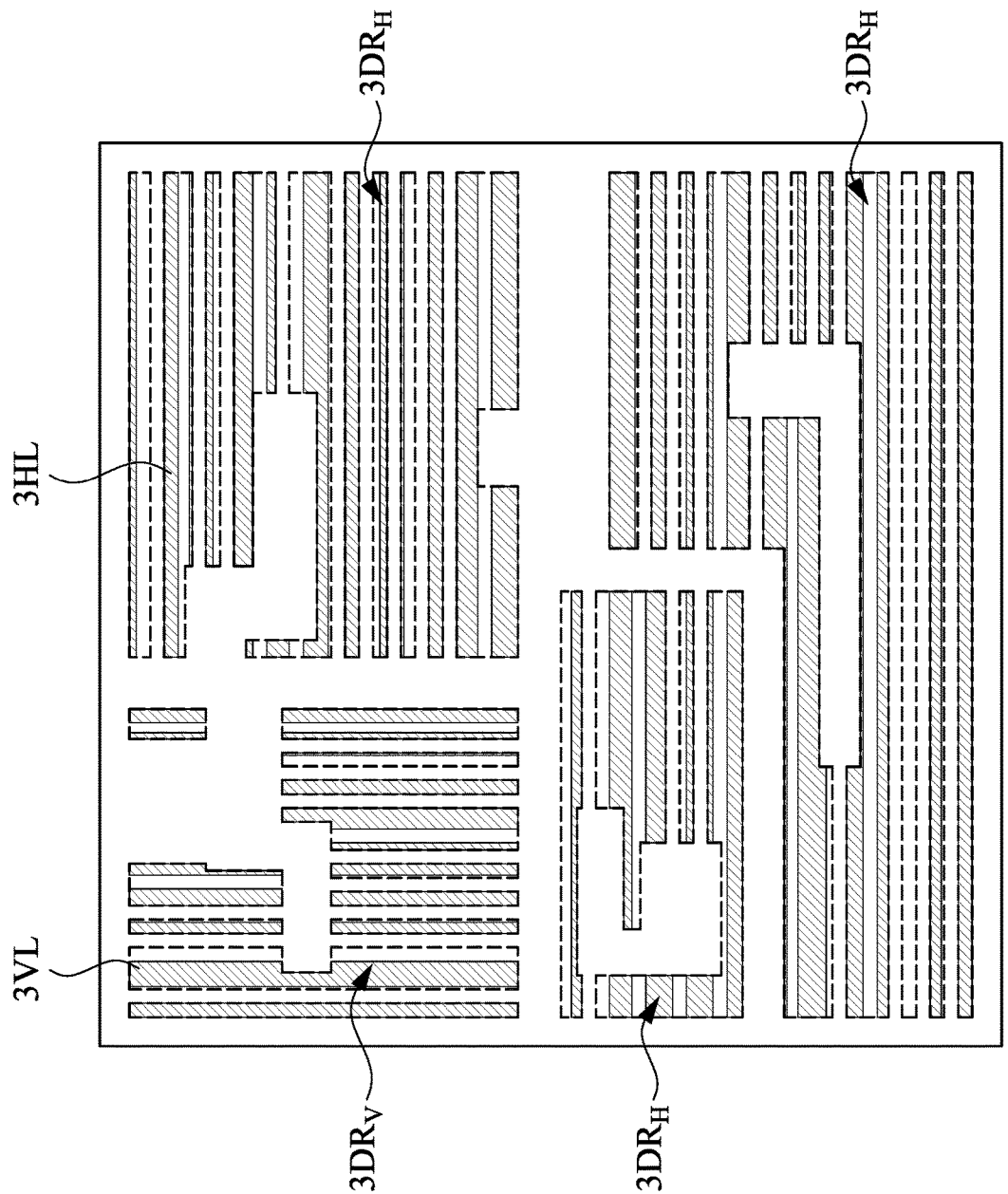

Referring to FIGS. 24A-24G. The step S6 of FIG. 4B is performed, thereby converting the second modified layout 140L2 into a third modified layout 140L3. As illustrated above with respect to step S61, third horizontal and vertical dummy regions $3DR_H$ and $3DR_V$ are determined, as shown in FIG. 24A. Subsequently, as illustrated above with respect to steps S62, and the third horizontal and vertical dummy lines 3HL and 3VL are disposing in the third horizontal and vertical dummy regions $3DR_H$ and $3DR_V$, respectively, as shown in FIG. 24B. Then, as illustrated above with respect to steps S63, some third horizontal and vertical dummy lines 3HL/3VL are modified, as shown in FIGS. 24C-24G.

Figure 24C:
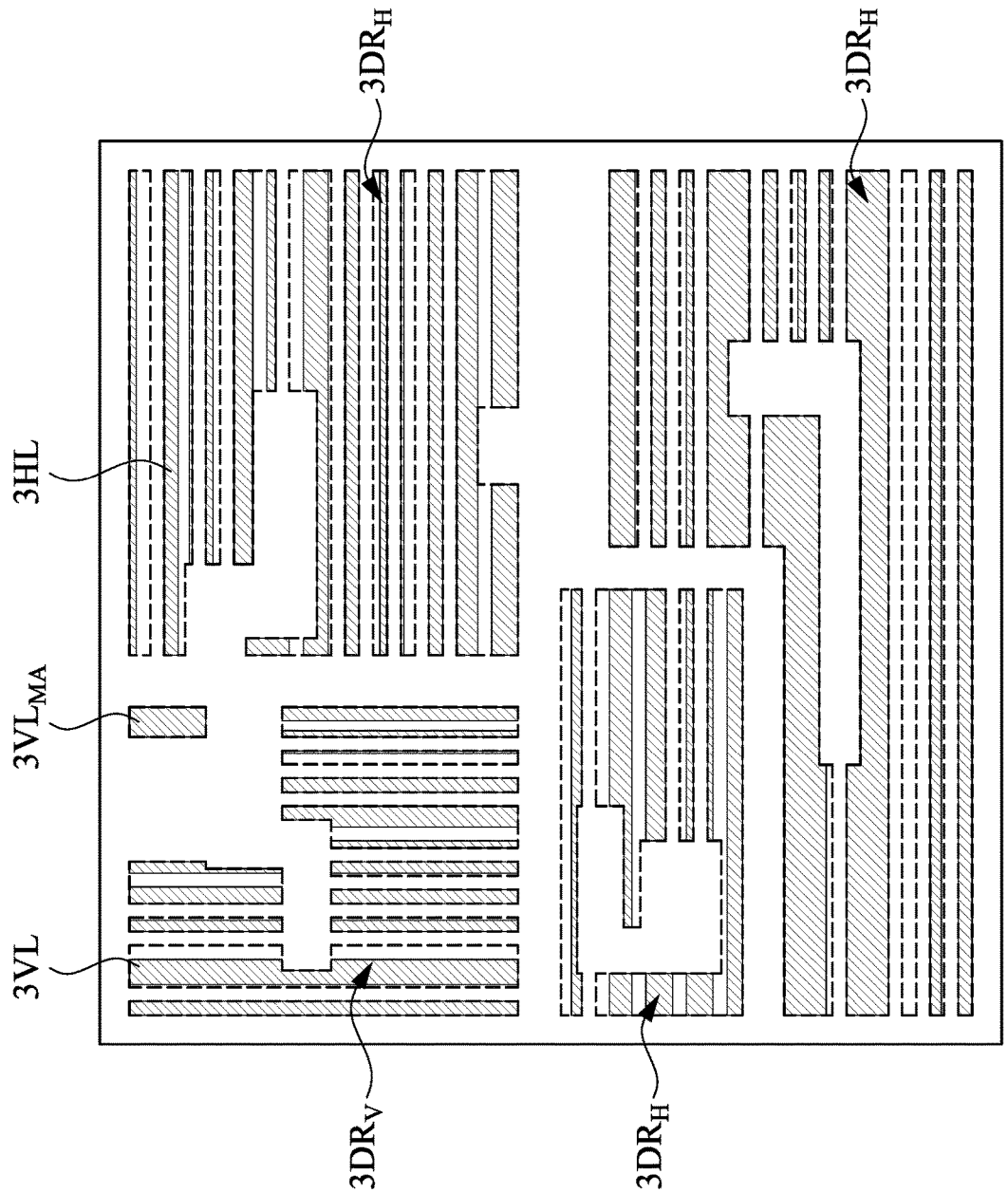
Figure 24D:
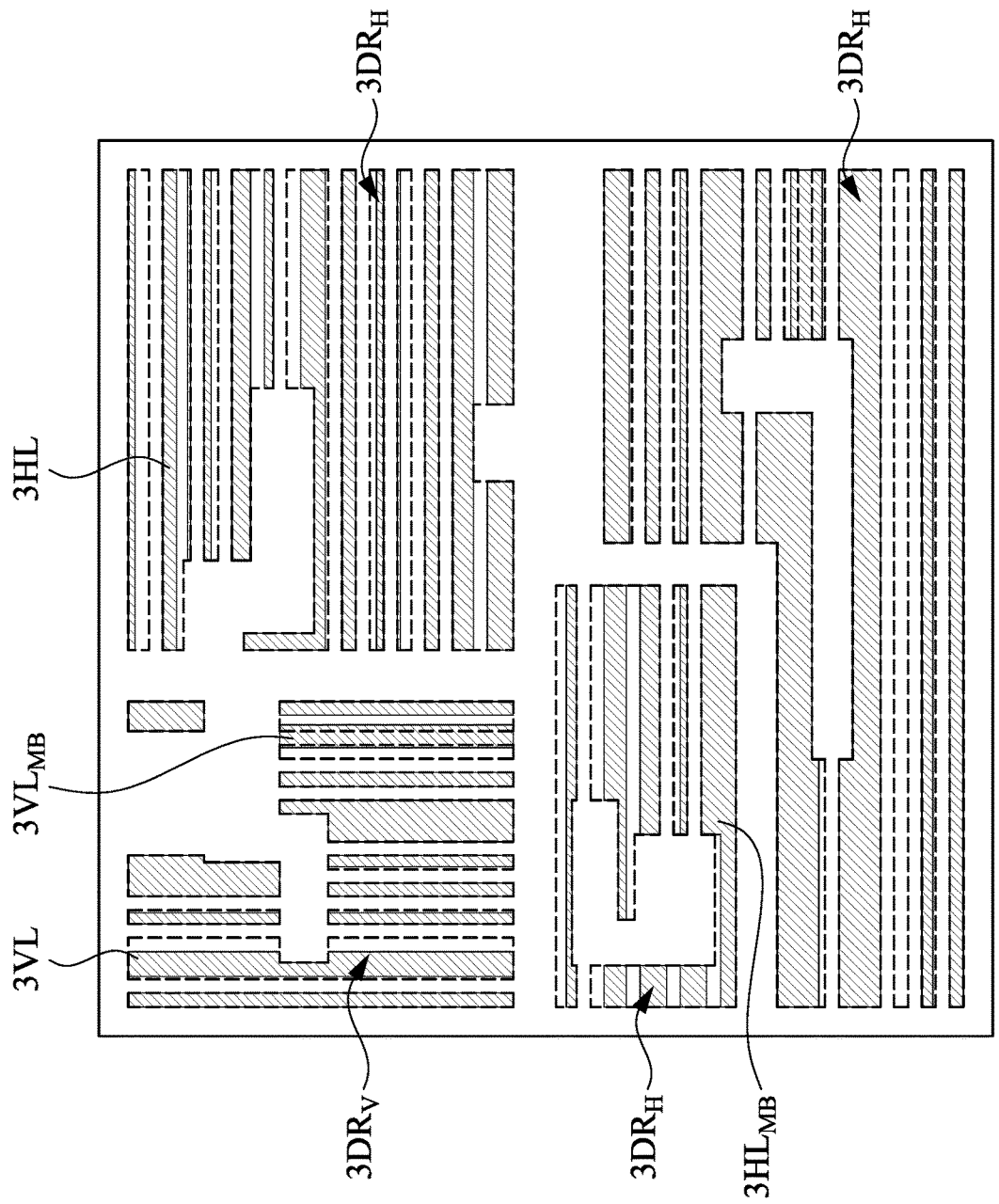

FIGS. 24C and 24D show the second modification process for eliminating undersized dummy lines, as illustrated previously with respect to FIGS. 10C-10E. In FIG. 24C, the third horizontal dummy lines 3HL having an area less than the first threshold value are merged with each other; and the third vertical dummy lines 3VL having an area less than the first threshold value are merged with each other, as the steps shown in FIGS. 10C and 10D. The merged third vertical dummy lines are denoted as the lines $3VL_{MA}$ in FIG. 24C. Subsequently, in FIG. 24D, the third horizontal dummy lines 3HL having an area less than the first threshold value are merged with another adjacent third horizontal dummy lines 3HL having an area equal to or greater than the first threshold; and the third vertical dummy lines 3VL having an area less than the third threshold value are merged with another adjacent third vertical dummy lines 3VL having an area equal to or greater than the first threshold, as the steps shown in FIG. 10E. The merged third horizontal/vertical dummy lines are denoted as the lines $3HL_{MB}$ in FIG. 24D.

Figure 24E:
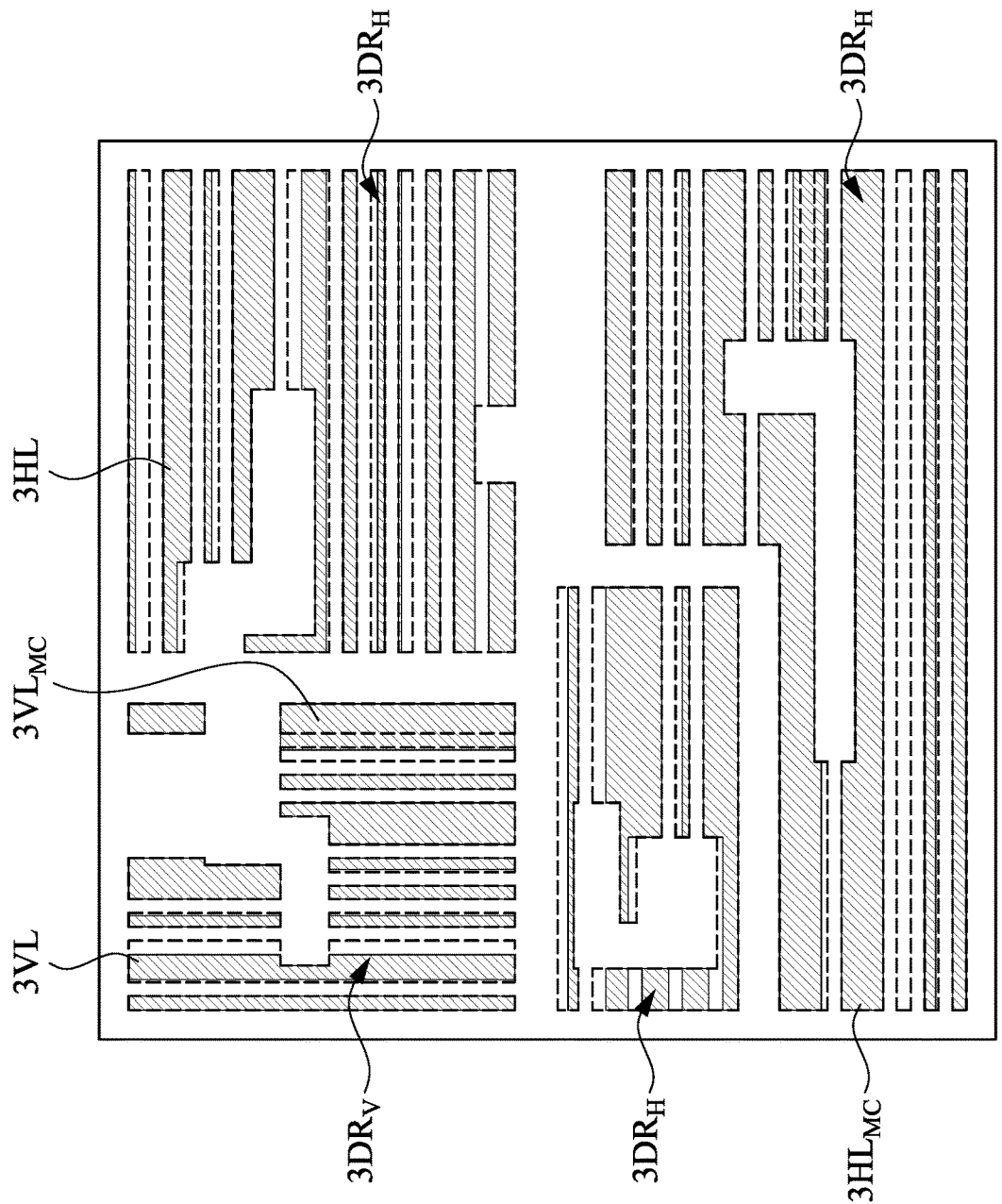

FIG. 24E shows the third modification process for eliminating the dummy line having a portion that is too narrow, as illustrated previously with respect to FIGS. 10E-10G. The modified third horizontal/vertical dummy lines are denoted as the lines $3HL_{MC}/3VL_{MC}$ in FIG. 24E.

Figure 24F:
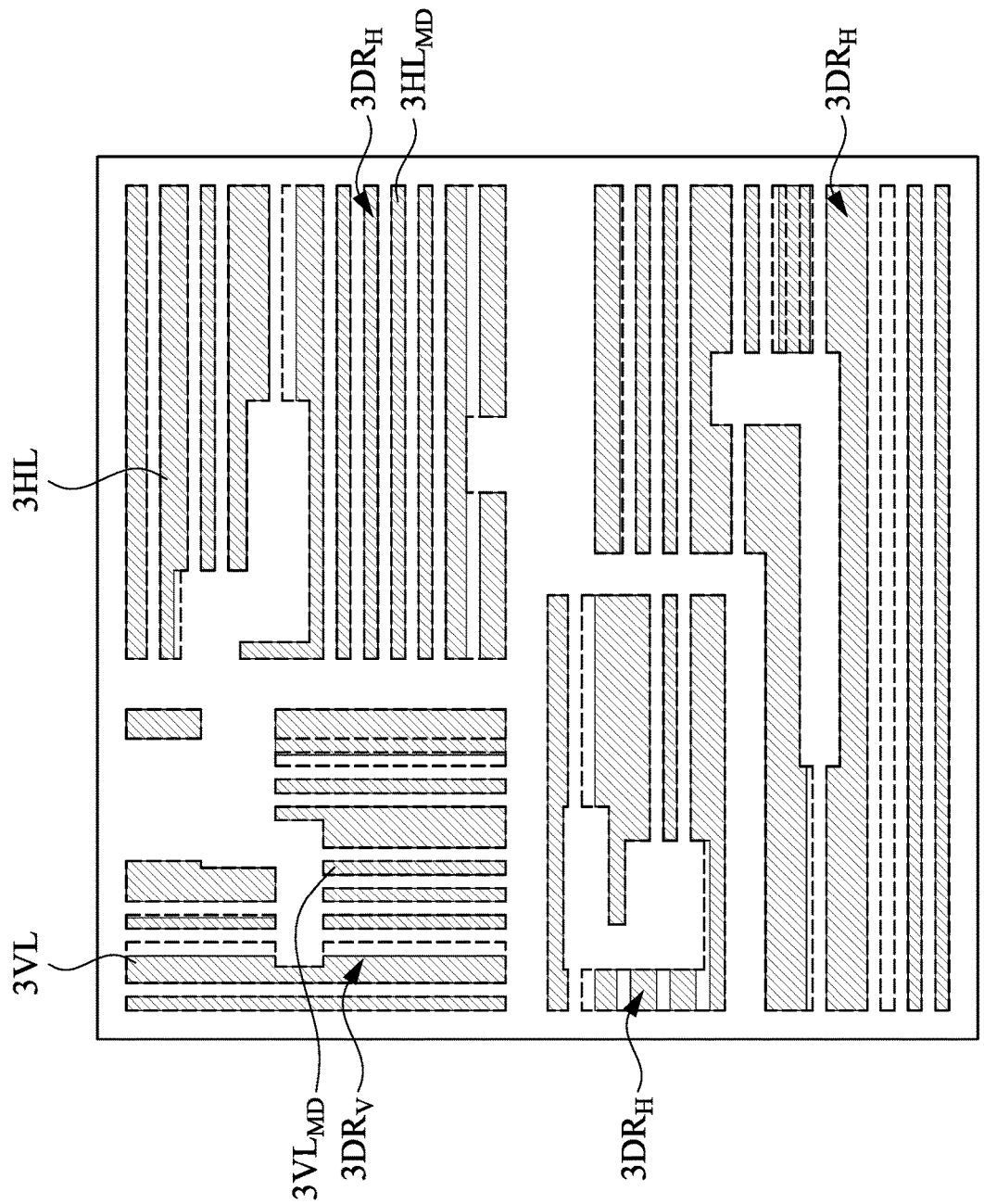

FIG. 24F shows the first modification process for modifying outermost/edgemost dummy lines. The outermost/edgemost ones of the third horizontal dummy lines 3HL are adjusted to meet/align with the horizontal edges of the third horizontal dummy regions $3DR_H$. The outermost/edgemost ones of the third vertical dummy lines 3VL are adjusted to meet/align with the vertical edges of the third vertical dummy regions $3DR_V$. The adjusted third horizontal/vertical dummy lines are denoted as the lines $3HL_{MD}/3VL_{MD}$ in FIG. 24F.

In FIG. 24G, for ensuring the fixed space (e.g., the minimum line space), if a space between adjacent dummy lines is greater than the fixed space (e.g., the minimum line space), the dummy lines of the layout 140L2 of FIG. 23G may be kept in the layout. For example, if a space between adjacent dummy lines is greater than the fixed space (e.g., the minimum line space), some second dummy lines 2VL/2HL (referring to FIG. 23G) that are in the space but not overlap the third dummy lines 3HL/3VL, are added into the layout in FIG. 24F and denoted as third dummy lines $3VL_{ME}/3HL_{ME}$ in FIG. 24F. Subsequently, if a space between adjacent dummy lines is greater than the fixed space (e.g., the minimum line space), some second dummy lines 2VL/2HL (referring to FIG. 23G) that are in the space and overlapping the third dummy lines 3HL/3VL, are added and merged with the third dummy lines 3HL/3VL, and the merged dummy lines are denoted as dummy lines $3VL_{MF}/3HL_{MF}$ in FIG. 24G. Therefore, a third modified layout 140L3 is obtained.

Figure 25A:
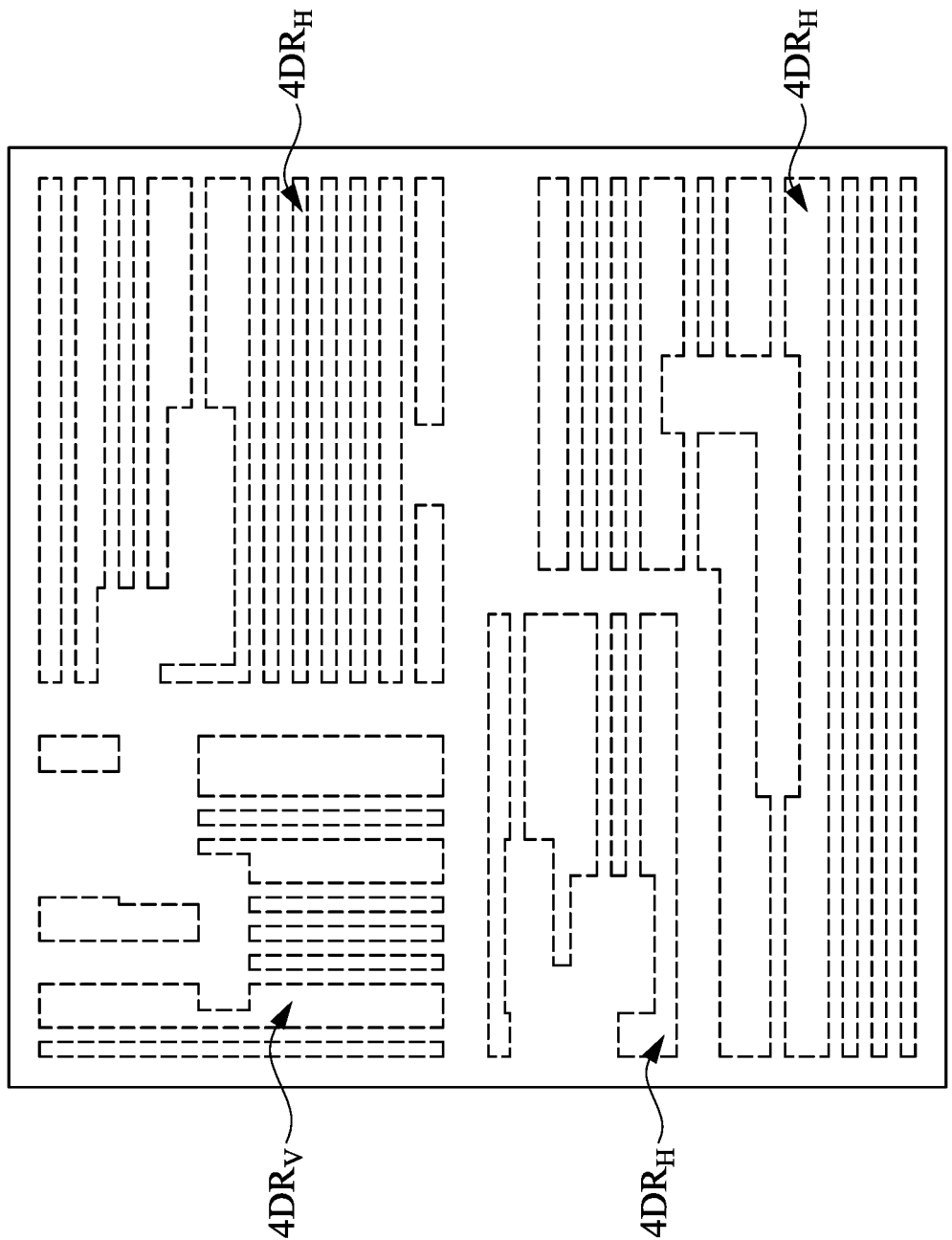
Figure 25B:
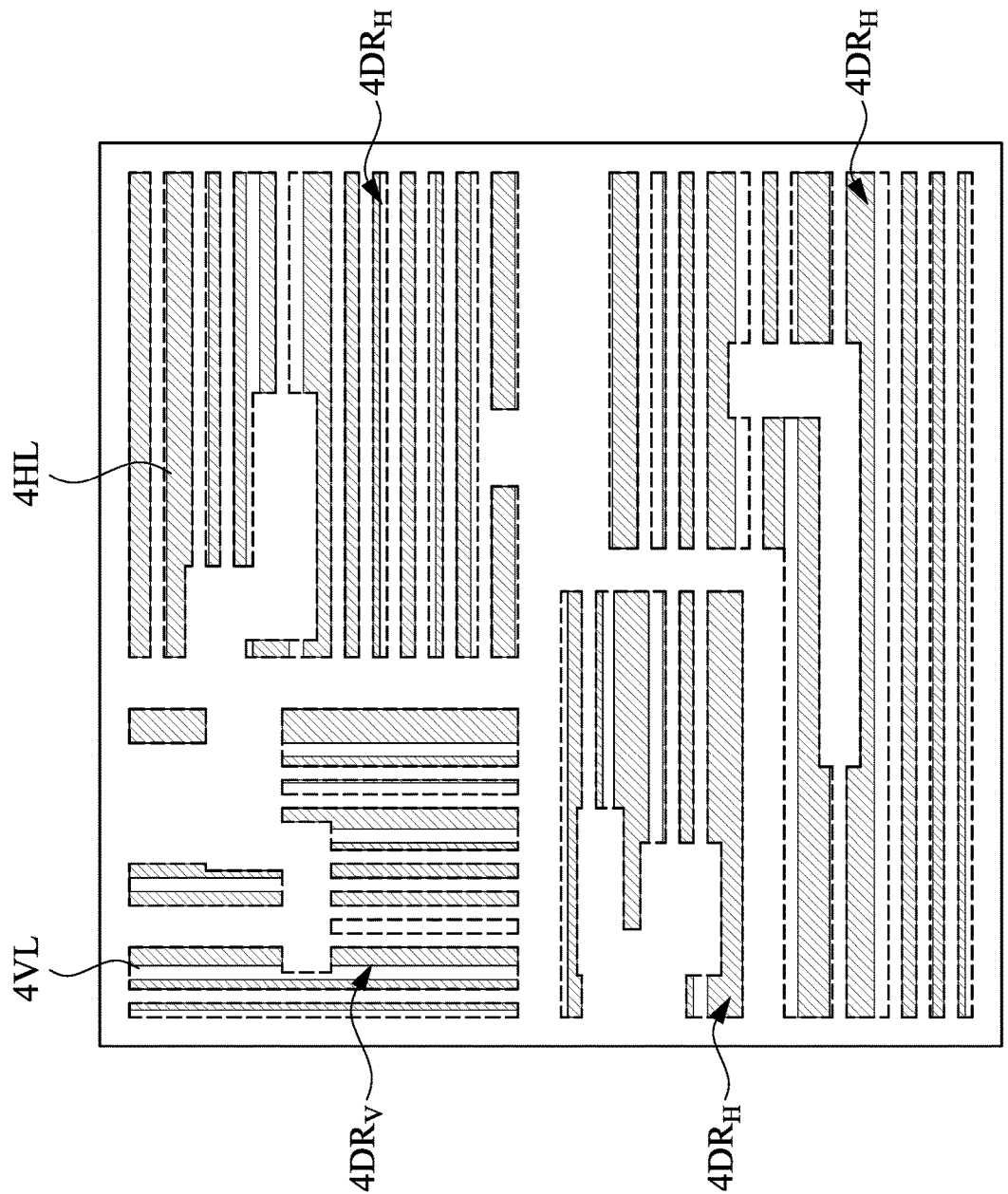

Referring to FIGS. 25A-25G. The step S7 of FIG. 4B is performed, thereby converting the third modified layout 140L3 into a fourth modified layout 140L4. As illustrated above with respect to steps S71, fourth horizontal and vertical dummy regions $4DR_H$ and $4DR_V$ are determined, as shown in FIG. 25A. Subsequently, as illustrated above with respect to steps S72, fourth horizontal and vertical dummy lines 4HL and 4VL are disposing in the fourth horizontal and vertical dummy regions $4DR_H$ and $4DR_V$, respectively, as shown in FIG. 25B. Then, as illustrated above with respect to steps S73, some fourth horizontal and vertical dummy lines 4HL/4VL are modified, as shown in FIGS. 25C-25G.

Figure 25C:
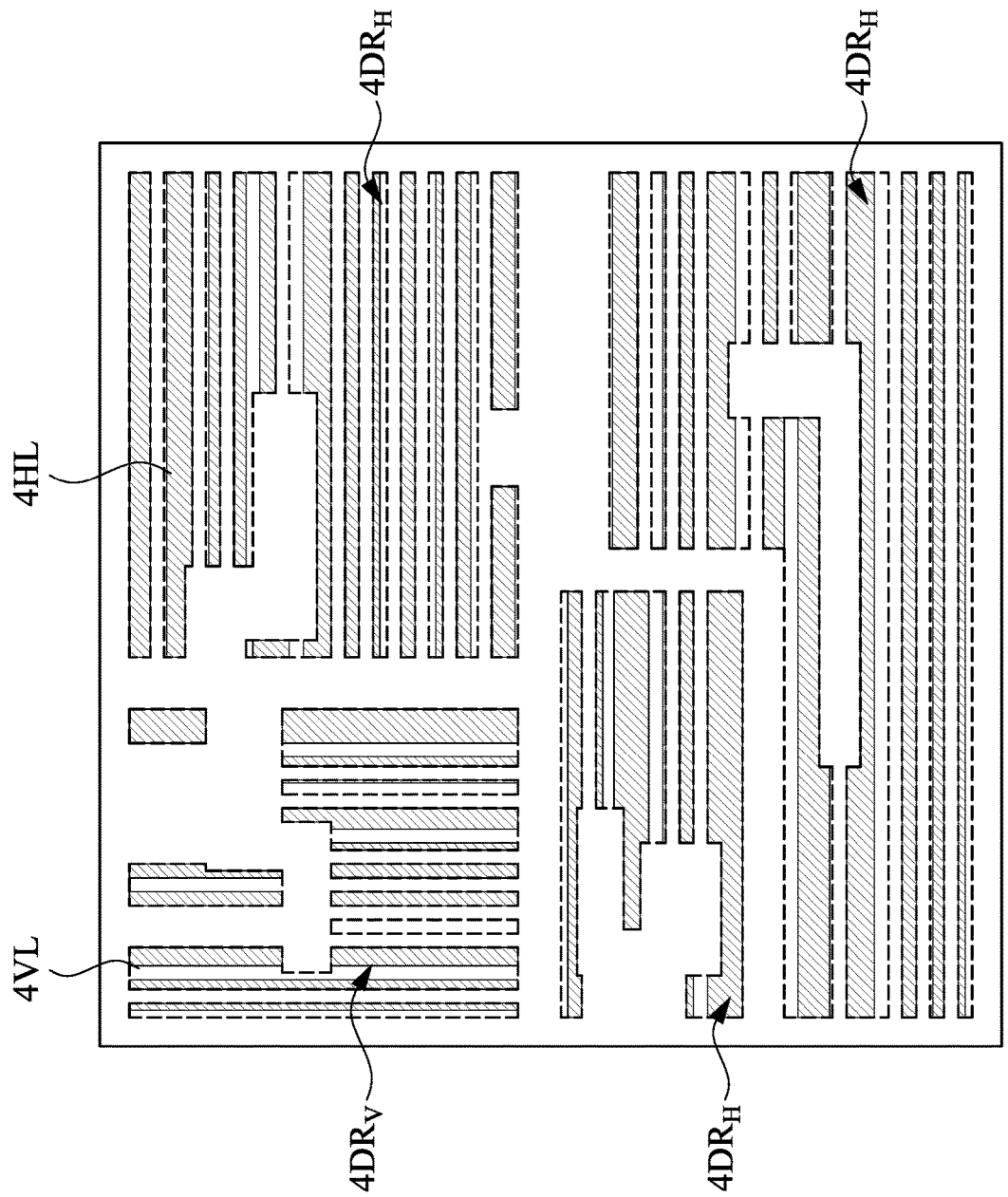
Figure 25D:
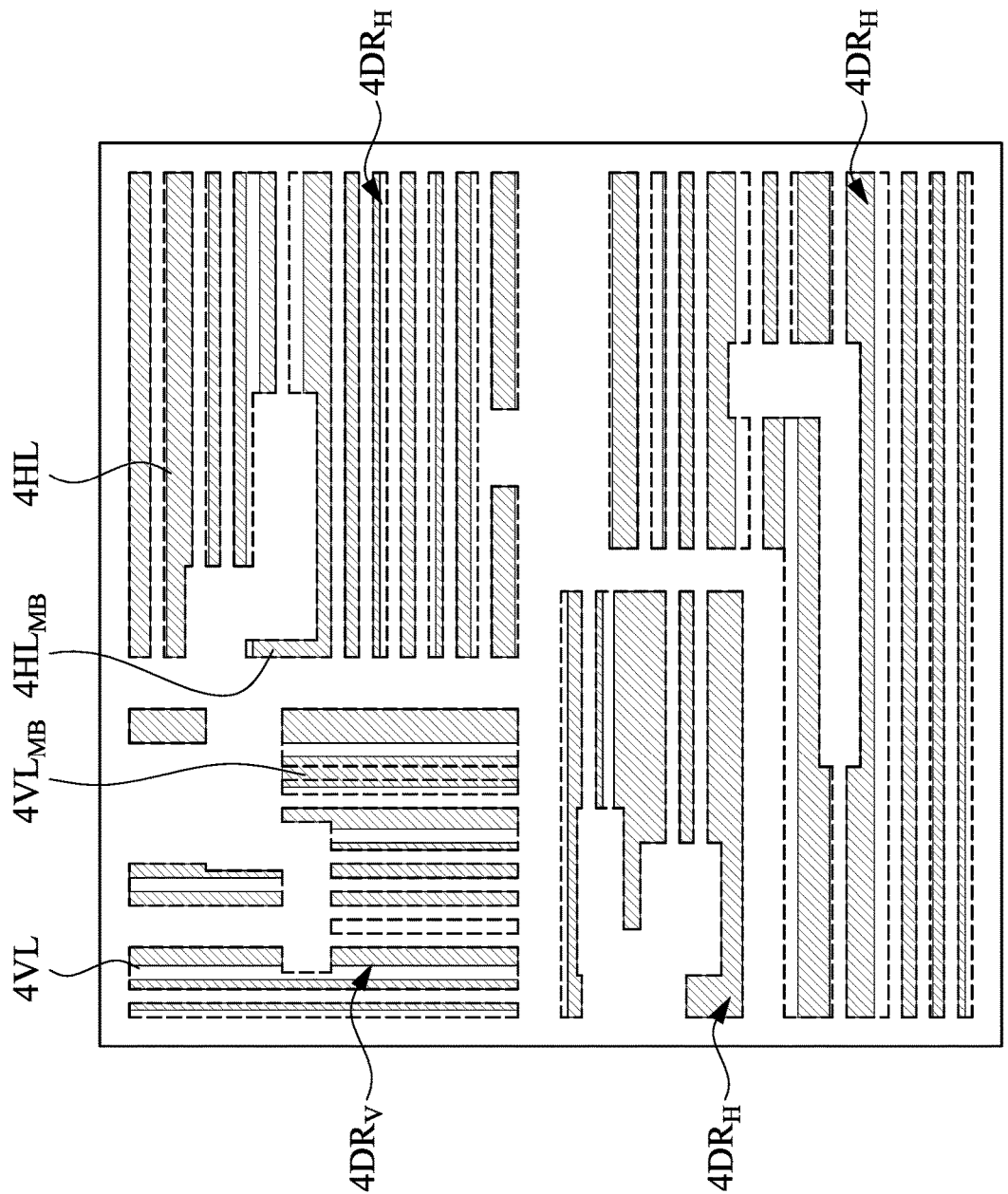

FIGS. 25C and 25D show the second modification process for eliminating undersized dummy lines, as illustrated previously with respect to FIGS. 10C-10E. In FIG. 25C, the fourth horizontal dummy lines 4HL having an area less than the first threshold value are merged with each other; and the fourth vertical dummy lines 4VL having an area less than the first threshold value are merged with each other, as the steps shown in FIGS. 10C and 10D. In the present embodiments, the dummy lines 4HL/4VL having areas less the first threshold value are spaced from each other by the dummy lines 4HL/4VL having areas greater or equal to the first threshold value, and thus no dummy lines 4HL/4VL are merged at this step in FIG. 25C. Subsequently, in FIG. 25D, the fourth horizontal/vertical dummy lines 4HL/VL having an area less than the first threshold value are merged with another adjacent fourth horizontal/vertical dummy lines 4HL/4VL having an area equal to or greater than the first threshold, as the steps shown in FIG. 10E. The fourth third horizontal/vertical dummy lines are denoted as the lines $4HL_{MB}$ in FIG. 25D.

Figure 25E:
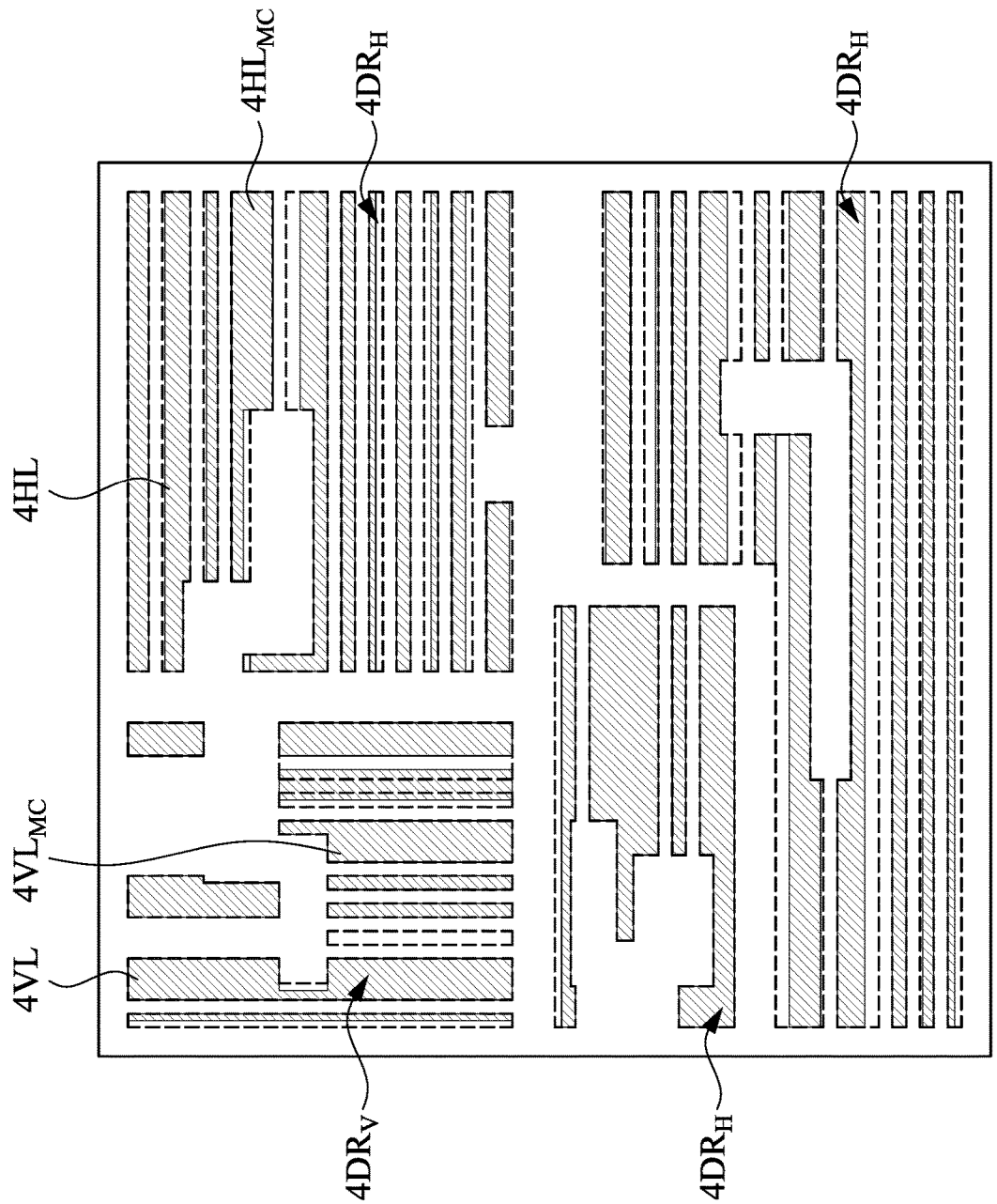

FIG. 25E shows the third modification process for eliminating the dummy line having a portion that is too narrow, as illustrated previously with respect to FIGS. 10F-10G. The modified fourth horizontal/vertical dummy lines are denoted as the lines $4HL_{MC}/4VL_{MC}$ in FIG. 25E.

Figure 25F:
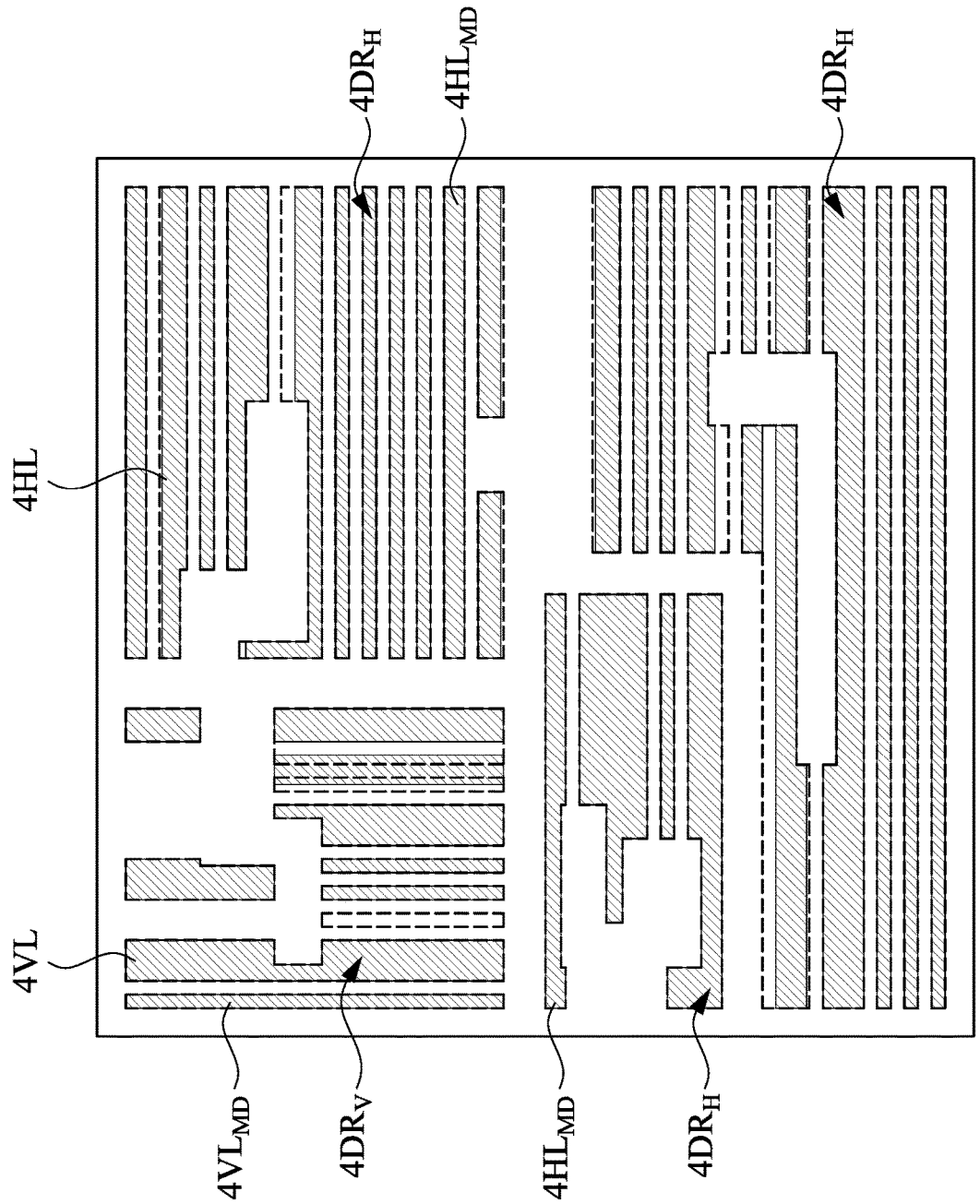

FIG. 25F shows the first modification process for modifying outermost/edgemost dummy lines. The outermost/edgemost ones of the fourth horizontal dummy lines 4HL are adjusted to meet/align with the horizontal edges of the fourth horizontal dummy regions $4DR_H$. The outermost/edgemost ones of the fourth vertical dummy lines 4VL are adjusted to meet/align with the vertical edges of the fourth vertical dummy regions $4DR_V$. The adjusted fourth horizontal/vertical dummy lines are denoted as the lines $4HL_{MD}/4VL_{MD}$ in FIG. 25F.

Figure 25G:
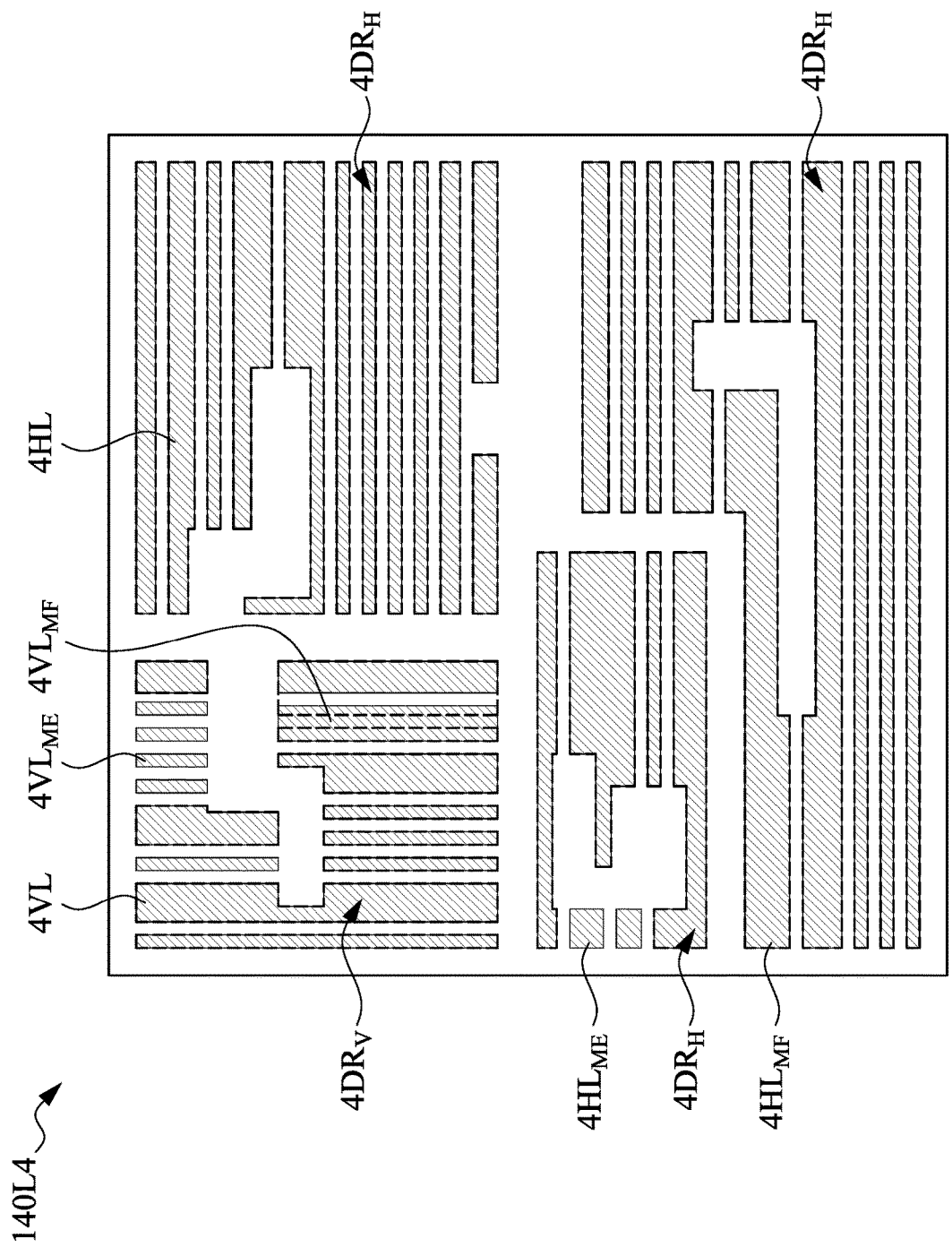

In FIG. 25G, for ensuring the fixed space (e.g., the minimum line space), if a space between adjacent dummy lines is greater than the fixed space (e.g., the minimum line space), the dummy lines of the layout 140L3 of FIG. 24G may be kept in the layout. For example, if a space between adjacent dummy lines is greater than the fixed space (e.g., the minimum line space), some third dummy lines 3VL/3HL (referring to FIG. 24G) that are in the space but not overlap the fourth dummy lines 4HL/4VL, are added into the layout in FIG. 25F and denoted as fourth dummy lines $4VL_{ME}/4HL_{ME}$ in FIG. 25F. Subsequently, if a space between adjacent dummy lines is greater than the fixed space (e.g., the minimum line space), some third dummy lines 3HL/3VL (referring to FIG. 24G) that are in the space and overlapping the fourth dummy lines 4HL/4VL, are added and merged with the fourth dummy lines 4HL/4VL, and the merged dummy lines are denoted as dummy lines $4VL_{MF}/4HL_{MF}$ in FIG. 25G. Therefore, a third modified layout 140L4 is obtained.

Figure 26:
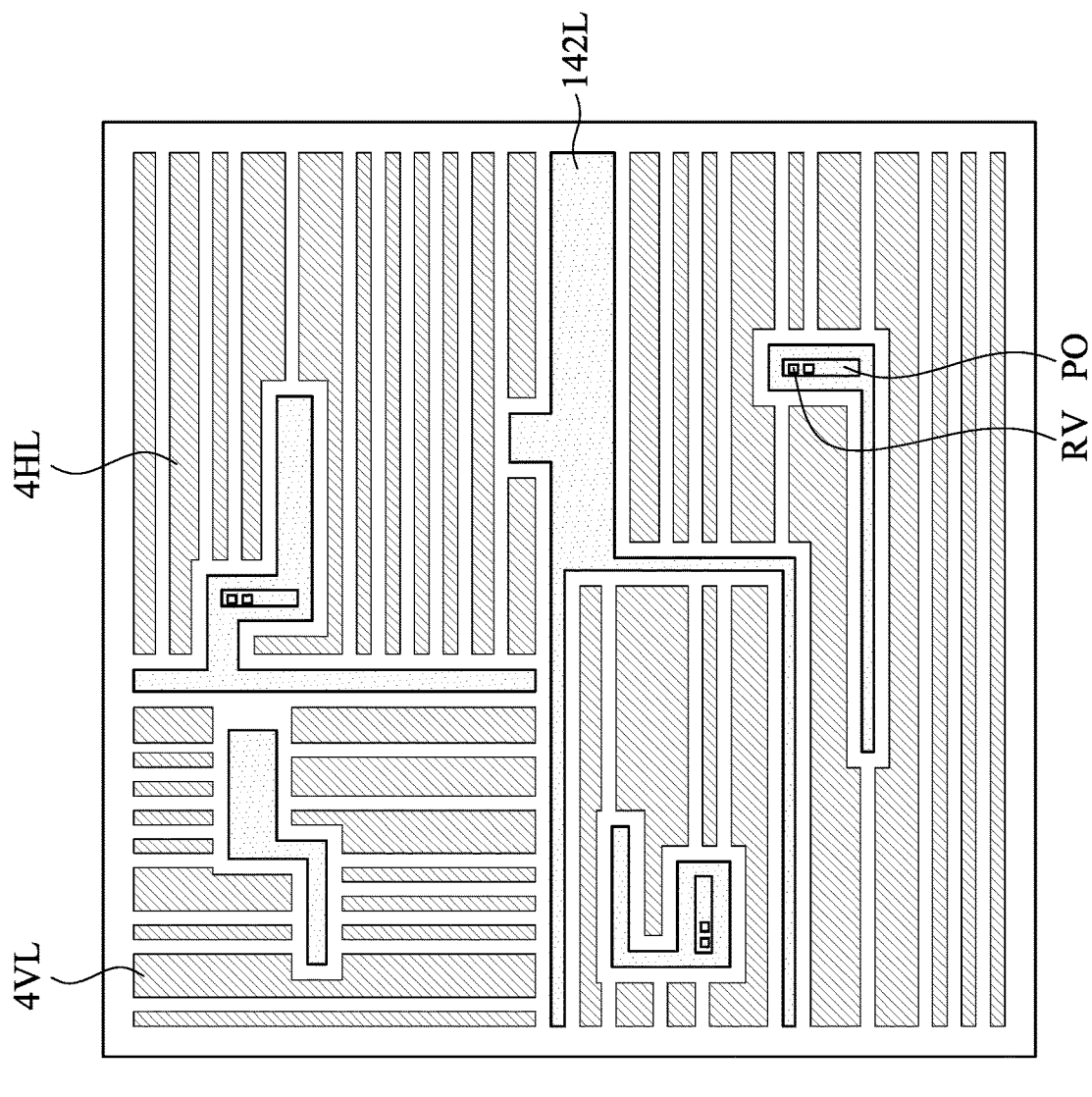

The layout 140L4 can be added to the layout of FIG. 20, thereby obtaining a modified RDL layout 140L4 as shown in FIG. 26. In FIG. 26, the opening region PO indicates the opening of the polymer layer that expose the redistribution line 142L, and the opening region RV indicates the opening of the first passivation layer that the redistribution line 142L extend through to reach a contact region of an interconnect structure. The opening region PO and the opening region RV may be shown in the layout or omitted from the layout when preparing and modifying the layout.

Figure 27:
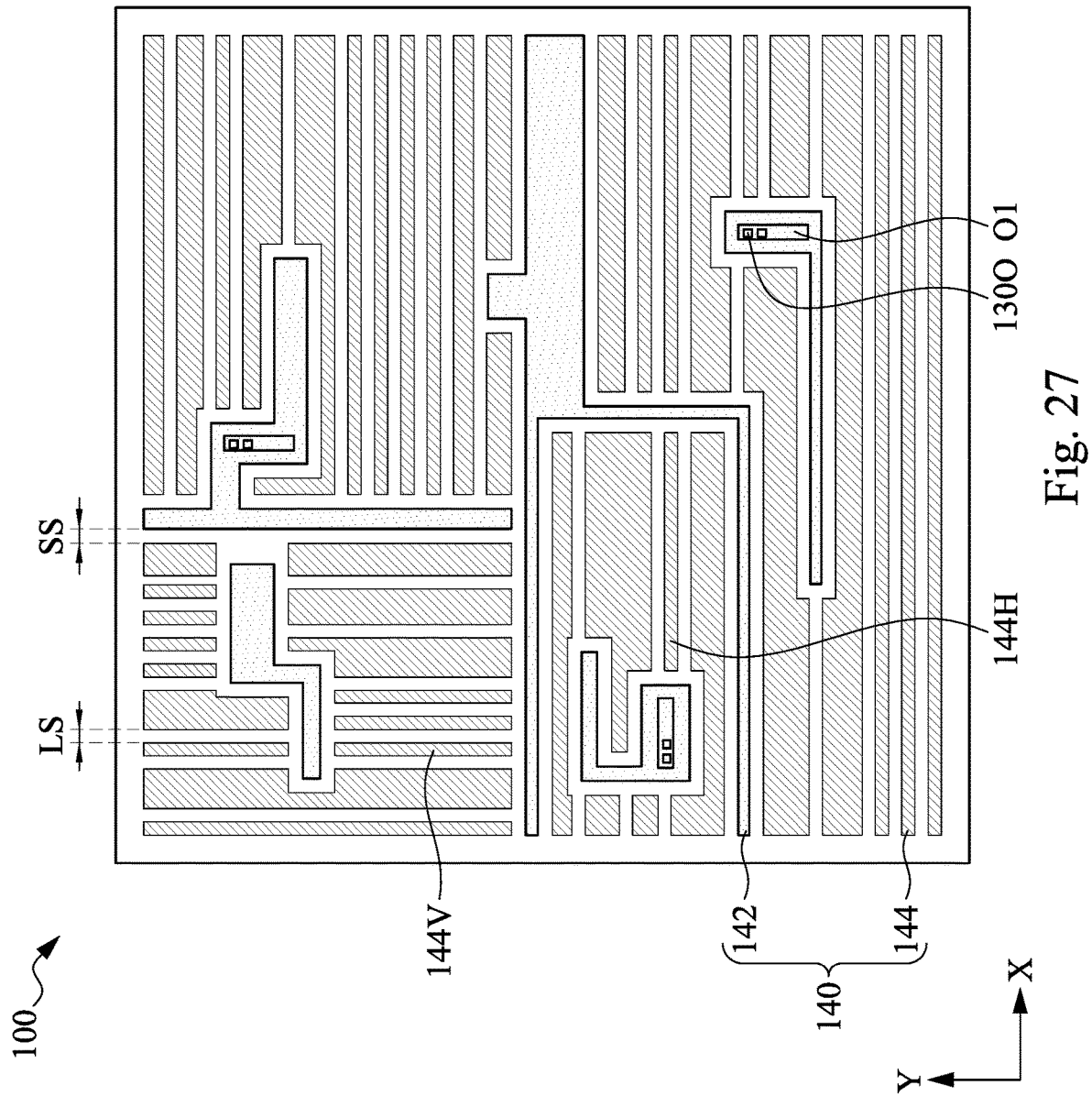
FIG. 27 is a top view of a semiconductor device fabricated through the modified of FIG. 26.

FIG. 27 is a top view of a semiconductor device 100 fabricated through the modified of FIG. 26. As shown in FIG. 27, dummy redistribution lines 144 are distributed among the redistribution lines 142, and spaced from the redistribution lines 142 by the distance SS (e.g., minimum line space). The dummy redistribution lines 144 may extend vertically (e.g., dummy redistribution lines 144V) or horizontally (e.g., dummy redistribution lines 144H) according to the arrangement of the redistribution lines 142. Both the dummy redistribution lines 144H and 144V are spaced from each other by the line space LS (e.g., minimum line space). The dummy redistribution lines 144H/144V may have different line widths and shapes according to aforementioned arrangement and modification of the dummy redistribution lines. The width of the dummy redistribution lines 144H/144V may be greater than or equal to the line space LS.

In FIG. 27, the dummy redistribution line 144H extends along the direction X and are arranged in a sequence along the direction Y. Opposite ends of some dummy redistribution line 144H may be immediately adjacent the redistribution lines 142. The dummy redistribution lines 144V extends along the direction Y and are arranged in a sequence along the direction X. Opposite ends of some dummy redistribution line 144Y may be immediately adjacent the redistribution lines 142. In FIG. 27, the redistribution line 142 extend through the RV hole 1300 of the first passivation layer (corresponding to the opening region RV in FIG. 27) to reach a contact region of an interconnect structure. The opening O1 (corresponding to the opening region PO in FIG. 26) exposes the redistribution line 142, thereby allowing the subsequent UBM formation as illustrated in FIGS. 2A and 2I3.

Figure 28:
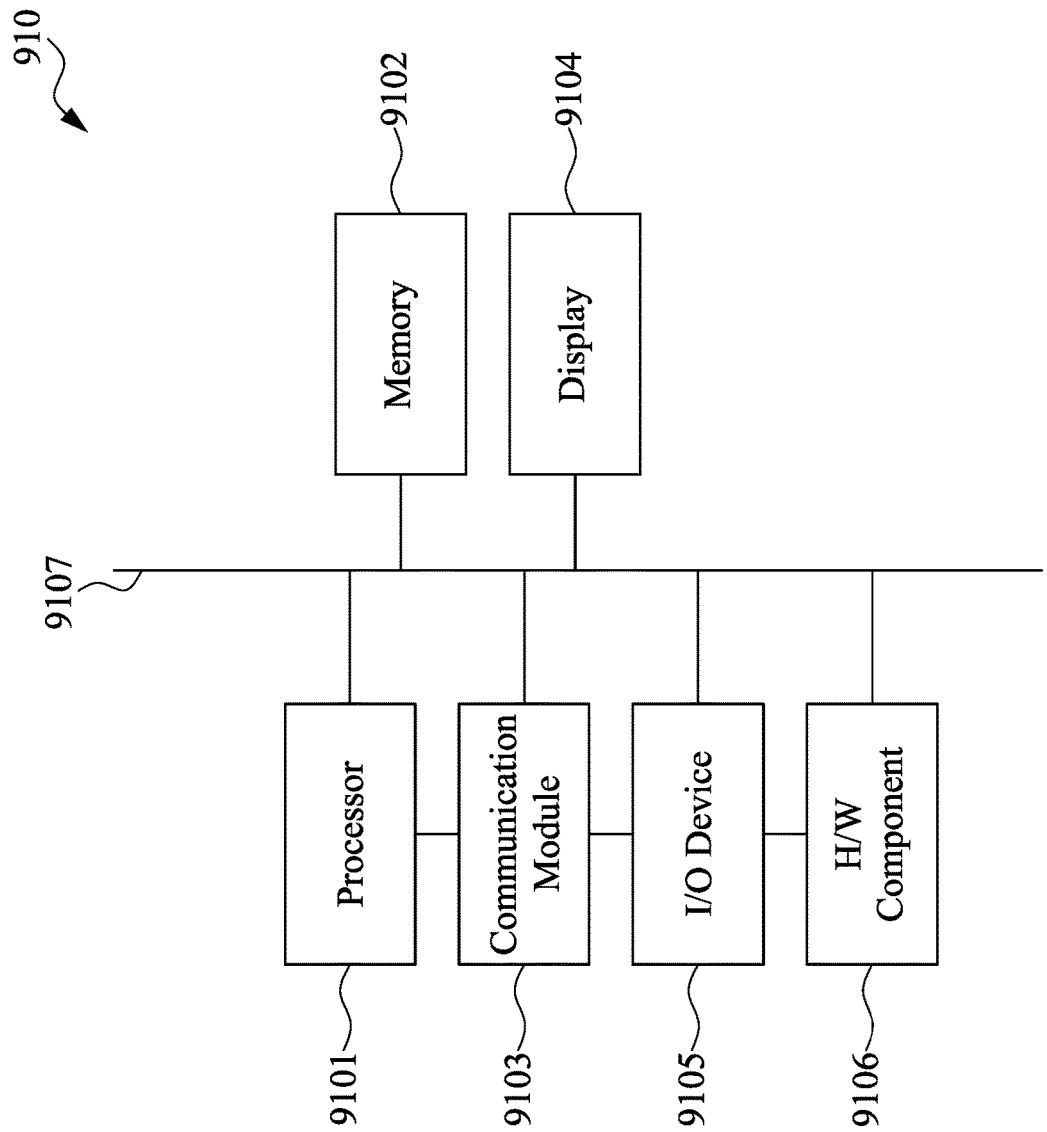
FIG. 28 is a block diagram of a layout pattern design system according to some embodiments of the present disclosure.

FIG. 28 is a block diagram of a layout pattern design system 110 according to some embodiments of the present disclosure. One or more of the tools and systems and operations described with respect to the method M of FIGS. 4A and 4B is realized in some embodiments by the layout pattern design system 910 of FIG. 28.

The layout pattern design system 910 includes a processor 9101, a memory 9102, a communication module 9103, a display 9104, an input/output (I/O) device 9105, and one or more hardware components 9106 communicatively coupled via a bus 9107 or another interconnection communication mechanism.

The processor 9101 could include a digital signal processor (DSP), a microcontroller (MCU), a central-processing unit (CPU) or a plurality of parallel processors relating the parallel processing environment to implement the operating system (OS), firmware, driver and/or other applications of the layout pattern design system 110.

The memory 9102 comprises, in some embodiments, a random access memory (RAM) or another dynamic storage device or read only memory (ROM) or other static storage devices, coupled to the bus 9107 for storing data and/or instructions to be executed by the processor 9101. The memory 9102 is also used, in some embodiments, for storing temporary variables or other intermediate information during the execution of instructions to be executed by the processor 9101.

The communication module 9103 is operable to communicate information such as IC design layout files with the other components in the IC manufacturing system 910. Examples of communication modules may include Ethernet cards, WiFi devices, cellular data radios, and/or other suitable devices.

The display 9104 is utilized to display the processing data. The display 9104 can be a liquid-crystal panel or a touch display panel. The I/O device 9105 includes an input device, an output device and/or a combined input/output device for enabling user interaction with the layout pattern design system 910. An input device comprises, for example, a keyboard, keypad, mouse, trackball, trackpad, and/or cursor direction keys for communicating information and commands to the processor 9101. An output device comprises, for example, the display (e.g., the display 9104), a printer, a voice synthesizer, etc. for communicating information to the user.

In some embodiments, the method M described with respect to FIGS. 4A and 4B are realized as functions of a program stored in a non-transitory computer readable recording medium, for example, in the memory 9102 in FIG. 28. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like. In some embodiments, the method M described with respect to FIGS. 4A and 4B are implemented by specially configured hardware component 9106 in FIG. 28 separated from or in lieu of the processor 9101 in FIG. 28. In some embodiments, the specially configured component 9106 in FIG. 28 may be one or more application-specific integrated circuits or ASIC(s).

In some embodiments, the operations M described with respect to FIGS. 4A and 4B may be performed by user. For example, the user tags/determining the dummy regions, disposing the dummy line, and modified the dummy lines. For example, the input device of the I/O device 9105 may receive the user's commands and send the commands to the processor 9101, such that the processor 9101 performs the adjustment to the layout.

Based on the above discussions, it can be seen that the present disclosure offers advantages to the HKMG devices. It is understood, however, that other embodiments may offer additional advantages, and not all advantages are necessarily disclosed herein, and that no particular advantage is required for all embodiments. One advantage is that a methodology to provide dense and flexible dummy pattern to adopt difficult environment is provided. The dummy pattern insertion is optimized with the consideration of the environment conditions (direction and sizes of the dummy region) and fixed line space. The optimized dummy pattern insertion gets dense/uniform RDL environment, thereby getting better process window. Another advantage is that the auto-direction (or auto-orientation) dummy lines are inserted. Still advantage is that the dummy lines with different size are used to find optimal solution. Still advantage is that a modification process including merging dummy line are used to enlarge the insertion ration. Still advantage is that a revised tone method is used with one-dimension grid methodology for defining dummy region in redistribution layer.

According to some embodiments of the present disclosure, a method for fabricating a semiconductor device is provided. The method includes generating a redistribution layer (RDL) layout, wherein the RDL layout comprises a plurality of redistribution lines; determining a first dummy region in the RDL layout according to the redistribution lines; disposing a plurality of first dummy redistribution lines in the first dummy region; performing a first modification process to enlarge at least one of the first dummy redistribution lines; determining the enlarged one of the first dummy redistribution lines as a second dummy region in the RDL layout when an area of the enlarged one of the first dummy redistribution lines is greater than a first threshold value; disposing a plurality of second dummy redistribution lines in the second dummy region; and patterning a metal layer according to the RDL layout after disposing the second dummy redistribution lines in the second dummy region.

According to some embodiments of the present disclosure, a method for fabricating a semiconductor device is provided. The method includes generating a redistribution layer (RDL) layout, wherein the RDL layout comprises a plurality of redistribution lines; determining a horizontal dummy region and a vertical dummy region in the RDL layout; disposing a plurality of horizontal dummy redistribution lines in the horizontal dummy region; disposing a plurality of vertical dummy redistribution lines in the vertical dummy region; and patterning a metal layer according to the RDL layout after disposing the horizontal dummy redistribution lines in the horizontal dummy region and disposing the vertical dummy redistribution lines in the vertical dummy region.

According to some embodiments of the present disclosure, a semiconductor device includes an interconnect structure, a passivation layer, and a redistribution layer. The passivation layer is over the interconnect structure. The redistribution layer is over the passivation layer. The redistribution layer comprises a redistribution pattern and at least one dummy redistribution line. The redistribution pattern is electrically connected with a metallization pattern of the interconnect structure. The at least one dummy redistribution line is electrically isolated from the metallization pattern of the interconnect structure. The dummy redistribution line extends along a first direction and has opposite first and second ends along the first direction, and the first and second ends of the dummy redistribution line are immediately adjacent the redistribution pattern.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for fabricating a semiconductor device, comprising:
   generating a redistribution layer (RDL) layout, wherein the RDL layout comprises a plurality of redistribution lines;
   determining a first dummy region in the RDL layout according to the redistribution lines;
   disposing a plurality of first dummy redistribution lines in the first dummy region;
   performing a first modification process to enlarge at least one of the first dummy redistribution lines;
   replacing the enlarged one of the first dummy redistribution lines with a plurality of second dummy redistribution lines when an area of the enlarged one of the first dummy redistribution lines is greater than a first threshold value; and
   patterning a metal layer according to the RDL layout after replacing the enlarged one of the first dummy redistribution lines with the second dummy redistribution lines.

2. The method of claim 1, wherein the second dummy redistribution lines have a width greater than that of the first dummy redistribution lines.

3. The method of claim 1, wherein the first dummy region is spaced apart from the redistribution lines by a distance, and the second dummy redistribution lines have a width greater than the distance.

4. The method of claim 1, wherein the second dummy redistribution lines are spaced apart from each other by a line space, and the second dummy redistribution lines have a width greater than the line space.

5. The method of claim 1, wherein the first modification process comprises:
   merging said one of the first dummy redistribution lines with an adjacent one of the first dummy redistribution lines.

6. The method of claim 1, wherein the first modification process comprises:
   aligning an edge of said one of the first dummy redistribution lines to an edge of the first dummy region.

7. The method of claim 1, further comprising:
   performing a second modification process to enlarge at least one of the second dummy redistribution lines prior to patterning the metal layer.

8. The method of claim 7, further comprising:
   replacing the enlarged one of the second dummy redistribution lines with a plurality of third dummy redistribution lines in the RDL layout when an area of the enlarged one of the second dummy redistribution lines is greater than a second threshold value greater than the first threshold value.

9. A method for fabricating a semiconductor device, comprising:
   generating a redistribution layer (RDL) layout, wherein the RDL layout comprises a plurality of redistribution lines;
   determining a horizontal dummy region and a vertical dummy region in the RDL layout;
   disposing a plurality of horizontal dummy redistribution lines in the horizontal dummy region;
   disposing a plurality of vertical dummy redistribution lines in the vertical dummy region, wherein the vertical dummy redistribution lines do not overlap with the horizontal dummy redistribution lines in the RDL layout; and
   patterning a metal layer according to the RDL layout after disposing the horizontal dummy redistribution lines in the horizontal dummy region and disposing the vertical dummy redistribution lines in the vertical dummy region.

10. The method of claim 9, further comprising:
    performing a first modification process to merge at least two of the horizontal dummy redistribution lines with each other.

11. The method of claim 10, wherein the first modification process is further performed to merge at least two of the vertical dummy redistribution lines with each other.

12. The method of claim 9, further comprising:
performing a second modification process to adjust a width of an edgemost one of the horizontal dummy redistribution lines to meet an edge of the horizontal dummy region.

13. The method of claim 9, further comprising:
performing a second modification process to adjust a width of an edgemost one of the vertical dummy redistribution lines to meet an edge of the vertical dummy region.

14. A method for fabricating a semiconductor device, comprising:
disposing a plurality of first dummy redistribution lines in a first dummy region in a redistribution layer (RDL) layout;
performing a first modification process to merge a first one of the first dummy redistribution lines with a second one of the first dummy redistribution lines when an area of the first one of the first dummy redistribution lines is less than a first threshold value;
dividing the merged first and second ones of the first dummy redistribution lines into a plurality of second dummy redistribution lines in the RDL layout when an area of the merged first and second ones of the first dummy redistribution lines is greater than a second threshold value greater than the first threshold value; and
forming an RDL according to the RDL layout after dividing the merged first and second ones of the first dummy redistribution lines into the second dummy redistribution lines.

15. The method of claim 14, wherein the second dummy redistribution lines have a width greater than that of the first dummy redistribution lines.

16. The method of claim 14, wherein the first dummy redistribution lines and the second dummy redistribution lines extend substantially along a same direction.

17. The method of claim 14, wherein the first dummy redistribution lines are spaced apart from each other by a first line space, the second dummy redistribution lines are spaced apart from each other by a second line space, and the second line space is substantially equal to the first line space.

18. The method of claim 1, wherein each of the second dummy redistribution lines has an area smaller than an area of the enlarged one of the first dummy redistribution lines.

19. The method of claim 9, wherein the horizontal dummy region is separated from the vertical dummy region in the RDL layout.

20. The method of claim 9, wherein the metal layer is patterned to be a plurality of horizontal metal lines corresponding to the horizontal dummy redistribution lines in the RDL layout, a plurality of vertical metal lines corresponding to the vertical dummy redistribution lines in the RDL layout, and a plurality of metal lines corresponding to the redistribution lines in the RDL layout, and wherein the horizontal metal lines and the vertical metal lines are at a layer the same as a layer the metal lines are formed.

\* \* \* \* \*